US008555169B2

(12) United States Patent
Pendergast et al.

(10) Patent No.: US 8,555,169 B2
(45) Date of Patent: Oct. 8, 2013

(54) MEDIA CLIP AUDITIONING USED TO EVALUATE UNCOMMITTED MEDIA CONTENT

(75) Inventors: Colleen Pendergast, Livermore, CA (US); Michaelle Stikich, San Francisco, CA (US); Dave Cerf, San Francisco, CA (US); Tom Langmacher, Washougal, WA (US); Anne Swenson, Los Gatos, CA (US); Gregory Niles, Culver City, CA (US); Jerremy Holland, Los Altos Hills, CA (US); Brian Meaney, San Jose, CA (US); Egan Schulz, San Jose, CA (US); Charles Lyons, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 612 days.

(21) Appl. No.: 12/433,892

(22) Filed: Apr. 30, 2009

(65) Prior Publication Data
US 2010/0281375 A1 Nov. 4, 2010

(51) Int. Cl.
*G06F 3/00* (2006.01)
(52) U.S. Cl.
USPC ........... 715/723; 715/716; 715/719; 715/720; 715/721; 715/722; 715/724; 715/726; 715/730; 715/731; 715/732
(58) Field of Classification Search
USPC .................. 715/716, 719–724, 726, 730–732
See application file for complete search history.

(56) References Cited

U.S. PATENT DOCUMENTS

| 5,467,288 A | * | 11/1995 | Fasciano et al. ............... 715/716 |
| 5,519,828 A | * | 5/1996 | Rayner ......................... 715/723 |
| 5,659,539 A | | 8/1997 | Porter et al. |
| 5,659,792 A | | 8/1997 | Walmsley |
| 5,664,216 A | | 9/1997 | Blumenau |

(Continued)

FOREIGN PATENT DOCUMENTS

| WO | WO 2007/120694 | 10/2007 |
| WO | WO 2009/122213 | 10/2009 |
| WO | WO 2009/128227 | 10/2009 |
| WO | WO 2010/106586 | 9/2010 |

OTHER PUBLICATIONS

Bennett, Eric P., et al., "Proscenium: A Framework for Spatio-Temporal Video Editing," Proceedings of ACM Multimedia, Nov. 2-8, 2003, pp. 177-184, Berkeley, CA.

(Continued)

*Primary Examiner* — Omar Abdul-Ali
*Assistant Examiner* — Phuong Nguyen
(74) *Attorney, Agent, or Firm* — Adeli & Tollen LLP

(57) ABSTRACT

A computer readable medium (CRM) storing a media editing application for creating media presentations is described. The application includes a graphical user interface (GUI). The GUI has (1) a display area for displaying a composite presentation that the application creates by compositing a plurality of media clips, (2) a composite display area for displaying graphical representations of a set of media clips that are part of the composite presentation, (3) an audition display area for displaying graphical representations of a set of media clips that are candidates for adding to the composite presentation at a particular location, and (4) an audition tool for creating an audition set for a particular location in the composite display area, where the audition set is a user modifiable set of clips, each of which is for individual placement at the particular location for inclusion in the composite presentation.

28 Claims, 62 Drawing Sheets

(56) References Cited

U.S. PATENT DOCUMENTS

| | | | |
|---|---|---|---|
| 5,682,326 | A | 10/1997 | Klingler et al. |
| 5,760,767 | A | 6/1998 | Shore et al. |
| 5,781,188 | A * | 7/1998 | Amiot et al. .................. 715/723 |
| 5,826,102 | A | 10/1998 | Escobar et al. |
| 5,861,886 | A * | 1/1999 | Moran et al. .................. 715/863 |
| 5,930,446 | A | 7/1999 | Kanda |
| 6,134,380 | A | 10/2000 | Kushizaki |
| 6,154,600 | A * | 11/2000 | Newman et al. ............. 386/281 |
| 6,154,601 | A | 11/2000 | Yaegashi et al. |
| 6,161,115 | A | 12/2000 | Ohanian |
| 6,324,335 | B1 | 11/2001 | Kanda |
| 6,400,378 | B1 * | 6/2002 | Snook .......................... 715/716 |
| 6,414,686 | B1 | 7/2002 | Protheroe et al. |
| 6,477,315 | B1 | 11/2002 | Ohomori |
| 6,539,163 | B1 | 3/2003 | Sheasby et al. |
| 6,546,188 | B1 | 4/2003 | Ishii et al. |
| 6,628,303 | B1 | 9/2003 | Foreman et al. |
| 6,658,194 | B1 | 12/2003 | Omori |
| 6,674,955 | B2 | 1/2004 | Matsui et al. |
| 6,714,216 | B2 | 3/2004 | Abe |
| 7,073,127 | B2 * | 7/2006 | Zhao et al. .................... 715/719 |
| 7,313,755 | B2 | 12/2007 | Rahman et al. |
| 7,325,199 | B1 * | 1/2008 | Reid .............................. 715/723 |
| 7,362,946 | B1 | 4/2008 | Kowald |
| 7,432,940 | B2 | 10/2008 | Brook et al. |
| 7,444,593 | B1 | 10/2008 | Reid |
| 7,614,012 | B1 | 11/2009 | Dulaney |
| 7,623,755 | B2 | 11/2009 | Kuspa |
| 7,788,592 | B2 * | 8/2010 | Williams et al. ............. 715/764 |
| 7,805,678 | B1 | 9/2010 | Niles et al. |
| 7,889,975 | B2 | 2/2011 | Slone |
| 2001/0020953 | A1 | 9/2001 | Moriwake et al. |
| 2001/0036356 | A1 | 11/2001 | Weaver et al. |
| 2002/0023103 | A1 | 2/2002 | Gagne |
| 2002/0154140 | A1 | 10/2002 | Tazaki |
| 2002/0154156 | A1 | 10/2002 | Moriwake et al. |
| 2002/0156805 | A1 | 10/2002 | Schriever et al. |
| 2002/0188628 | A1 | 12/2002 | Cooper et al. |
| 2003/0001880 | A1 | 1/2003 | Holtz et al. |
| 2003/0016254 | A1 | 1/2003 | Abe |
| 2003/0018609 | A1 | 1/2003 | Phillips et al. |
| 2003/0117431 | A1 * | 6/2003 | Moriwake et al. ........... 345/723 |
| 2004/0001079 | A1 | 1/2004 | Zhao et al. |
| 2004/0056883 | A1 * | 3/2004 | Wierowski .................... 345/719 |
| 2004/0071441 | A1 * | 4/2004 | Foreman et al. ............... 386/52 |
| 2004/0078761 | A1 * | 4/2004 | Ohanian ....................... 715/530 |
| 2005/0132293 | A1 | 6/2005 | Herberger et al. |
| 2005/0257152 | A1 | 11/2005 | Shimizu et al. |
| 2006/0008247 | A1 | 1/2006 | Minami et al. |
| 2006/0265657 | A1 * | 11/2006 | Gilley .......................... 715/730 |
| 2006/0277454 | A1 * | 12/2006 | Chen .......................... 715/500.1 |
| 2007/0189708 | A1 | 8/2007 | Lerman et al. |
| 2007/0262995 | A1 | 11/2007 | Tran |
| 2008/0010585 | A1 * | 1/2008 | Schneider et al. ............. 715/201 |
| 2008/0044155 | A1 | 2/2008 | Kuspa |
| 2008/0120550 | A1 | 5/2008 | Oakley et al. |
| 2008/0152297 | A1 | 6/2008 | Ubillos |
| 2008/0152298 | A1 | 6/2008 | Ubillos |
| 2008/0155420 | A1 | 6/2008 | Ubillos et al. |
| 2008/0155421 | A1 | 6/2008 | Ubillos et al. |
| 2008/0215983 | A1 * | 9/2008 | Wierowski et al. ........... 715/723 |
| 2008/0253735 | A1 | 10/2008 | Kuspa et al. |
| 2009/0131177 | A1 * | 5/2009 | Pearce ............................ 463/43 |
| 2010/0049699 | A1 | 2/2010 | Benschoter et al. |
| 2010/0281376 | A1 | 11/2010 | Meaney et al. |

OTHER PUBLICATIONS

Chisan, James, et al., "Video Bench—Final Report: SEng 480a/CSc 586a," Apr. 11, 2003, University of Victoria.

Casares, Juan, et al., "Simplifying Video Editing Using Metadata," Proceedings of Designing Interactive Systems (DIS 2002), Jun. 2002, pp. 157-166, London, Great Britain.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA.

U.S. Appl. No. 12/433,893, filed Apr. 30, 2009, Meaney, Brian, et al.

Author Unknown, "Apple Announces Final Cut Pro4," NAB, Apr. 6, 2003, Apple Inc., Las Vegas, Nevada, USA.

Author Unknown, "iMovie '08 Getting Started," Month Unknown, 2008, Apple Inc., USA.

Author Unknown, "Using Adobe Premiere Elements 8 Editor," Month Unknown, 2009, Adobe Systems Incorporated, San Jose, California, USA.

Author Unknown, "Adobepremiere Pro CS3: User Guide," Month Unknown, 2007, Adobe Systems Incorporated, San Jose, California, USA.

Portions of Prosecution history of U.S. Appl. No. 12/433,893, Jan. 27, 2012, Meaney, Brian, et al.

Brenneis, Lisa, "Final Cut Pro 3 for Macintosh: Visual QuickPro Guide," Apr. 2002, Peachpit Press, Berkley, California, USA.

Updated portions of prosecution history of U.S. Appl. No. 12/433,893, May 16, 2012, Meaney, Brian, et al.

Updated portions of prosecution history of U.S. Appl. No. 12/433,893, Jun. 27, 2012, Meaney, Brian, et al.

* cited by examiner

MEDIA CLIP AUDITIONING USED TO EVALUATE UNCOMMITTED MEDIA CONTENT

FIELD OF THE INVENTION

The present invention relates to a media editing tool that allows modification and playback of multiple sources of media content that are candidates for a same location in a media project.

BACKGROUND OF THE INVENTION

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple Computer, Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface whereby designers digitally manipulate graphical representations of the media content to produce a desired result.

One difficulty in media editing is that a user cannot easily evaluate alternatives to existing content in the context of the media project without repeatedly modifying the existing project data. At any given time, the user may wish to preview several potential additions to the project before committing any particular addition to the project.

FIG. 1 illustrates a typical graphical user interface ("GUI") 100 of a media editing application. Specifically, this figure illustrates the GUI 100 at four different stages 110-140: a first stage 110 that is before the user has evaluated any alternatives to a particular clip 150 in the existing content, a second stage 120 that is after a first alternative clip 155 has replaced an existing clip 150 in the composite project, a third stage 130 that is after a second alternative clip 160 has replaced the first alternative clip 155 in the composite project, and a fourth stage 140 that is after a third alternative clip 165 has replaced the second alternative clip 160 in the composite project. As shown in the first stage 110, the GUI 100 includes a timeline 170 that includes various media clips 150, and 180-190. In this example, a user wishes to evaluate several options for the location of the timeline 170 occupied by the "Video_2" clip 150. The operations the user performs will be described in reference to the four stages 110-140 illustrated in FIG. 1.

The first stage 110 illustrates the GUI 100 after the user has loaded a particular composite project. In this stage, the user deletes the clip 150 from the timeline 170 and adds another clip in its place.

The second stage 120 shows the results of this exchange of clips. The original clip 150 has been deleted in the timeline 170 and the "Video_3" clip 155 has been added in its place. In this stage, the user deletes the replacement clip 155 from the timeline 170 and adds another clip in its place.

By replacing the "Video_2" clip 150, the "Video_2" clip (or a reference thereto) is removed from the project data and any data associated with the "Video_2" clip is also lost. This associated data may include video effects data, start and stop points, audio enhancements, etc. Thus, if the user wishes to revert to the project as shown in the first stage 110, the user must delete the "Video_3" clip 155 and add the previously-deleted "Video_2" clip 150 (e.g., by manually replacing the content, performing a series of "undo" operations, or some other way). In addition, after restoring the "Video_2" clip the user may have to trim the content, add effects, or perform other editing operations to return the project to the state it was in before evaluating the "Video_3" clip 155. Furthermore, the user must repeat similar steps in order to evaluate other potential changes to the media project, as described below.

The third stage 130 shows the results of the exchange of clips performed in the second stage 120. As shown in the third stage 130, the first replacement clip 155 has been removed from the timeline 170 and the "Video_4" clip 160 has been inserted in its place. As above, if the user wishes to revert to the project as shown in the first stage 110 or the second stage 120, the user must delete the "Video_4" clip 160 and add one of the previously-deleted clips 150-155 in its place. In this stage, the user deletes the second replacement clip 160 from the timeline 170 and adds another clip in its place.

The fourth stage 140 shows the results of the exchange of clips performed in the third stage 130. As shown in the fourth stage 140, the second replacement clip 160 has been removed from the timeline 170 and the "Video_5" clip 165 has been inserted in its place. As above, if the user wishes to revert to the project as shown in the first stage 110, second stage 120, or the third stage 130, the user must delete the "Video_5" clip 165 and add one of the previously-deleted clips 150-160 in its place.

Thus, there is a need for a media editing application that allows a user to preview multiple candidates for the same location in a media project and resulting media presentation without iteratively deleting content and adding different content in its place.

SUMMARY OF THE INVENTION

For a media editing application that creates composite presentations, some embodiments of the invention provide a novel audition feature that allows a user to examine and maintain several different clips that are candidates for addition for the same location in a composite presentation. In some embodiments, a user can also use this audition feature to preview an audition clip in a composite presentation (e.g., preview its location and watch it in a preview display of the presentation) without adding the audition clip to the composite presentation.

The media editing application of some embodiments includes a composite display area (e.g., an area with multiple tracks that span a timeline) for displaying graphical representations of the media clips that form a composite presentation. In some of these embodiments, the audition feature allows a user to maintain one particular clip in the composite display area while also keeping track of other clips that the user has specifically designated as candidates for replacing the particular clip in the composite display area. These other clips will be referred to below as candidate audition clips, while the particular clip in the composite display area that has a set of associated candidate audition clips will be referred to as a composite-target clip.

The audition feature in some embodiments allows the user to keep track of the candidate audition clips by listing or representing them in a separate audition display area in the media editing application's user interface (UI). Specifically, this separate audition display area lists or displays representations (e.g., thumbnail images) of the associated set of candidate audition clips for a particular composite-target clip that has been selected in the composite display area. In some embodiments, the audition display area also includes a representation of the composite-target clip, or a listing of this clip, in order to provide a complete presentation of the set of choices for one location in the composite project; however, some of these embodiments distinguish the visual appearance of the composite-target clip representation in the audition display area from the representations of the other candidate clips in this area, in order to signify that the composite-target clip is the candidate clip that is currently represented in the composite display area. Different embodiments implement the separate audition area differently. Examples of such different implementations include an audition display area that is always open in the application's UI, is opened through a set of menu commands, is opened through drop-down or pop-up menu operations, etc.

Different embodiments allow different types of clips to be composite-target clips (i.e., clips represented in the composite display area with an associated set of candidate audition clips in the audition display area). Some embodiments only display clips in the composite display area that are part of the composite presentation that the application is editing or producing. In such embodiments, the composite-target clips can only be "committed clips," which are clips that are part of the composite presentation that is graphically represented in the composite display area.

Other embodiments allow the composite display area to include and display graphical representations of "preview clips," which are clips that a user adds to a composite display area to preview the clips without adding these clips to the composite presentation. In some such embodiments, the composite-target clips are preview clips. In the composite display area, some embodiments use a different graphical representation for preview clips than for committed clips that are being concurrently represented in the composite display area, in order to allow a user to distinguish preview and committed clips in this area. Even though preview clips are not part of the composite presentation, some embodiments allow the preview clips in the composite display area to supersede the committed clips in a preview of the composite presentation that is displayed in a preview display area of the media editing application.

Some embodiments allow a user to place or move a preview clip to an area of a track that holds committed clips. In some of these embodiments, a preview clip would change the attribute of a committed clip that it overlaps on the same track (e.g., it pushes the committed clip along the timeline or deletes it from the track). In other embodiments, such a preview clip does not change the attribute of committed clip that it overlaps (e.g., does not change the committed clip's positions along the timeline or tracks) in the composite display area, as the preview clip is not part of the composite presentation. However, to distinguish preview and committed clips in the composite display area, some such embodiments use different graphical representation for the preview and committed clips as mentioned above.

Some embodiments allow composite-target clips to be either committed or preview clips. Irrespective of whether a composite-target clip is a committed or preview clip, the user can use the audition feature to iteratively swap the composite-target clip with its associated individual audition clips that are listed or represented in the audition display area. In this manner, the user can use the audition feature to examine different candidate audition clips for the role of the composite-target clip in the composite display area, and preview each new composite-target clip in the preview of the composite presentation that is provided in the application's preview display area. This, in turn, allows the user to determine which, if any, of the candidate audition clips is ideal for inclusion in the composite presentation. When the candidate audition clip that the user identifies for inclusion in the composite presentation is a preview clip, the user has to change the designation of this clip to a committed clip in order to include it in the composite presentation.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media editing application that creates composite presentations by combining several media clips, some embodiments of the invention provide a novel audition feature that allows a user to examine and maintain several different clips that are candidates for addition at the same location in a composite presentation. In some embodiments, a user can also use this audition feature to preview an audition clip in a composite presentation (e.g., preview its location and watch it in a preview display of the presentation) without adding the audition clip to the composite presentation. In some embodiments, media clips are any kind of clip that can be used to create a composite presentation. Examples of such media clips include audio clips, video clips, text overlays, pictures, and/or other media.

Figure 1:
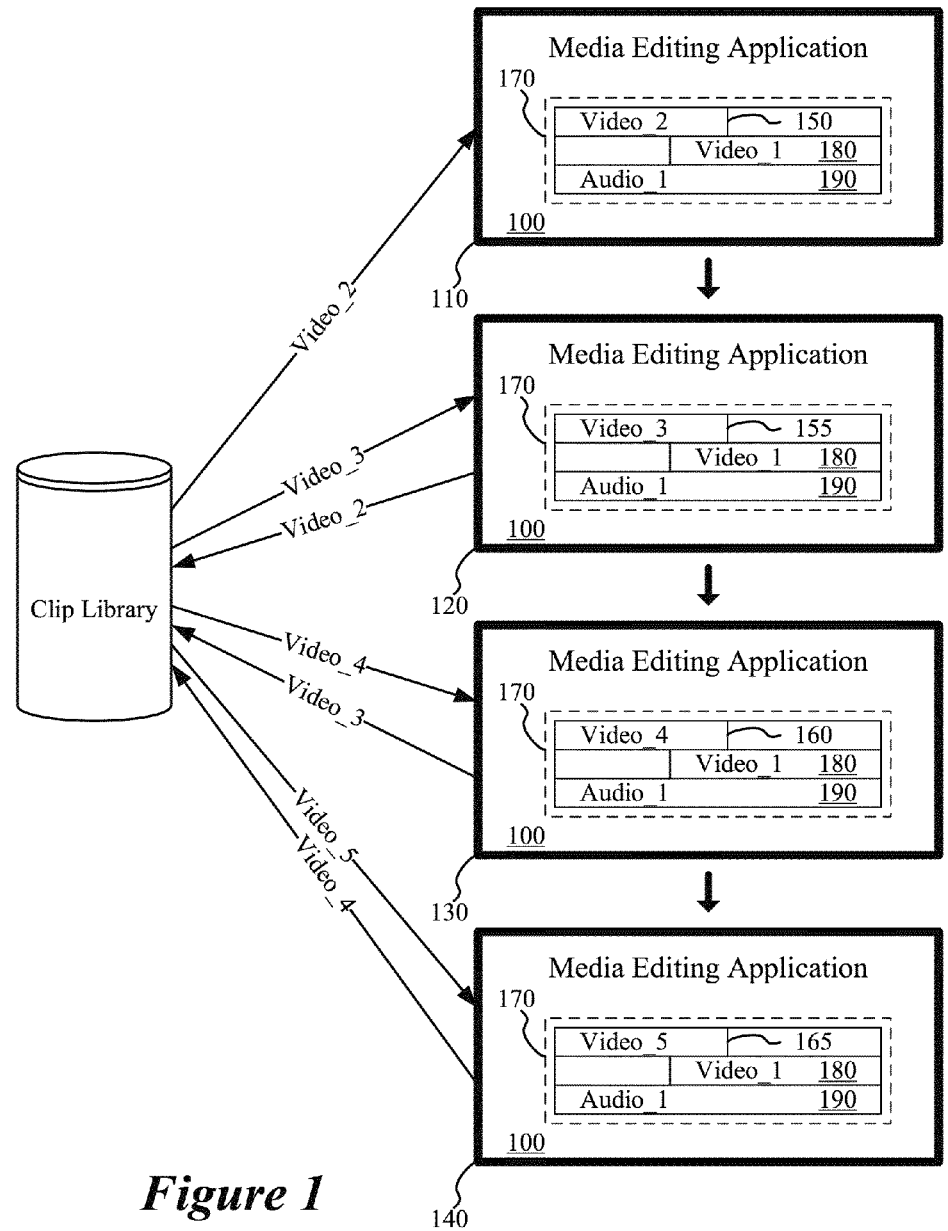
FIG. 1 illustrates a typical media editing application.
Figure 2:
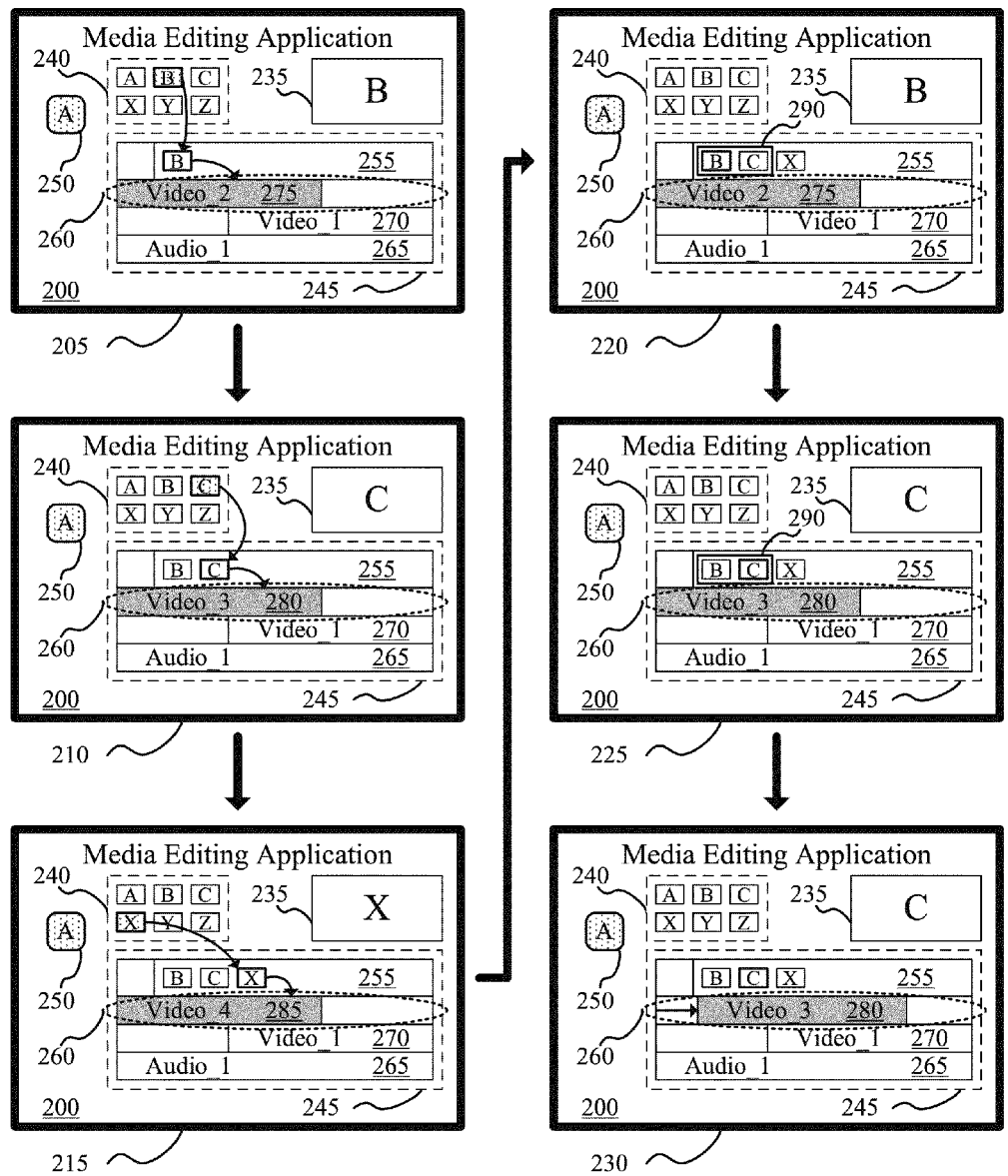
FIG. 2 illustrates a graphical user interface ("GUI") of a media editing application with an audition feature of some embodiments.

For some embodiments of the invention, FIG. 2 illustrates a graphical user interface ("GUI") 200 of a media editing application with such an audition feature. Specifically, this figure illustrates the GUI 200 at six different stages. The first three of these stages 205, 210, and 215 correspond to the addition of three different video clips as audition clips for a composite presentation. The next three stages 220, 225 and 230 correspond to the iterative re-examination of two of the audition clips and the movement of one of the audition clips along the time line, in order to identify the audition clip to include in the composite presentation at a particular location in the composite presentation. Each of these stages will be further described below. However, before this description, the elements are GUI 200 are introduced.

As shown FIG. 2, the GUI 200 includes a preview display area 235, a media library 240, a composite display area 245, an audition selection GUI item 250, an audition display area 255, and one or more tracks (e.g., track 260) in the composite display area. The preview display area 235 displays a preview of a composite presentation that the application creates by compositing several media clips.

The media library 240 is an area in the GUI 200 through which the application's user can select media clips to add to a presentation that the user is compositing with the application. In the example of FIG. 2, the clips in the media library are represented as thumbnails that can be selected and added to the composite display area 245 (e.g., through a drag-and-drop operation or a menu selection operation). The clips in the media library may also be represented as a list, a set of icons, or some other representation that allows a user to view and select the various clips in the library. In some embodiments, the media library 240 may include audio clips, video clips, text overlays, pictures, and/or other media.

The composite display area 245 provides a visual representation of the composite presentation being created by the user. Specifically, it displays one or more geometric shapes that represent one or more media clips that are part of the composite presentation. Media clips that are part of the composite presentation are referred to below as committed clips. As further described below, the media editing application of some embodiments allows media clips to be added to the composite display area as "preview clips." Preview clips are media clips that are candidates for adding to the composite presentation as they have not yet been added to the composite presentation.

As they are candidate for adding to the composite presentation, preview clips are not part of the composite presentation that is being concurrently represented in the composite display area. The media editing application of some embodiments, however, allows preview clips to be included in the display presentation of the composite project that is provided in the preview display area 235 (i.e., allows a user to watch and/or listen to the composite project, with the candidate clips included, in a preview display area 235).

Some embodiments use a different graphical representation for preview clips than for committed clips in order to allow a user to distinguish preview and committed clips in the composite display area. Even though preview clips are not parts of the composite presentation, some embodiments allow the preview clips in the composite display area to supersede the committed clips in a preview of the composite presentation that is displayed in the preview display area 235 of the media editing application. Having a preview clip appear in the composite presentation instead of a committed clip without modifying the underlying composite presentation allows a user to evaluate and/or modify the preview clip without making changes to the composite project. This is helpful in saving time in making modifications to the underlying composite project that later prove to be undesirable. Moreover, such modifications in some instances might prove difficult in reversing accurately when they prove to be unwanted later.

In the example illustrated in FIG. 2, the composite display area 245 is an area that includes multiple tracks that span a timeline. One or more media clips can be placed on each track. In some embodiments, no two committed clips can overlap on the same track, but, as described above and below, a preview clip can overlap one or more committed clips on a particular track in some embodiments.

In some embodiments, the audition feature allows a user to maintain one particular audition clip in the composite display area 245 while also keeping track of other audition clips that the user has specifically designated as candidates for replacing the particular audition clip in the composite display area. These other clips will be referred to below as candidate audition clips, while the particular audition clip in the composite display area that has a set of associated candidate audition clips will be referred to as a composite-target clip.

The audition display area 255 is the area that the audition feature of some embodiments uses to keep track of the candidate audition clips. In the example illustrated in FIG. 2, this display area provides a graphical representation of the candidate audition clips. Specifically, for a particular composite-target clip that is selected in the composite display area, the audition display area of some embodiments displays graphical representations (e.g., thumbnail images) of the associated set of candidate audition clips. In other embodiments, the audition display area provides just a list view, an icon view, or some other view of the associated set of candidate clips.

In some embodiments, the audition display area also includes a representation of the composite-target clip, in order to provide a complete presentation of the set of choices for one location in the composite project. However, some of these embodiments distinguish the visual appearance of the composite-target clip representation in the audition display area from the representations of the other candidate clips in this area, in order to signify that the composite-target clip is the candidate clip that is currently represented in the composite display area.

In the example illustrated in FIG. 2, the audition display area is shown as a window that is located above the composite display area when the window is opened. This window is opened differently in different embodiments. For instance, this window is always open in the application's UI in some embodiments, while it is opened through a set of menu commands in other embodiments. In yet other embodiments, this window is a drop-down window that opens upon a user's selection. Still other embodiments implement the audition display window as a pop-up window that opens up upon a user's command. One of ordinary skill will realize that many other implementations for the audition display area are possible.

The audition selection item 250 is a conceptual illustration of one or more UI items that allows the media editing application to implement its audition feature. Different embodiments of the invention implement this UI item differently. Some embodiments implement it as an audition UI button, others as an audition command that can be selected in a pull-down or drop-down menu, and still others as an audition command that can be invoked through one or more keystroke operations. Yet other embodiments allow the user to access the audition feature through two or more of such UI implementations or other UI implementations. In some embodiments, a user of the application can use the audition selection item 250 to add a particular media clip that is in the media library 240 to the composite display area 245 as a composite-target clip.

Different embodiments allow different types of clips to be composite-target clips (i.e., clips represented in the composite display area with an associated set of candidate audition clips). Some embodiments only display clips in the composite display area that are part of the composite presentation that the application is editing or producing. In such embodiments, the composite-target clips can only be committed clips.

Other embodiments allow the composite display area to include and display graphical representations of preview clips. In some such embodiments, the composite-target clips are preview clips. Accordingly, in some embodiments, a track (e.g., track 260) receives and holds the graphical representation of one or more preview clips. In some of these embodiments, a preview clip would change the attribute of a committed clip that it overlaps on the same track (e.g., it pushes the committed clip along the timeline or deletes it from the track). In other embodiments, such a preview clip does not change the attribute of committed clip that it overlaps (e.g., does not change the committed clip's positions along the timeline or tracks) in the composite display area, as the preview clip is not part of the composite presentation.

Some embodiments allow composite-target clips to be either committed or preview clips. Irrespective of whether a composite-target clip is a committed or preview clip, the user can use the audition feature to iteratively swap the composite-target clip with its associated individual audition clips that are listed or represented in the audition display area. In this manner, the user can use the audition feature to examine different candidate audition clips for the role of the composite-target clip in the composite display area, and preview each new composite-target clip in the preview of the composite presentation that is provided in the application's preview display area. This, in turn, allows the user to determine which, if any, of the candidate audition clips is ideal for inclusion in the composite presentation. When the candidate audition clip that the user identifies for inclusion in the composite presentation is a preview clip, the user has to change the designation of this clip to a committed clip in order to include it in the composite presentation.

The operation of the GUI 200 will now be described by reference to the state of this GUI during the first through sixth stages 205-230 that are illustrated in FIG. 2. In the first stage 205, the composite display area 245 displays a composite presentation after the audition feature has been invoked using the audition selection item 250. As shown, the composite display area includes two non-audition clips. These two clips are an audio clip 265, and a video clip 270. A user might have added these two clips to the composite presentation by selecting them from the media library 240, or the user might have opened a previously defined composite project that included these two clips. In addition to the two non-audition clips 265-270, a clip has been selected from the media library 240 and added as an audition clip. The audition clip has been added to the audition display area 255 as a candidate audition clip and added to track 260 in the composite display area 245 as a composite-target clip 275.

Clips may be added as audition clips (i.e., composite-target clips and/or candidate audition clips) in several different ways. For instance, the audition selection button 250 can be used in some embodiments to add a particular media clip to the composite display area as an audition clip. For instance, in some embodiments, the user can first select the audition selection button. The particular media clip may then be added to the composite display area through a click-and-drag operation (i.e., by using a cursor-control device, such as a mouse or trackpad, to select this clip's thumbnail representation from the media library and dragging this thumbnail to the composite display area 245). As another example, a particular media clip may also be added to the composite display area as an audition clip by selecting an option from a pull-down menu (not shown) after the selection of the clip's thumbnail in the media library.

Alternatively, or conjunctively, some embodiments allow the user to first select the particular clip from the media library 240 before selecting the audition selection button 250 to add the particular clip to the composite display area. For example, in some embodiments, the user selects a particular clip and then selects the audition selection button. Also, in lieu of or in conjunction with the audition selection button 250, the GUI 200 includes in some embodiments other GUI items that can be used as a substitute for the audition selection button 250. Examples of such GUI items include menu items that are displayed in pull-down menus that are accessed by selecting and opening menus in the GUI, or that are displayed in pop-up menus that are opened through cursor control operations (e.g., right-cursor click operation or control-cursor-click operations).

Some embodiments also use the audition selection button 250 or similar GUI item to change the designation of a clip in the composite display area from a non-audition clip to an audition clip. For instance, in some such embodiments, a user can select a non-audition clip and then change its designation to an audition clip by selecting the audition selection button 250 or selecting a similar UI item in a pop-up or pull-down menu.

The audition clip 275 has been added in this example as a preview clip, as indicated by using a rectangular shape that has a different color than the rectangles used to represent the committed audio and video clips 265-270. This different color has been used to differentiate in the composite display area 245 between the graphical display representations of the committed media clips from the graphical display representation of the preview clip as described above. The different appearance of the preview and committed clips in the composite display area 245 allows the user to easily differentiate between the two types of clips in the composite display area 245. In this stage 205, while the audition feature is active, the user selects another clip from the media library 240.

The second stage 210 shows the update of the composite display area 245 and audition display area 255 after another clip has been selected from the media library 240 and added as an audition clip. As shown, the composite display area 245 displays the composite presentation with the two non-audition clips 265-270, but also with the newly-added composite-target clip 280. As shown, in this example, the newly-added composite-target clip has been positioned and trimmed such that its timeline in and out points match the timeline in and out points of the replaced clip 280. Some embodiments may position the timeline in point of the newly-added clip, but not trim the out point (i.e., the out point may vary depending on the length of the clip). In some embodiments, the decision of whether to match the timeline in and out points is made by default, while in other embodiments, the decision may be based on a user selection (e.g., a pull-down menu option), or some other criteria.

In this example, the composite-target clip 275 from the first stage 205 has been replaced in track 260 of the composite display area 245 with the newly-added composite-target clip 280. In some embodiments, the composite-target clip may not be updated when a clip is added to the audition display area 255. In some of these embodiments, the composite-target clip may be updated when a user selects the particular candidate audition clip in the audition display area 255 (e.g., by performing a left-cursor click operation over a candidate audition clip representation in the audition display area).

Although the newly-added clip 280 has replaced the previous composite-target clip 275 in the composite display area 245, both audition candidate clips are displayed in the audition display area 255. In this stage, while the audition feature is active, the user selects another clip from the media library 240.

The third stage 215 shows the update of the composite display area 245 and audition display area 255 after a third clip has been selected from the media library 240 and added as an audition clip. As above, the composite display area 245 displays the composite presentation with the two non-audition clips 265-270. In addition, the composite display area 245 displays the newly-added composite-target clip 285. The composite-target clip 280 from the second stage 210 has been replaced in track 260 of the composite display area 245 with the newly-added composite-target clip 285. However, both audition candidate clips are displayed in the audition display area 255. In this stage, while the audition feature is active, the user selects two clips (e.g., by a cursor region-select command) from the audition display area 255 and invokes playback of the preview presentation in the preview display area 235 (e.g., through a GUI item such as a play control) in order to iteratively review the presentation with each of the selected clips included in turn. In some embodiments, playback is automatically invoked whenever an audition clip is added to the composite display area 245 or the audition display area 255.

The fourth stage 220 shows the update of the audition display area 255 and composite display area 245 after two clips have been selected in the audition display area 255 and playback of the preview presentation has been invoked. As shown, the composite display area 245 displays the composite presentation with the first selected composite-target clip 275. In addition, the audition display area 255 has been updated to indicate the selection of two audition candidate clips, as shown by a selection item 290. The audition display area 255 has also been updated to indicate that the first of the selected clips is active (i.e., the first of the selected clips is currently active as the composite-target clip 275). The preview display area 235 has also been updated to reflect the content of the currently-selected composite-target clip 275.

The fifth stage 225 shows the update of the audition display area 255 and composite display area 245 after the playback of the preview presentation has transitioned from the first of two selected clips (as indicated in the audition display area 255 by the selection shape 290) to the second of the selected clips. As shown, the composite display area 245 displays the composite presentation with the second selected composite-target clip 280. In addition, the audition display area has been updated to indicate that the second of the selected clips is now active. The preview display area 235 has also been updated to reflect the content of the currently-selected composite-target clip 280.

In some embodiments, the fourth stage 220 and the fifth stage 225 may be iteratively repeated as the user reviews the preview playback displayed in the preview display area 235. In some of these embodiments, a user may select a particular range along the timeline to be iteratively displayed (i.e., the user may select a particular span along the timeline to be looped during playback). Thus, as the preview playback reaches the end of the selected range (or, alternatively, the end of the project's timeline if no range has been selected), the selected composite-target clip from the set of selected candidate audition clips (as indicated by selection item 290) is changed to the next composite-target clip in the set of selected candidate audition clips. In some embodiments, a user may manually cycle through the clips in the set of selected candidate audition clips (e.g., by selecting a UI item such as a "next" button).

In this manner, the user can use the audition feature to examine different candidate audition clips for the role of the composite-target clip in the composite display area 245, and preview each new composite-target clip in the preview of the composite presentation that is provided in the application's preview display area 235, in order to determine which, if any, of the candidate audition clips is ideal for inclusion in the composite presentation.

Although this example has been illustrated with two candidate audition clips in the set of selected candidate audition clips, the set of selected candidate audition clips may include different numbers of clips in different embodiments. Furthermore, instead of selecting multiple candidate audition clips to automatically cycle through, a user may individually select a particular candidate audition clip prior to invoking the preview playback feature. The user may then stop the preview playback, select an alternative to the particular candidate audition clip, and then re-start the preview playback.

After reviewing the preview playback in the fourth and fifth stages 220-225, and while the audition feature is still active, the user may stop the preview playback, select a particular candidate audition clip from the audition display area 255, and move the composite-target clip 280 corresponding to the selected candidate audition clip to a different location along the timeline in the composite display area 245.

The sixth stage 230 shows the update of the audition display area 255 and composite display area 245 after the user has selected a particular candidate audition clip from the audition display area 255 and moved the corresponding composite-target clip 280 to a different location along the timeline. As shown, the composite display area 245 displays the composite presentation with the selected composite-target clip 280 shifted to the right (i.e., shifted to a later time in the composite presentation). In addition, the audition display area 255 has been updated to indicate that the second candidate audition clip is now active. The preview display area 235 has also been updated to reflect the content of the currently-selected composite-target clip 280.

Although the operations described above have been described as being performed in a certain order, different embodiments may perform different sequences of operations. For instance, in some embodiments, a user may perform a playback preview operation as described above in reference to stages four and five 220-225 before adding more clips to the candidate audition clip set as described above in reference to stages two and three 210-215. As another example, a user may move a composite-target clip as described above in reference to the sixth stage 230 before performing a preview playback as described above in reference to the fourth and fifth stages 220-225.

In addition, one of ordinary skill in the art will recognize that some embodiments of the media editing application may be implemented without some of the specific details presented above. For instance, although the example above described composite-target clips as preview clips, in some embodiments a committed clip may also be classified as a composite-target clip that has an associated set of candidate audition clips.

Several more detailed embodiments of the invention are described in the sections below. Section I provides a conceptual description of the various ways to invoke and use the audition feature to create and manage individual audition clips and sets of candidate audition clips. Next, Section II describes some of the edit functions used to manipulate clips in a composite display area once they have been added to a media project and the process of converting audition clips to non-audition clips before de-invoking the audition feature. Section III describes cycling through multiple audition clips in succession. Section IV then describes the processes, data structures, and software modules used to generate a preview of the composite project. Next, Section V describes a conceptual process for using the audition feature when modifying and evaluating a media project. Section VI follows that discussion with a description of the process used to define and store the application. Lastly, Section VII describes a computer system which implements some of the embodiments of the invention.

I. Creating and Managing Audition Media

As mentioned above, some embodiments provide several different techniques for adding multiple candidate clips to an audition display area, where the multiple candidate clips are all candidates for a particular location in the project. Sub-section II.A will describe several techniques for invoking the audition feature and designating a composite-target clip by reference to FIGS. 3-13. Sub-section II.B will then describe examples of the creation of and management of a set of candidate audition clips. Next, sub-section II.C describes conceptual processes and data structures used by some embodiments to add clips to a project and/or create a set of candidate audition clips. Sub-section HD follows that discussion with an example of selecting a candidate audition clip set from a group of candidate audition clip sets that are associated with a particular location.

A. Invoking the Audition Feature

FIGS. 3-6 illustrate one example of invoking the audition feature through the use of an audition selection item 310 of a GUI 300 of a media editing application. Like the GUI 200 of FIG. 2, the GUI 300 of FIGS. 3-6 includes (1) an audition selection item 310, (2) a media library 320, (3) a preview display area 330, and (4) a composite display area 340 with several tracks (e.g., video track 350 and audio track 355) that span a timeline 360.

FIGS. 3-6 also illustrate the GUI 300 to include a menu bar 370 that provides several grouped sets of menu commands and options for the media editing application. In addition, these figures illustrate a cursor 380 for providing feedback to a user and operating various selection buttons or other controls included in the GUI 300. The cursor 380 also allows a user to select or manipulate various representations of content that are included in the GUI 300.

These figures also illustrate the composite display area 340 to include a playhead 390 for highlighting the instance in time in the composite presentation that is being represented in the composite display area. Highlighting this instance in time is useful for a variety of reasons. For instance, when viewing a preview of the composite presentation in the preview display area 330, the playhead 390 scrolls across the timeline 360 to identify the location in the composite presentation in the composite display area 340 that is being currently displayed in the preview display area 330. Furthermore, as further described below, the playhead 390 location can also act as an insertion point when adding clips or effects to the project.

In addition, these figures illustrate the GUI 300 to include an audition display area 510 for displaying representations of an associated set of candidate audition clips for a particular composite-target clip that has been selected in the composite display area 340, a track 520 that is created to receive and hold graphical representations of one or more preview composite-target clips, and an audition range selector 530 for selecting a particular span along the timeline 360 that will be displayed in the preview display area 330 when the user requests a preview playback. The implementation of the preview playback will be described in more detail in Sections III-IV below. One of ordinary skill in the art will recognize that the audition feature may be implemented using a different graphical interface, may provide more or fewer controls, etc.

Figure 3:
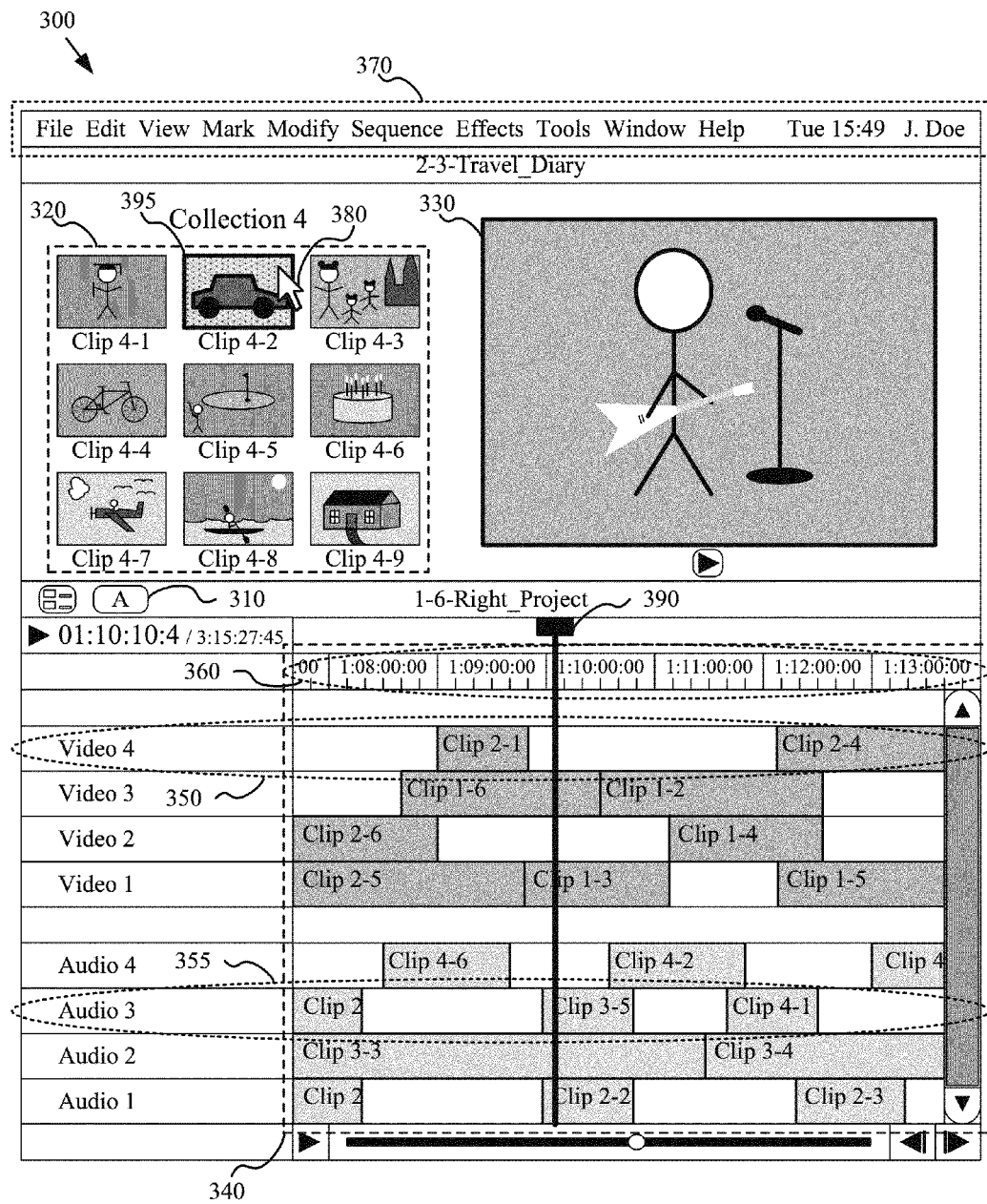
FIG. 3 illustrates the GUI of some embodiments before the audition feature has been invoked.

To illustrate the example of invoking the audition feature through the use of the audition selection item 310, FIGS. 3-6 illustrate four different stages of a user's interaction with the GUI 300. FIG. 3 illustrates a first stage that is before the audition feature has been invoked. In the first stage, the composite display area 340 displays a number of committed clips along the timeline 360. The committed clips include several audio clips and several video clips. A user might have added these clips from the media library 320, or the user might have opened a previously defined composite project that included the clips.

In this stage, as shown in FIG. 3, a user selects a particular clip 395 from the media library 320. The selection of clip 395 has been indicated by displaying a thicker border around the clip and highlighting the background of the selected clip. In some embodiments, the user selects a particular clip using a left-cursor click operation after positioning the cursor 380 over the desired clip. One of ordinary skill in the art will recognize that other operations may be used to select a particular clip from the media library 320. For instance, a user may perform a combination of keystrokes, use a hotkey to select a particular clip, etc.

Figure 4:
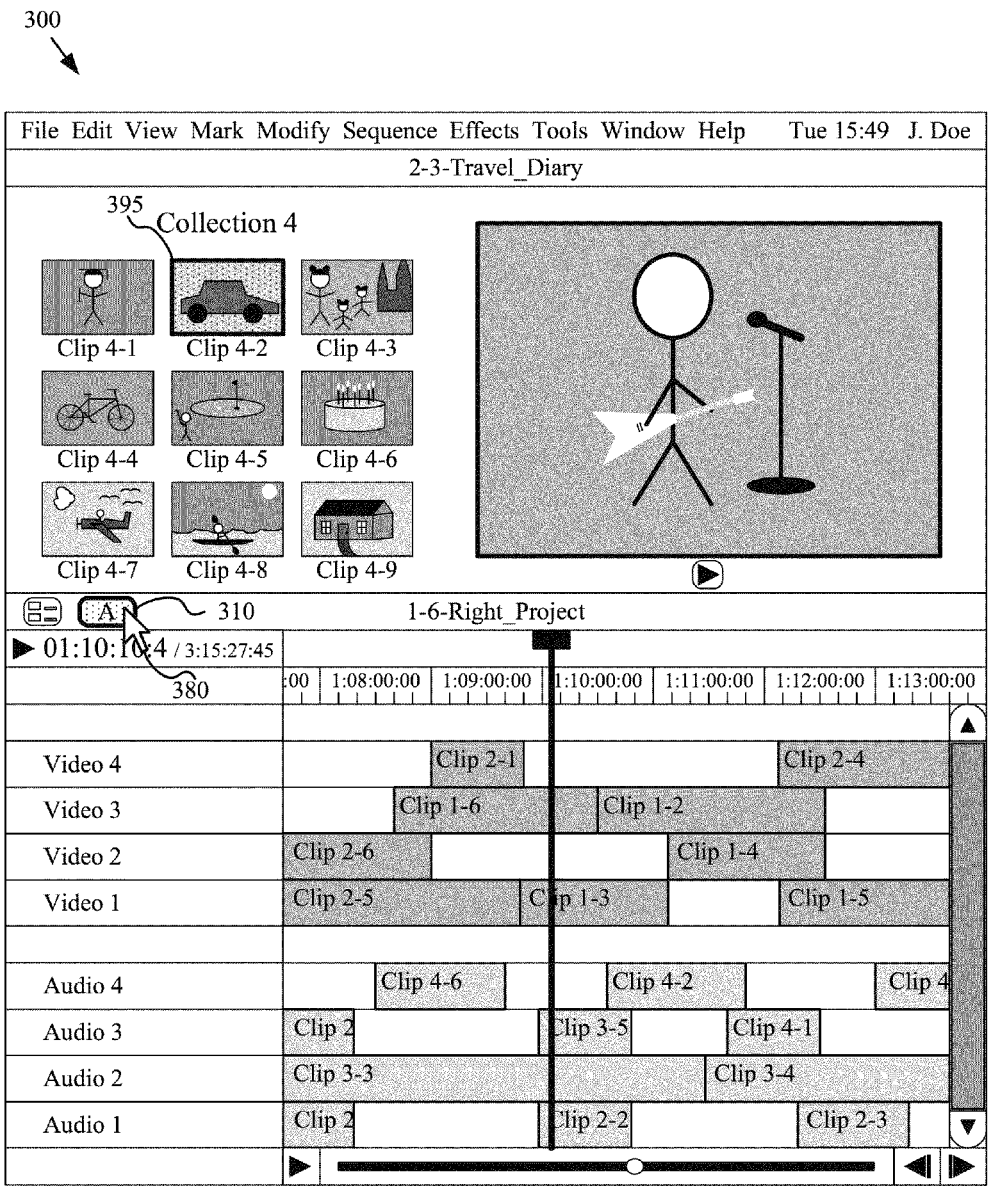
FIG. 4 illustrates the GUI of some embodiments after a user has selected a particular clip to be added to the media project as a composite-target clip.

FIG. 4 illustrates a second stage of user interaction that is after a user has selected a particular clip 395 to be added to the media project as a composite-target clip. In this stage, a user activates the audition selection item 310. As shown, the user moves the cursor 380 to a location over the audition selection item 310 and activated this item (e.g., by left-cursor click operation). The activation of the audition selection item 310 has been indicated by displaying a thicker border around the item and highlighting the background of the item.

Figure 5:
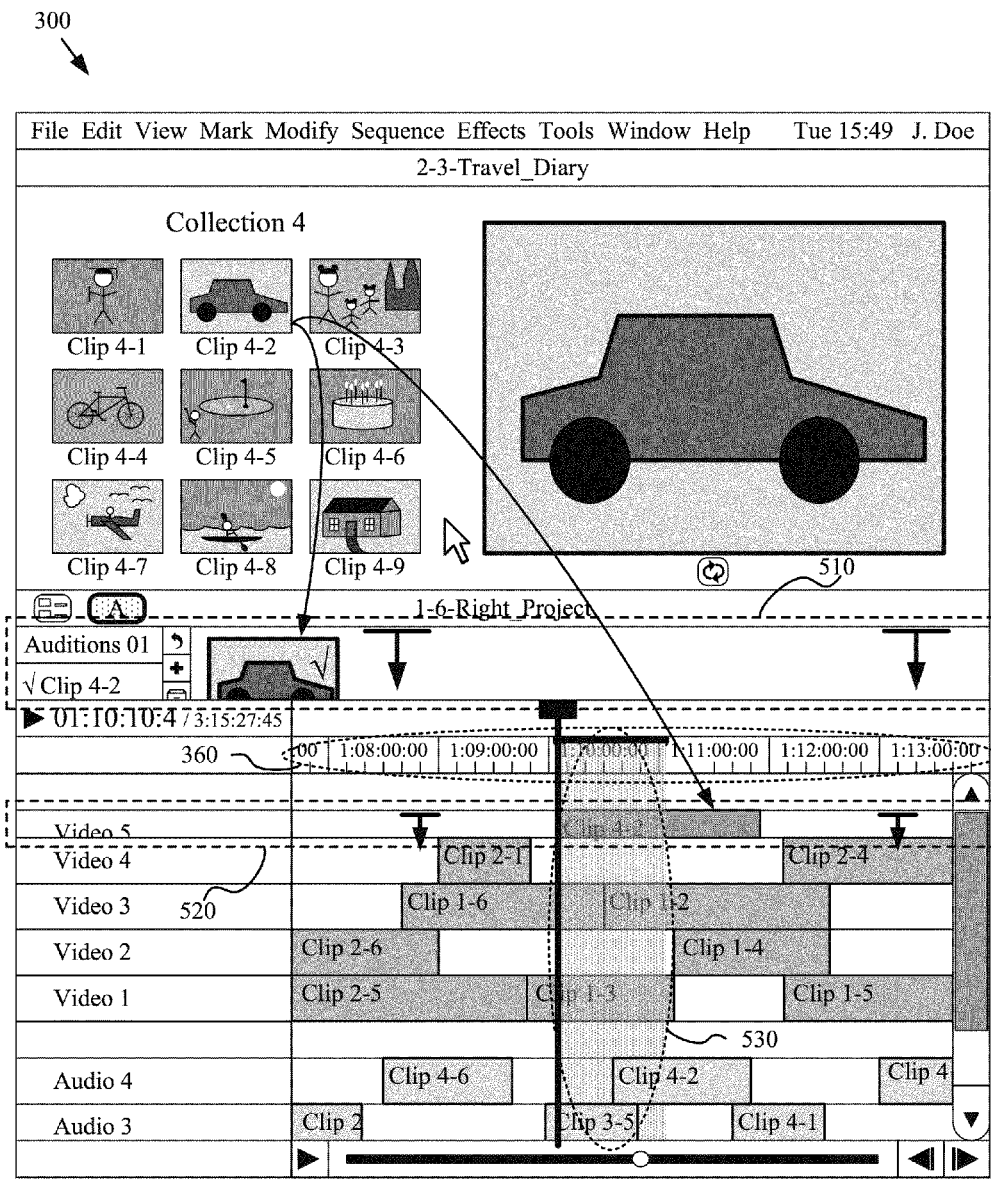
FIG. 5 illustrates the GUI after a user has activated the audition feature and the audition feature has been partially invoked.

FIG. 5 illustrates a third stage of user interaction that is after a user has activated the audition feature and the audition feature has been partially invoked. As shown, this activation has caused the partial display of the audition display area 510 and the new track 520 in the GUI 300 of some embodiments. In some embodiments, a new track is created whenever a user has not previously selected an existing track on which to place the audition clip.

The audition display area 510 will be described in more detail in sub-section I.B below. In addition, the activation of the audition feature has invoked the display of the audition range selector 530. The audition range selector defines a span along the timeline 360 to be played when a user invokes the preview playback of the composite presentation. The audition range selector and its use during preview playback will be described below in Section III.

Figure 6:
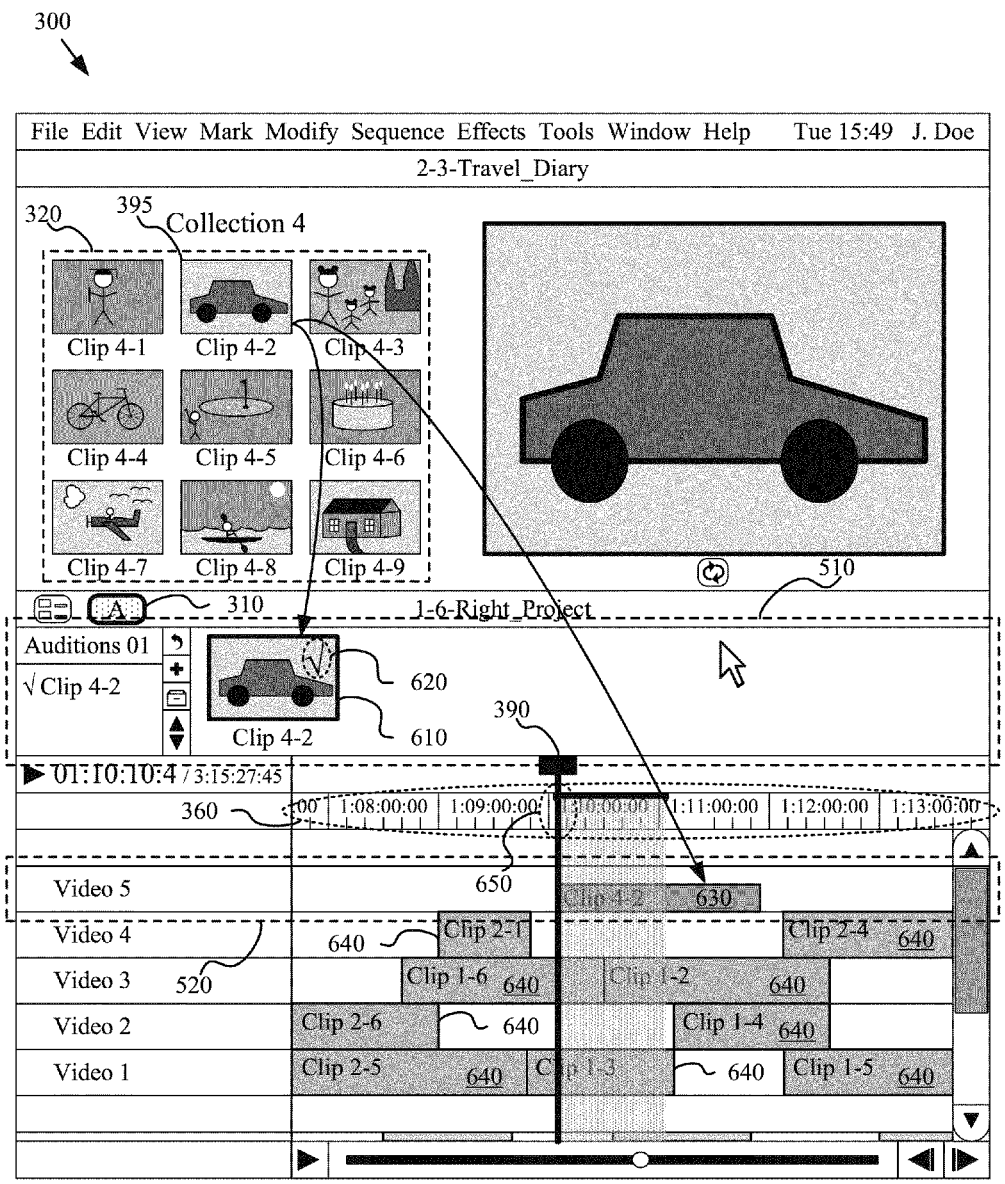
FIG. 6 illustrates the GUI after the audition feature of some embodiments has been fully invoked.

FIG. 6 illustrates a fourth stage of user interaction that is after the audition feature of some embodiments has been fully invoked. As shown, the selected clip 395 has been added to the fully-displayed audition display area 510 and track 520. The audition clip 610 is represented as a thumbnail image in the audition display area 510. The audition clip 610 is shown with a bold border and a mark 620 indicating that the audition clip 610 has been selected as the composite-target clip. The composite-target clip 630 is represented in track 520 as a half-height rectangle with a different color than the committed clips 640 to indicate that the clip 630 is a preview audition clip. However, different embodiments may differentiate between preview and committed clips (and/or audition and non-audition clips) in different ways, as described below.

In this example, the audition display area 510 is represented as a window pane within the GUI 300. In different embodiments, the audition display area may be represented in different ways. For instance, the audition display area may be represented as a separate window, as a list of media, etc. In addition, different embodiments may implement the functionality provided by the audition display area in various ways. For instance, the audition display area functionality (e.g., selection of a particular audition clip within a set) may be provided by a pop-up or drop-down window, by a window in a menu or sub-menu item, etc.

One of ordinary skill in the art will realize that, in addition to invoking the audition feature using the audition selection item 310, the audition feature may be invoked in various different ways. For instance, a user may double-click a preview clip or committed clip that has a set of associated audition clips in order to invoke the audition tool of some embodiments. Once the audition tool has been invoked, a user may perform different operations during the resulting audition session. For instance, during an audition session a user may create a new audition set, delete an audition set, and/or modify an audition set.

Figure 7:
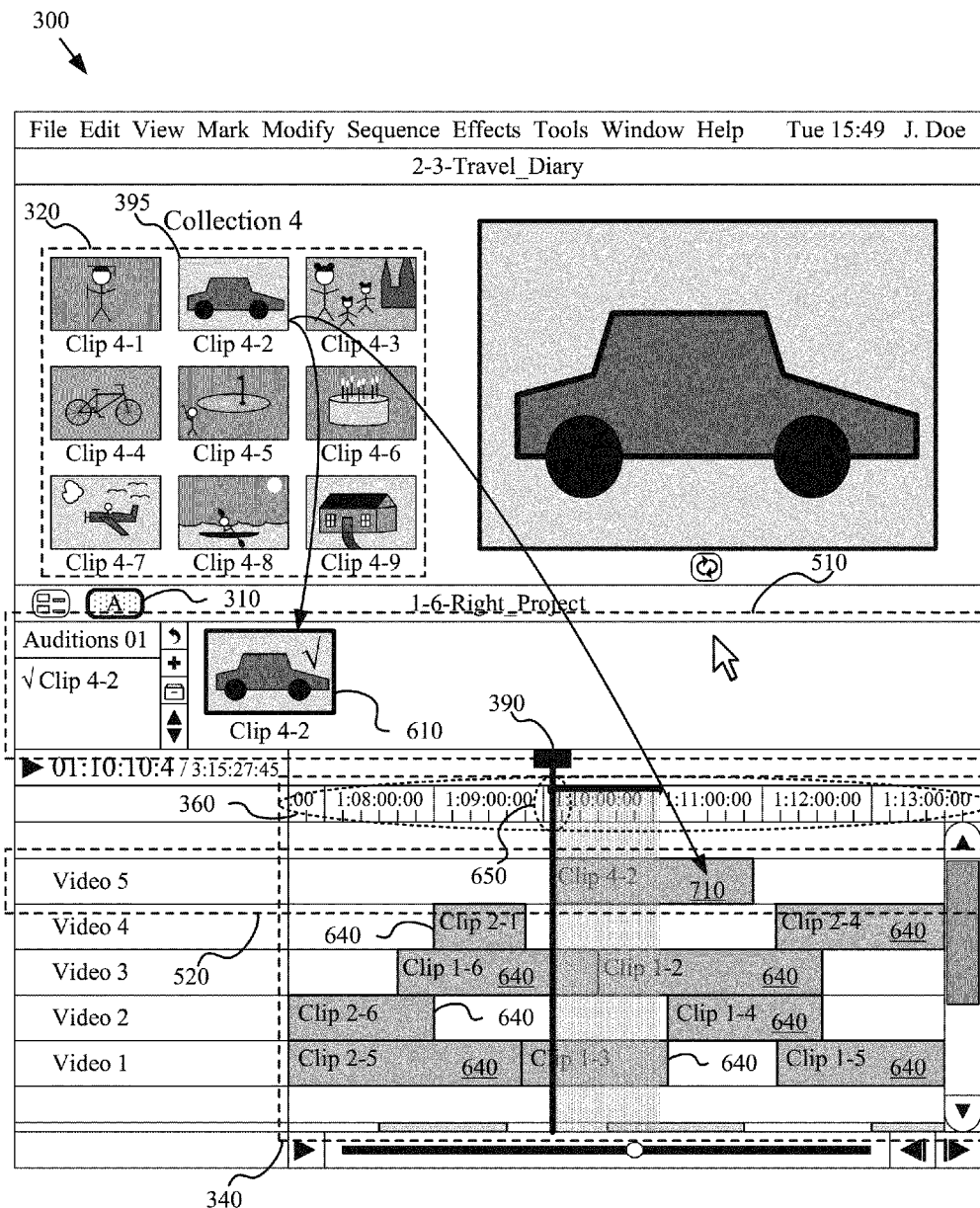
FIG. 7 illustrates an alternative to the fourth stage of user interaction shown in FIG. 6 that is after the audition feature of some embodiments has been fully invoked and the audition clip is added as a committed clip.

FIG. 7 illustrates an alternative to the fourth stage of user interaction shown in FIG. 6 that is after the audition feature of some embodiments has been fully invoked. As above, the selected clip 395 has been added to the fully-displayed audition display area 510 and track 520. As shown, the audition clip 610 is represented as a thumbnail image in the audition display area 510. The composite-target clip 710 is represented in track 520 as a rectangle, similar to the non-audition clips 640. In this example, the audition clip 710 is represented as a rectangle with the same color as the committed clips 640 to indicate that the clip 710 is a committed audition clip. As above, different embodiments may differentiate between audition and committed clips in different ways, as described below.

In some embodiments, a composite-target clip may initially be placed in the composite display area 340 as either a committed clip or a preview clip. The determination of whether to add a composite-target clip as a committed or preview clip may be made by default (e.g., all clips may initially be added as preview clips), using some decision algorithm (e.g., clips that don't overlap committed clips are initially placed as committed clips, while clips that overlap committed clips are initially placed as preview clips), or by user selection (e.g., the user is presented with a contextual pop-up menu that queries the user as to whether the clip should be added as a composite clip or a preview clip).

Furthermore, some embodiments may include various display representations to differentiate between committed clips, audition clips, preview clips, and/or their various combinations. For instance, in some embodiments, committed clips may be represented as rectangles of a first color, audition clips as rectangles of a second color and preview clips as half-height rectangles of either the first (when the preview clip is a non-audition clip) or second color (when the preview clip is also an audition clip). As another example, committed clips may be represented as rectangles, audition clips as rectangles with an associated marker, and preview clips as half-height rectangles (with or without a marker). In addition, some embodiments may further differentiate between types of clips (e.g., audio versus video clips) using some variation of appearance (e.g., different colors, fill patterns, shapes, etc.).

In the examples of FIGS. 6-7, the composite-target clip (630 or 710) has been inserted at a location 650 defined by the playhead 390. A user may select a particular track and position the playhead at a particular location along the timeline 360 before invoking the audition feature using the audition selection item 310 in some embodiments, thus selecting a particular location in the particular track to insert a composite-target clip. Different embodiments may select the location to insert a particular composite-target clip differently. For instance, a user may perform a drag-and-drop operation to select a clip from the media library 320 and then place the composite-target clip at a particular location in the composite display area 340. Alternatively, a user may select a pull-down or pop-menu command to insert a composite target clip, or use some other appropriate method (e.g., a series of keystrokes, a succession of cursor operations, etc.).

Figure 8:
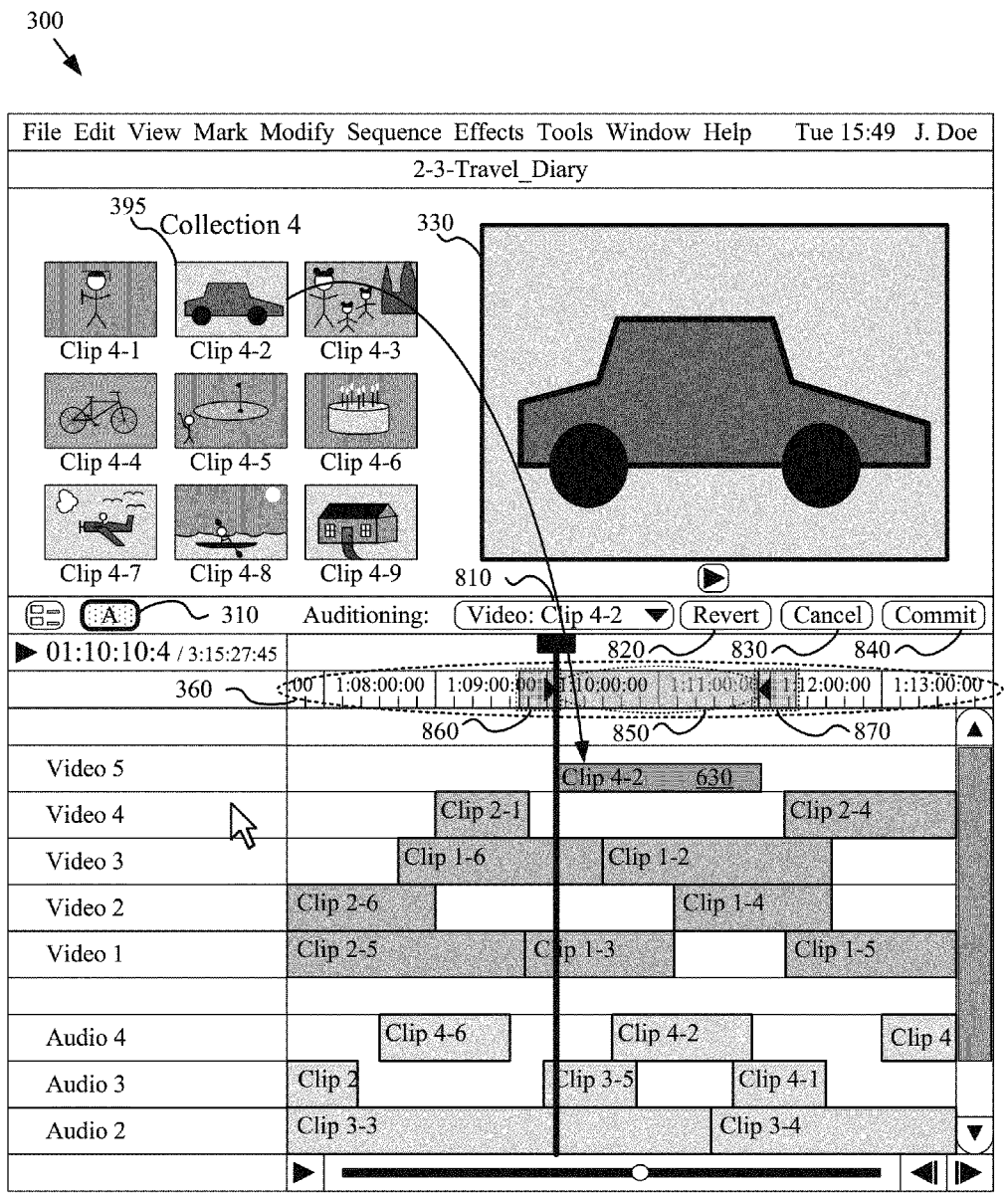
FIG. 8 illustrates the GUI after an alternative audition feature of some embodiments has been invoked.

FIG. 8 illustrates an alternative audition feature of some embodiments. In contrast to the examples of FIG. 6-7, the audition feature of some embodiments does not automatically invoke an audition display area. As shown in FIG. 8, the audition feature of some embodiments includes GUI items such as a pull-down list 810 for choosing a particular candidate audition clip as a composite-target clip, several selection items 820-840 for reverting, cancelling, and committing preview and/or audition edits, and an alternative audition range selector 850 with pre-roll and post-roll segments 860 and 870 for selecting a particular span along the timeline 360 that will be displayed in the preview display area 330 when the user requests a preview playback. The implementation of the preview playback will be described in more detail in Section III-IV below.

The pull-down list 810 of some embodiments may include a list of several candidate clips for a particular target location in the composite display area 340. A user may select a particular clip from the list of candidate audition clips in the pull-down list 810. This selection may cause the composite-target clip to be updated in some embodiments. In addition, when the audition display area has been invoked, the selection of a clip from the drop-down list may cause the clip's representation in the composite display area to be updated. The operation of the pull-down list 810 will be described in more detail below in reference to FIGS. 14-15 and 30-32.

The selection items 820-840 allow a user to perform certain edit operations. For instance, the "revert" selection item 820 may return the media project to it state before the user made any audition or preview edits. The "cancel" selection item 830 may allow a user to cancel audition or preview edit operations while keeping non-preview and/or non-audition edit operations (e.g., if a user has made preview and/or audition edits and also trimmed or moved a committed clip, the preview and/or audition edits would be undone but the changes to the committed clip would not be undone). The "commit" selection item 840 may allow a user to commit an audition or preview edit to the project. One of ordinary skill in the art will recognize that different embodiments may include different radio selection items.

The alternative audition range selector 850 performs the same function and provides user feedback in a similar manner to audition range selector 530. In the example of FIG. 8, the alternative audition range selector 850 has been sized and placed to match the length and position along the timeline 360 of the composite-target clip 630. In addition, the pre-roll 860 and post-roll 870 segments have been added to the begin and end points of the alternative audition range selector 850. In some embodiments, the alternative audition range selector 850 may be positioned and sized automatically (e.g., to match the size and position of the composite-target clip), while in other embodiments a user may position or size the alternative audition range selector 850 using a cursor-control operation, a series of keystrokes, or some other appropriate method. The pre and post-roll segments 860-870 may similarly be generated automatically in some embodiments. In some of these embodiments, the length of the pre and post-roll segments 860-870 will be a function of the length of the composite-target clip. In other embodiments, a user may define the pre and post-roll segments using a cursor-control or other appropriate operation. In still other embodiments, the pre and post-roll segments may be set to a default length.

In some embodiments, the audition feature causes a preview playback to be automatically displayed in the preview display area 330 when a user adds an audition clip to a project. In some of these embodiments, the playback would begin at the begin point determined by the pre-roll segment 860 and continue until the end point determined by the post-roll segment 870. In other embodiments, a user must make a selection of a playback control (e.g., a "play" button of the GUI 300) in order to initiate playback of the area defined by the alternative audition range selector 850 and the pre and post-roll segments 860-870.

Figure 9:
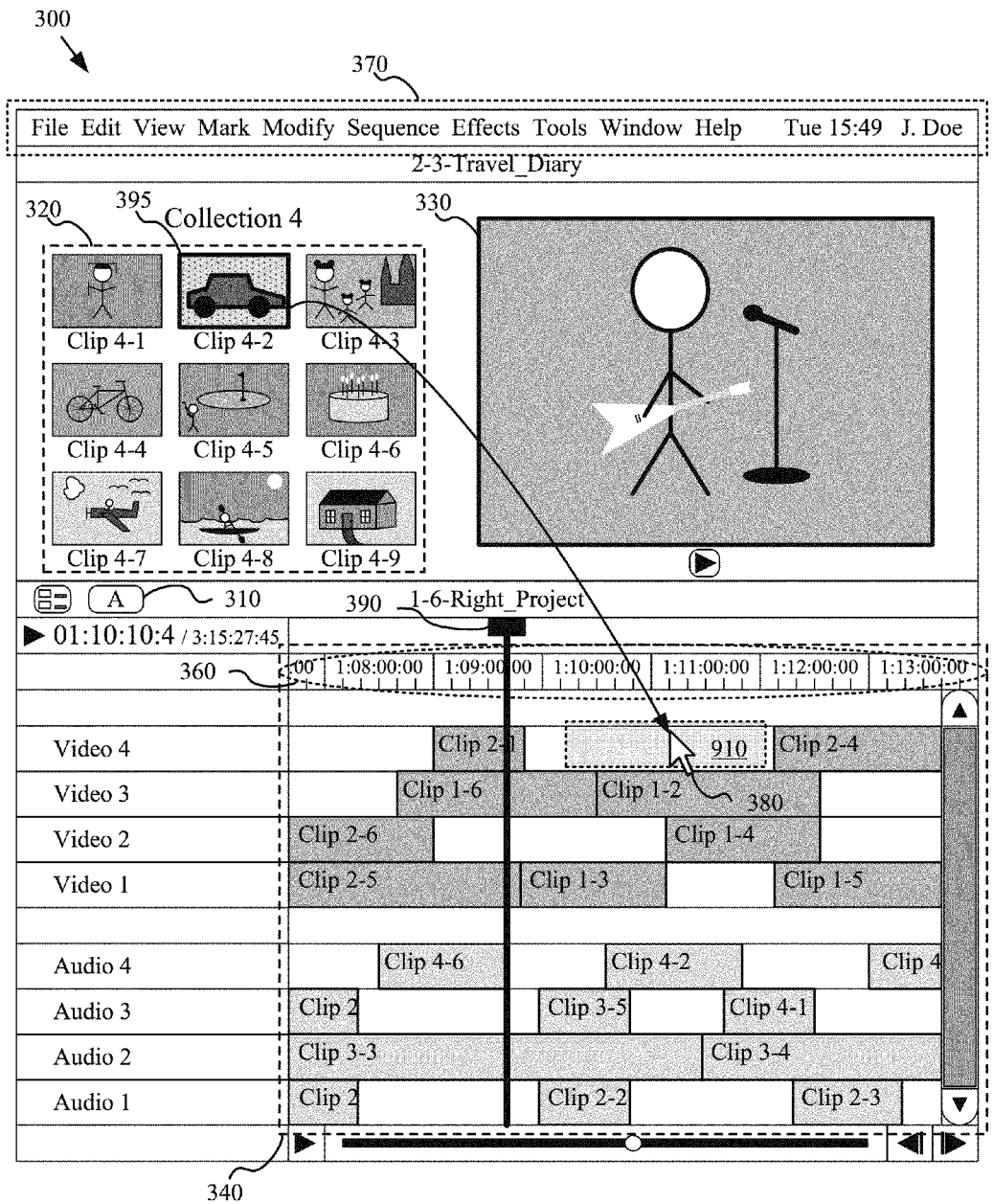
FIG. 9 illustrates the GUI of some embodiments before the audition feature has been invoked.
Figure 10:
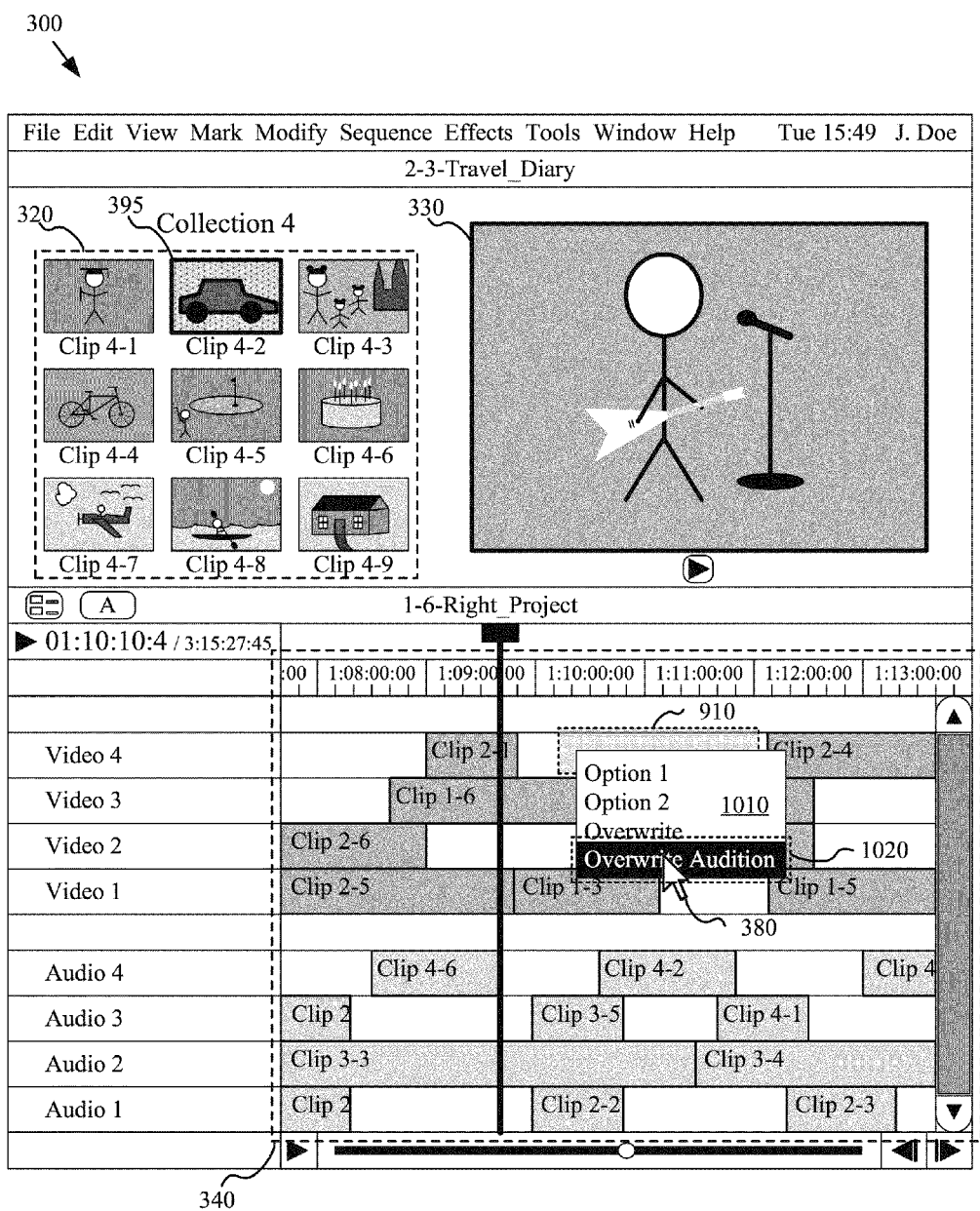
FIG. 10 illustrates the GUI of some embodiments after a user has selected a particular clip and positioned the clip over a particular location in the composite display area.
Figure 11:
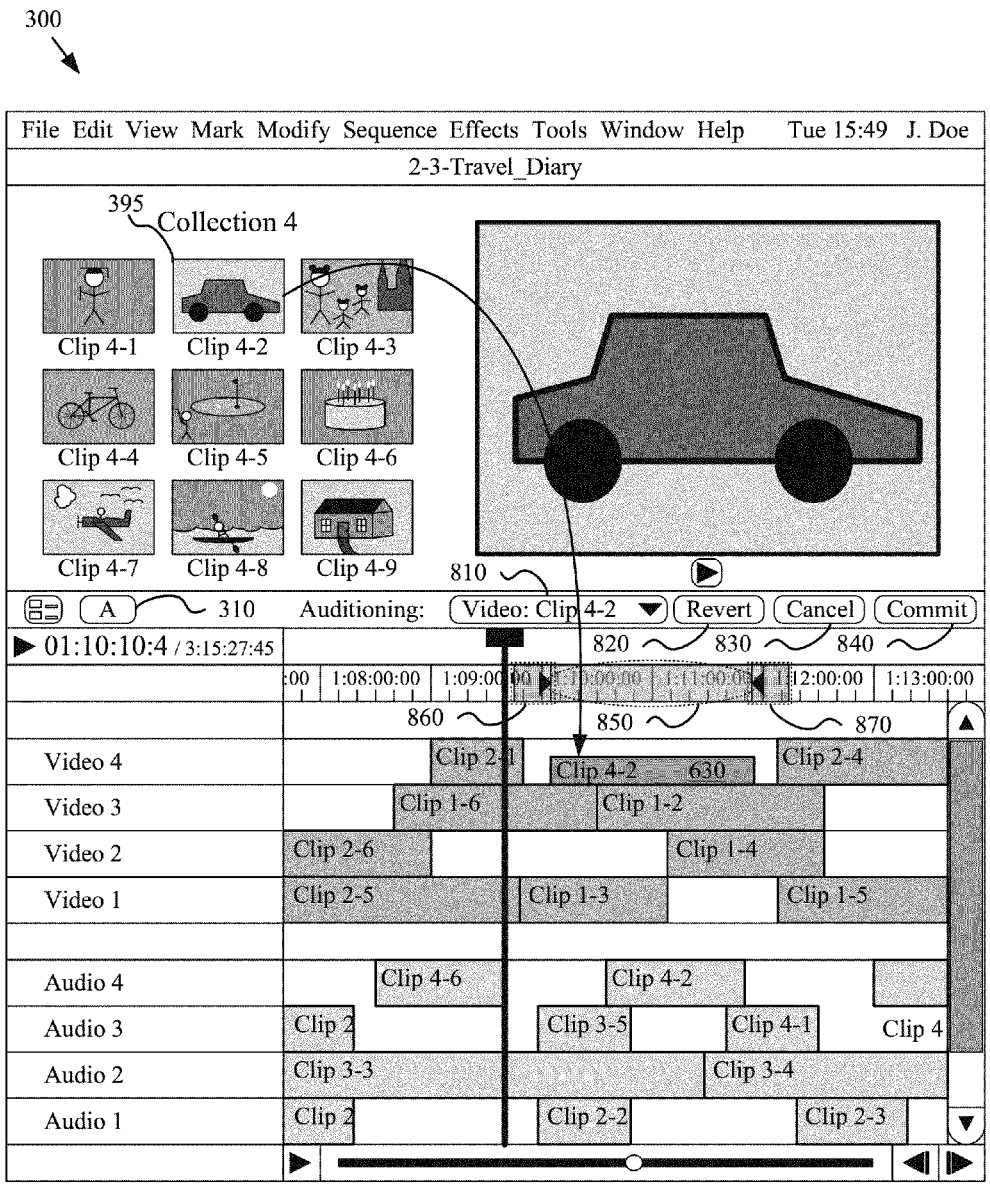
FIG. 11 illustrates the GUI after the alternative audition feature of some embodiments has been invoked.

FIGS. 9-11 illustrate another technique for invoking the audition feature and designating a composite-target clip. In the example of FIGS. 9-11, a user drags a media clip to a location in the composite display area 340 and invokes a contextual menu using the GUI 300 of some embodiments to perform a series of cursor operations. The GUI 300 is the same GUI 300 described above in reference to FIGS. 3-8. Also, to illustrate the example of invoking the audition feature through the use of a drag-and-hold operation, FIGS. 9-11 explain three different stages of a user's interaction with the GUI 300.

FIG. 9 illustrates a first stage that is before the audition feature has been invoked. In the first stage, the composite display area 340 displays a number of committed clips along the timeline 360. The committed clips include several audio clips and several video clips. A user might have added these clips from the media library 320, or the user might have opened a previously defined composite project that included the clips.

In this stage, as shown in FIG. 9, a user selects a particular clip 395 from the media library 320 and drags the clip to a location in the composite display area 340. The selection of clip 395 has been indicated by displaying a thicker border around the clip and highlighting the background of the selected clip. In some embodiments, the user selects a particular clip using a left-cursor click operation after positioning the cursor 380 over the desired clip. One of ordinary skill in the art will recognize that other operations may be used to select a particular clip from the media library 320. For instance, a user may perform a combination of keystrokes, use a hotkey to select a particular clip, etc. In addition, the clip 910 is shown in the composite display area 340 as being semi-transparent to indicate that the user has not released the left-cursor (i.e., the clip has not been "dropped" into the composite display area, and is merely "hovering" at a particular location).

FIG. 10 illustrates a second stage of user interaction after the user has selected and dragged a clip to a location over the composite display area 340 using the cursor 380. As shown, this select-and-drag operation has invoked a contextual pop-up menu 1010 of some embodiments. In some embodiments, a pop-up menu is invoked whenever the user drags a clip to a location over the composite display area 340 and does not release the cursor within a certain time. The pop-up menu 1010 of this example is represented as having particular options and/or commands, but one of ordinary skill in the art will recognize that different embodiments may include different menu options and/or commands. In addition, the contextual pop-up menu of some embodiments may include different menu options and/or commands based on other factors such as location within the composite display area 340, a combination of keystrokes performed by a user before dragging a clip over the composite display area 340, etc.

In this stage, the user selects the "overwrite audition" option 1020 from the pop-up menu 1010 to add the clip 910 to the composite project as an audition clip. The user makes this selection by moving the cursor 380 to a location over the desired menu option 1020 and performing a left-cursor click operation (after having released the left-cursor once the pop-up menu 1010 was invoked). As shown, moving the cursor 380 over the overwrite audition option 1020 has caused a change in the graphical representation of the option relative to the other options or commands in the pop-up menu 1010. The selected option may be indicated in various ways, such as a bold outline, a change in background, a change in color, etc. In some embodiments, such an option may also be selected through any number of other techniques, such as a combination of keystrokes, a pull-down menu selection, etc.

FIG. 11 illustrates a third stage of user interaction that is after an alternative audition feature of some embodiments has been invoked. As shown, the selected clip 395 has been added to track 350. The composite-target clip 630 is represented in track 350 as a rectangle, similar to the non-audition clips. In this example, the audition clip 630 is a committed audition clip. As such, the audition clip is represented as a rectangle that is the same height as that representing the committed clips, but with a different color than the committed clips. However, different embodiments may differentiate between preview and committed clips in different ways, as described above. Alternatively, different embodiments may initially place the composite-target clip 630 in the composite display area 340 as a preview clip, as described above.

Figure 12:
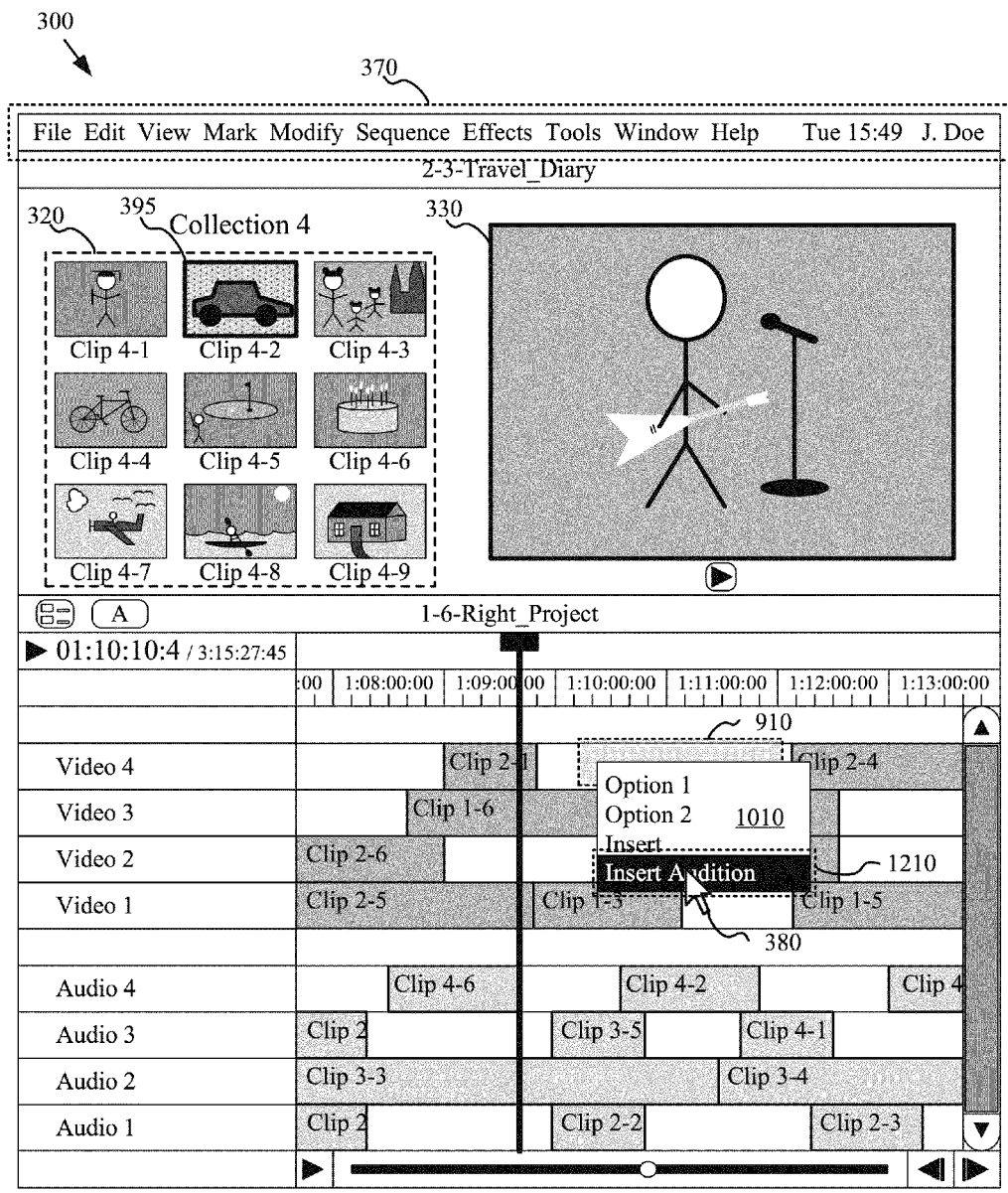
FIG. 12 illustrates the GUI of some embodiments after a user has selected and dragged a clip to a location over the composite display area using the cursor as described above in reference to FIG. 9.
Figure 13:
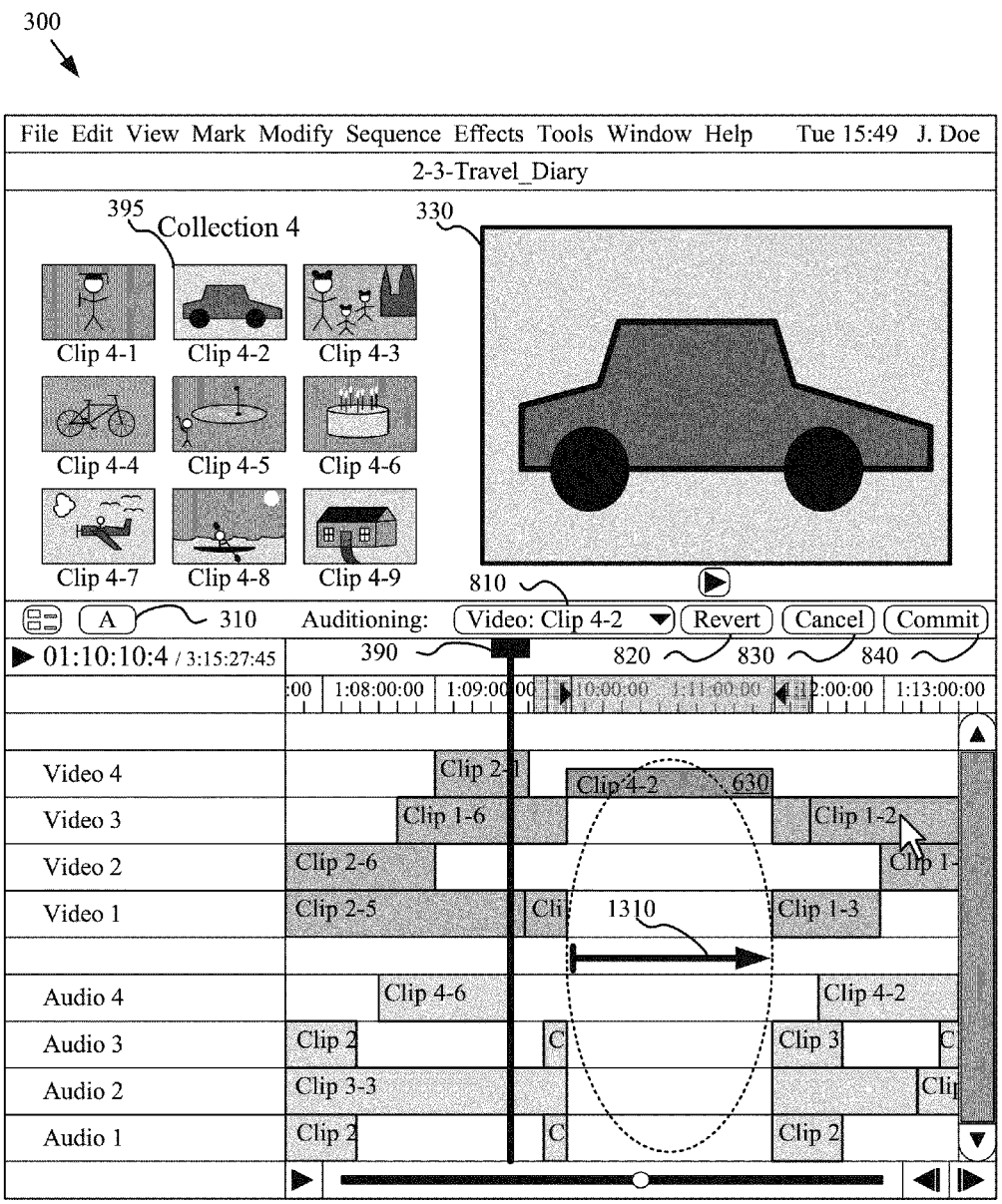
FIG. 13 illustrates the GUI of some embodiments after an alternative edit style of some embodiments has been invoked when adding an audition clip.

FIGS. 12-13 illustrate applying an alternative edit style when invoking the audition feature and designating a composite-target clip using a drag-and-hold operation in some embodiments. In the example of FIGS. 12-13, a user drags a media clip to a location in the composite display area 340 and invokes a contextual menu using the GUI 300 of some embodiments to perform a series of cursor operations. The GUI 300 is the same GUI 300 described above in reference to FIGS. 3-11. Also, to illustrate the example of an alternative edit style when invoking the audition feature through the use of a drag-and-hold operation, FIGS. 12-13 explain two different stages of a user's interaction with the GUI 300 that follow a first stage described above in reference to FIG. 9.

FIG. 12 illustrates a second stage of user interaction after the user has selected and dragged a clip to a location over the composite display area 340 using the cursor 380 as described above in reference to FIG. 9. As shown, this select-and-drag operation has invoked a contextual pop-up menu 1010 of some embodiments. The pop-up menu 1010 of this example is represented as having different options and/or commands than the example of FIG. 9. As described above, different embodiments may include various different menu options. In addition, some embodiments may include additional menu options (e.g., through access to sub-menus), that allow a user to access various other options and commands or sub-options and sub-commands.

In this stage, the user selects the "insert audition" command 1210 from the pop-up menu 1010 to add the clip 910 to the composite project as an audition clip. The user makes this selection by moving the cursor 380 to a location over the desired menu option 1210 and performing a left-cursor click operation (after having released the left-cursor once the pop-up menu 1010 was invoked). As shown, moving the cursor 380 over the "insert audition" command 1210 has caused a change in the graphical representation of the option relative to the other options or commands in the pop-up menu 1010. The selected option may be indicated in various ways, such as a bold outline, a change in background, a change in color, etc. In some embodiments, such an option may also be selected through any number of other techniques, such as a combination of keystrokes, a pull-down menu selection, etc.

FIG. 13 illustrates a third stage of user interaction that is after an alternative edit style of some embodiments has been invoked when adding an audition clip. As shown, the selected clip 395 has been added to track 350. The audition feature is represented using the same elements as described above in reference to FIG. 8. In contrast to the example of FIG. 8, which used an overwrite edit style, the insert edit style has caused all previously-existing clips to be shifted by an amount 1310 equal to the length of the inserted clip 630. In addition to overwrite and insert edit styles, a user may add an audition clip using various other edit styles. These edit styles may include, for example, an "exchange" edit style (where a clip is automatically positioned and trimmed to match an existing clip's length and timeline position), a "replace" edit style (where a clip is trimmed and positioned to match a portion of an existing clip), and/or a "superimpose" edit style (where a clip is moved to a separate track).

In addition to the ways described above in reference to FIGS. 3-13, other embodiments may invoke the audition feature using a variety of different methods. For instance, a combination of keystrokes, use of hotkeys, or another appropriate method (e.g., selecting a pull-down or pop-up menu command) may be used to select and insert an audition clip into a particular location of the timeline.

Figure 14:
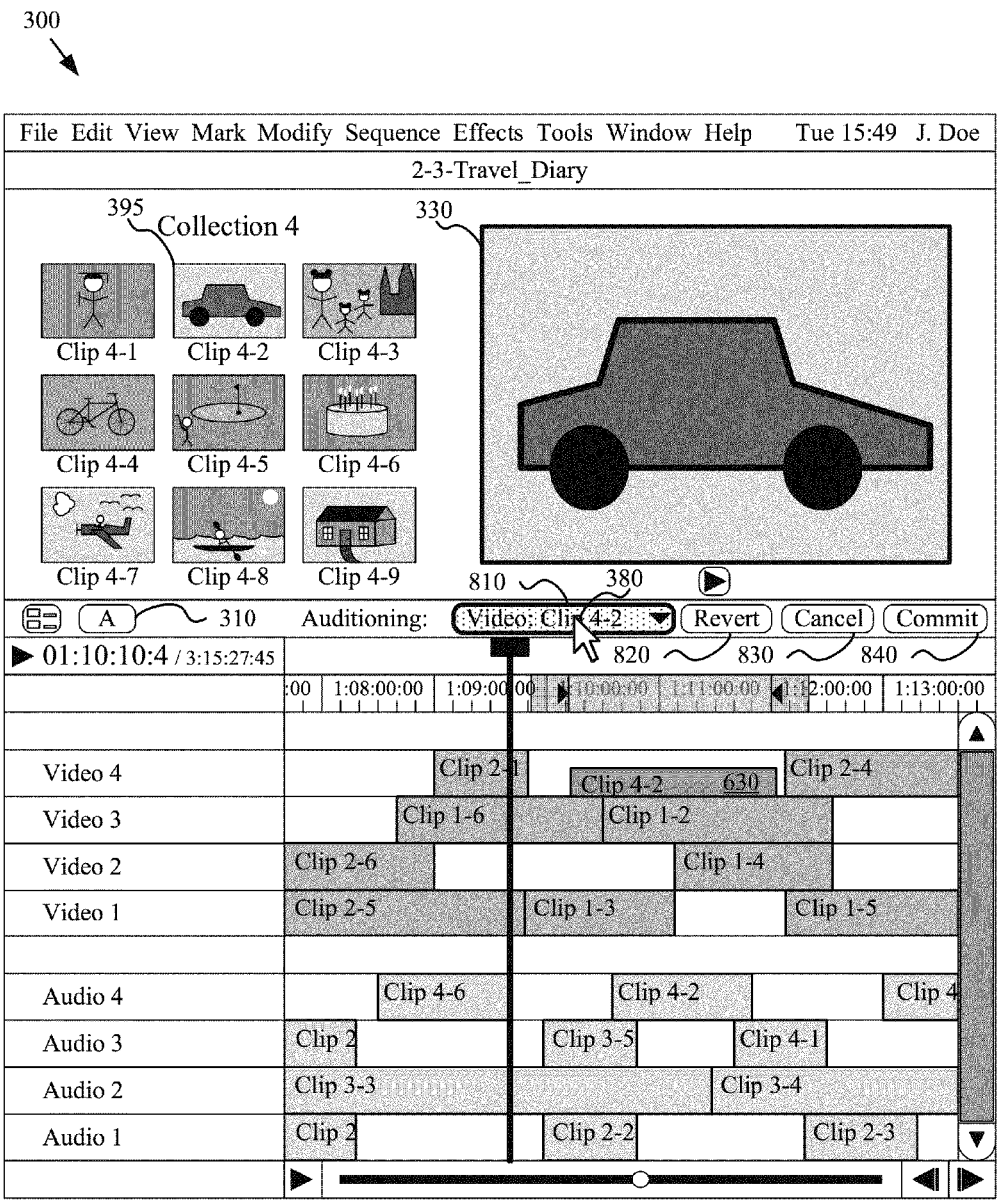
FIG. 14 illustrates the GUI of some embodiments after the alternative audition feature of some embodiments has been invoked.
Figure 15:
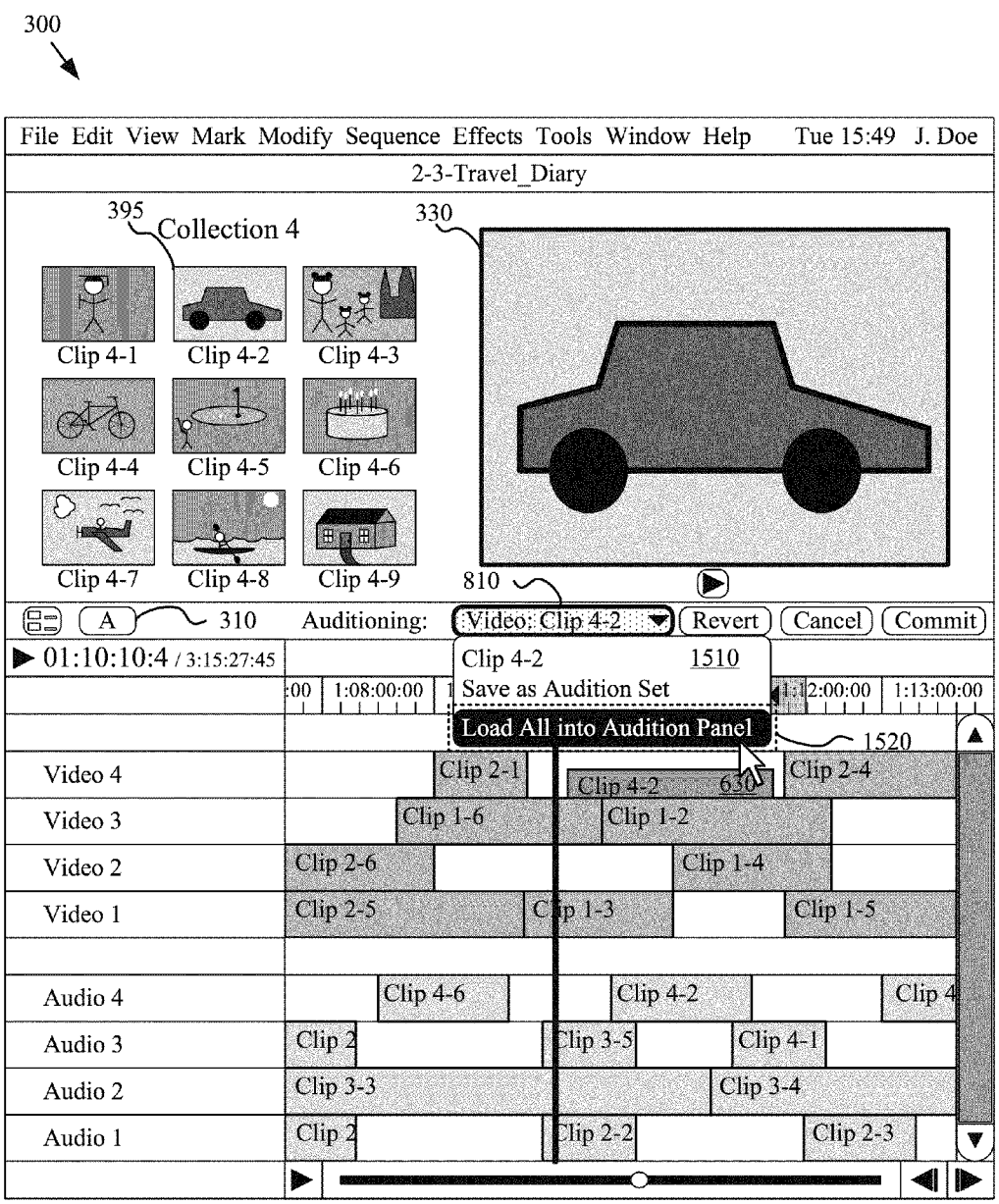
FIG. 15 illustrates the GUI of some embodiments after the user has activated a pull-down list selection item using a cursor selection operation.

FIGS. 14-15 illustrate using an alternative interface to invoke the audition display area of some embodiments. In the example of FIGS. 14-15, a user activates a pull-down list 810 in order to load a set of clips to the audition display area. The GUI 300 is the same GUI 300 described above in reference to FIGS. 3-13. Also, to illustrate the example of invoking the audition display area through the use of a pull-down list 810, FIGS. 14-15 explain two different stages of a user's interaction with the GUI 300.

FIG. 14 illustrates a first stage that is after the alternative audition feature of some embodiments has been invoked. A user might have invoked the alternative audition feature in a similar manner to that described above in reference to FIGS. 9-11.

In this stage, as shown in FIG. 14, a user activates the pull-down list selection item 810 using a cursor selection operation. This activation has been indicated by displaying a thicker border around the pull-down list selection item 810 and highlighting the background of the selection item. In some embodiments, the user activates the pull-down list using a left-cursor click operation after positioning the cursor 380 over the desired clip. One of ordinary skill in the art will recognize that other operations may be used to activate the pull-down list selection item 810. For instance, a user may perform a combination of keystrokes, use a hotkey to select a particular clip, etc.

FIG. 15 illustrates a second stage of user interaction after the user has activated the pull-down list selection item 810 using a cursor selection operation. As shown, a drop-down list 1510 has been displayed over the composite display area 340. The drop-down list 1510 of this example is represented as having particular options and/or commands, but one of ordinary skill in the art will recognize that different embodiments may include different options and/or commands.

In this stage, the user selects the "load all into audition panel" option 1520 from the drop-down list 1510 to load the various clips in the drop-down list into the audition display area of some embodiments. The user makes this selection by moving the cursor 380 to a location over the desired list option 1520 and performing a left-cursor click operation. As shown, moving the cursor 380 over the load all into audition panel option 1520 has caused a change in the graphical representation of the option relative to the other options or commands in the drop-down list 1510. The selected option may be indicated in various ways, such as a bold outline, a change in background, a change in color, etc. In some embodiments, such an option may also be selected through any number of other techniques, such as a combination of keystrokes, a pop-up menu selection, etc.

The resulting audition display area 510, after the user has selected the "load all into audition panel" option 1520 is the same as shown in FIG. 6. As shown in FIG. 6, the audition display area 510 has been invoked and the clip 610 is shown in the audition display area 510. The clip shown in the audition display area is the same clip that was listed in the drop-down list 1510 of FIG. 15. By invoking the "load all into audition panel" option 1520, a user is thus able to invoke the audition display area 510.

For purposes of simplicity and clarity, many of the examples that follow are described using the GUI 300 including the audition feature elements as shown in FIG. 6 (e.g., an audition feature that includes an audition display area 510, an audition range selector 530, etc.). One of ordinary skill will recognize that the GUI 300 including the audition feature elements as shown in FIG. 8 may alternatively be used to perform the same or similar functions, operations, etc., as are described below in reference to the GUI elements as presented in FIG. 6.

In addition, for purposes of clarity, many of the examples below use video clips to illustrate the audition feature. One of ordinary skill in the art will recognize that the operations performed using video clips may also be performed using audio clips or other types of media (e.g., photos).

B. Creating Sets of Audition Clips

FIGS. 16-32 illustrates various example ways of creating a set of candidate audition clips in some embodiments. After describing the examples of FIGS. 16-32, a process for creating a set of candidate audition clips will be described in sub-section II.C, below. In addition, a conceptual set of data structures used to implement the operations described in reference to FIGS. 16-32 will be described below in sub-section II.C.

In the example of FIGS. 16-22, after invoking the audition feature, several media clips are added to the set of candidate audition clips using the GUI 300 by performing a series of cursor operations. The GUI 300 is the same GUI 300 described above in reference to FIGS. 3-15. Also, to illustrate the example of adding clips to the set of candidate audition clips through the use of cursor operations, FIGS. 16-22 explain seven different stages of a user's interaction with the GUI 300.

Figure 16:
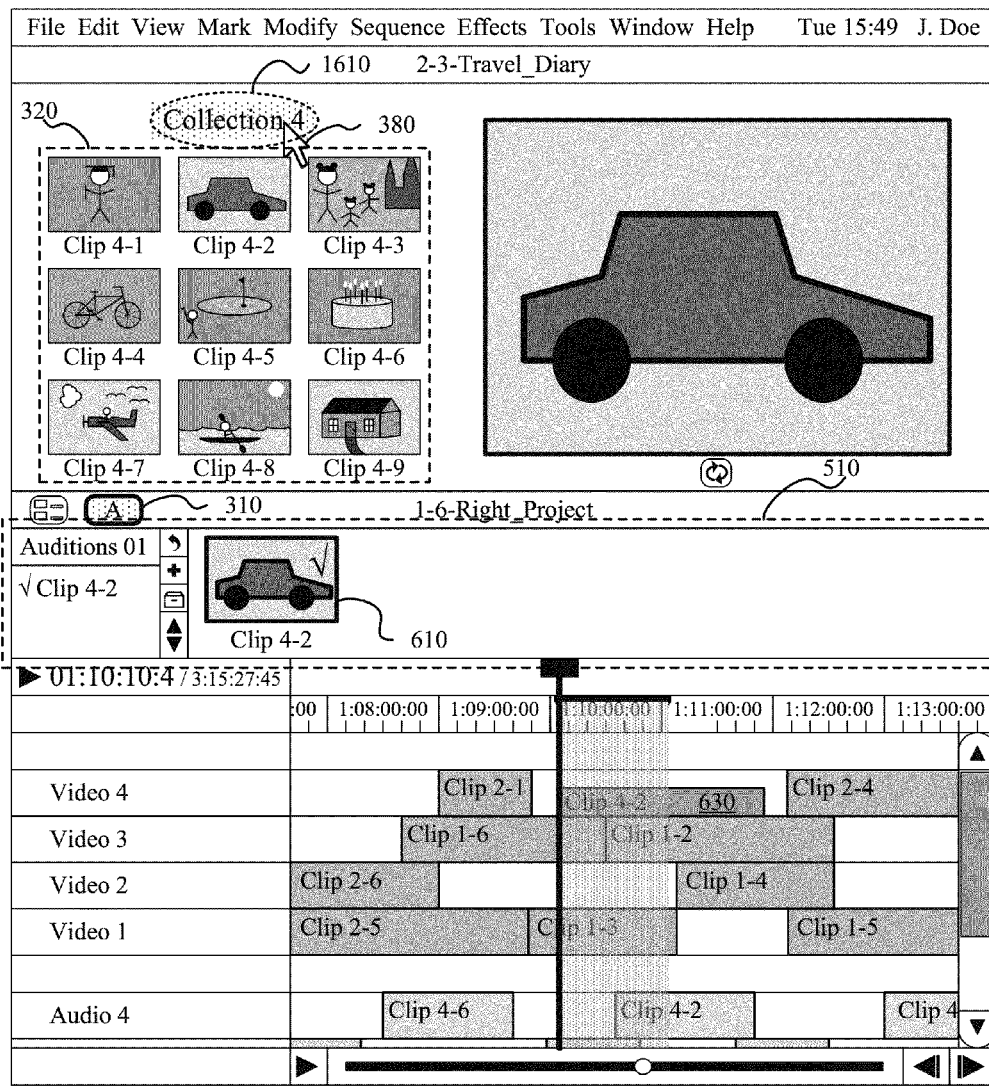
FIG. 16 illustrates the GUI of some embodiments after the audition feature has been invoked, and an audition clip has been added to the set of candidate audition clips.

FIG. 16 illustrates a first stage that is after the audition feature has been invoked, and an audition clip has been added to the set of candidate audition clips. The invocation of the audition feature may have been performed in a similar manner to that described above in reference to FIGS. 3-6. In addition, the audition clip may have been inserted into the composite display area 340 (represented as candidate audition clip 610) and the audition display area 510 (represented as composite-target clip 630) as described above in reference to FIGS. 3-6. In this stage, a user selects an alternative collection of clips to be displayed in the media library 320.

As shown in FIG. 16, a user may position the cursor 380 at a particular location of the GUI 300, before performing a left-cursor click operation to activate a media library selection control 1610 in order to select a different collection of clips to be displayed in the media library 320. As shown, this activation operation has caused a change in the graphical representation of the media library selection control 1610. This activation may be indicated in various ways, such as a bold outline, a change in background, a change in color, etc.

In some embodiments, the media library 320 displays a collection of clips from various file locations that have been imported into the library. Different embodiments may implement the media library functionality using different interfaces, commands, or processes. For instance, in some embodiments, the individual clips in the collection of clips displayed in the media library 320 may be displayed as a list of textual entries, a set of icons, etc.

Figure 17:
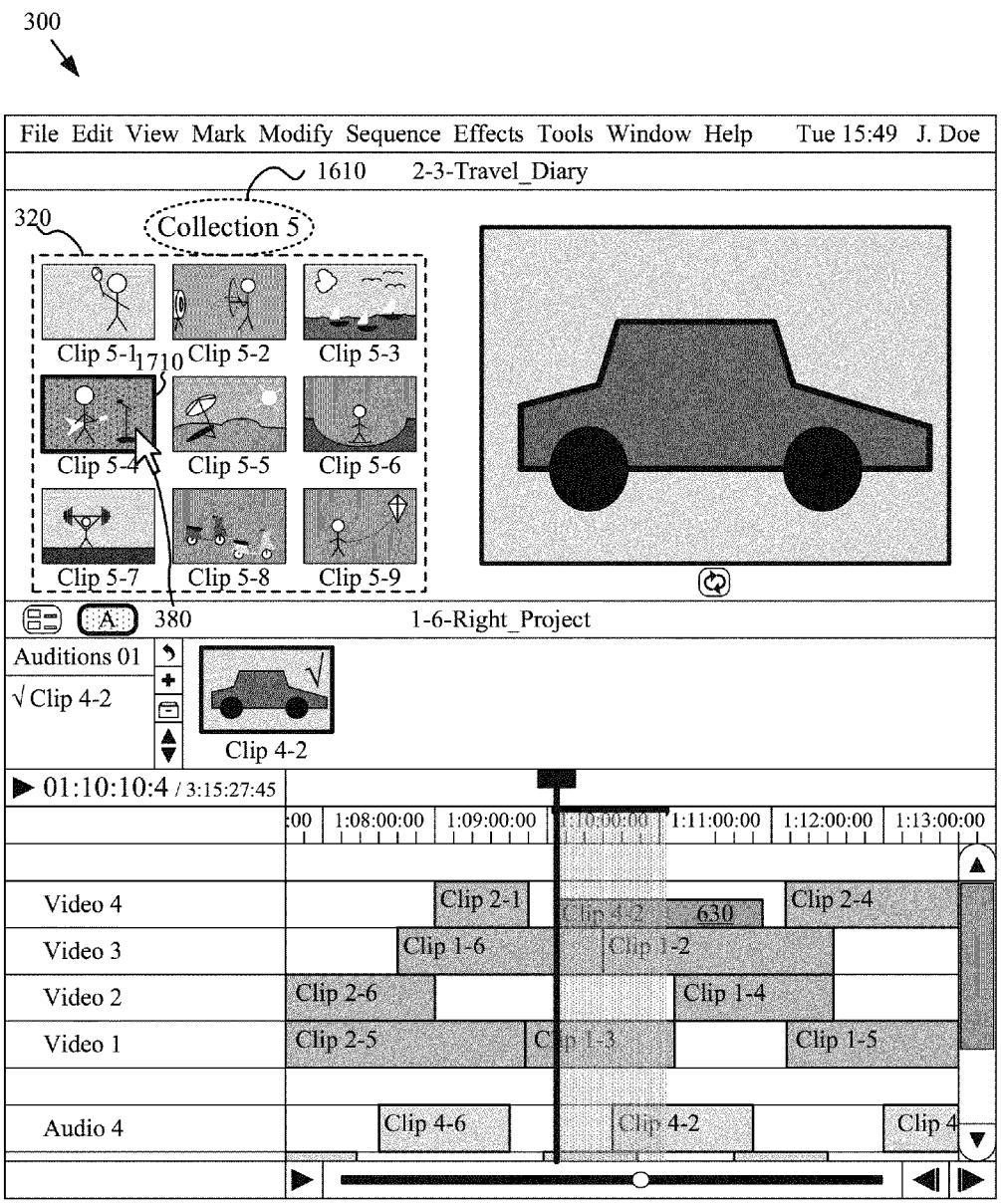
FIG. 17 illustrates the GUI of some embodiments after the user has selected a different collection of clips using a media library selection control.

FIG. 17 illustrates a second stage of user interaction after the user has selected a different collection of clips using the media library selection control 1610. As shown, this selection operation has caused the media library selection control 1610 to indicate that a different collection of clips is being shown in the media library 320 (i.e., "collection 5" has replaced "collection 4" in the display).

In this stage, the user selects a clip 1710 from the media library 320 to add to the composite project as a candidate audition clip. The user makes this selection by moving the cursor 380 to a location over the clip 1710 and performing a left-cursor click operation. As shown, this selection operation has caused a change in the graphical representation of the selected clip 1710 relative to the other clips. The selected clip may be indicated in various ways, such as a bold outline, a change in background, a change in color, etc. In some embodiments, the clip 1710 may also be selected through any number of other techniques, such as a combination of keystrokes, a pull-down or pop-up menu selection, etc.

Figure 18:
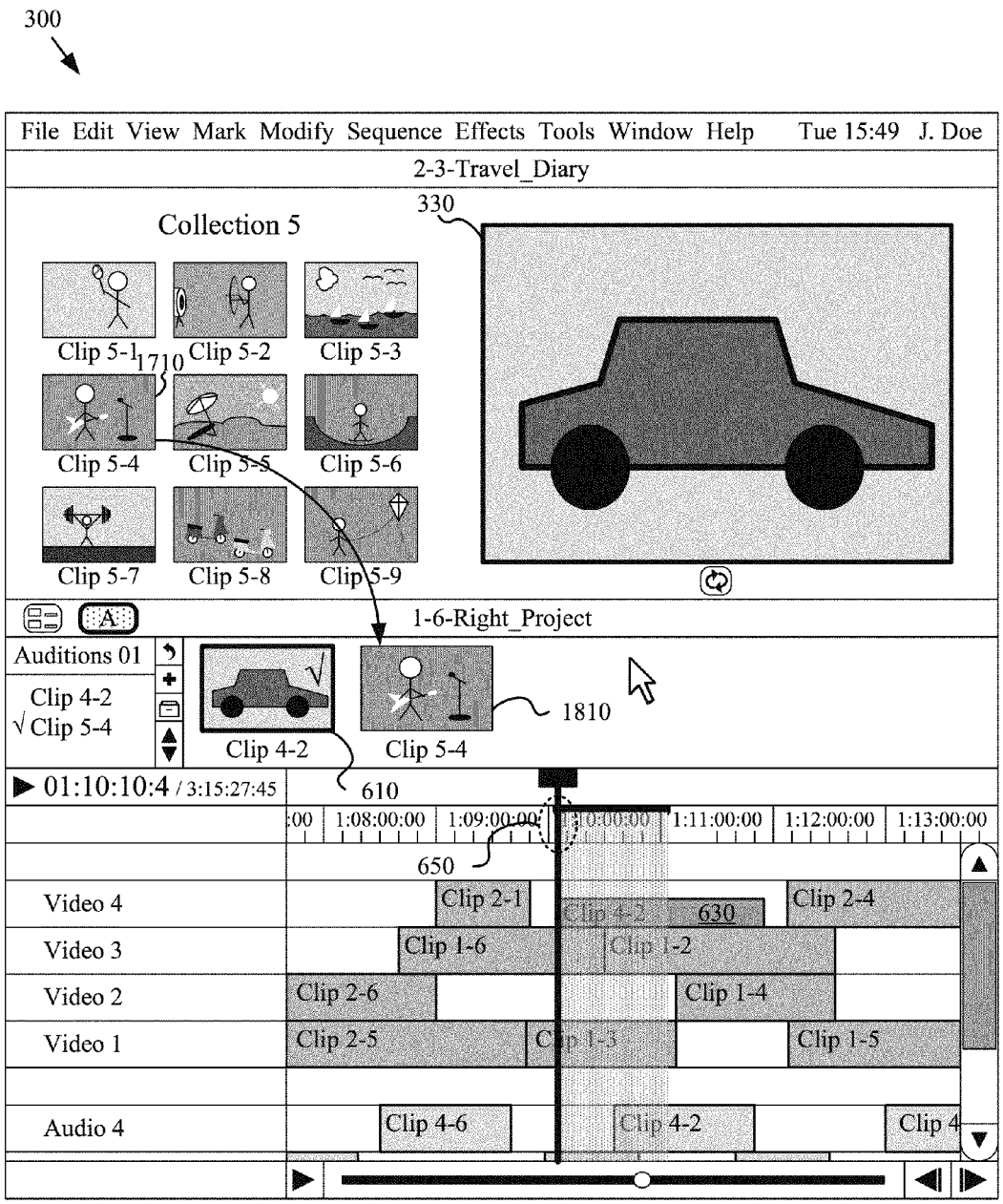
FIG. 18 illustrates the GUI of some embodiments after the user has selected a clip from the media library to add as an audition clip.

FIG. 18 illustrates a third stage of user interaction after the user has selected a clip 1710 from the media library 320 to add as an audition clip. As shown, the selected clip 1710 has been added to the audition display area 510 as a second candidate audition clip 1810. In addition, some embodiments (not shown) may also update the composite-target clip 630 shown in track 350. In some of these embodiments, the composite-target clip is automatically updated to reflect the newly-added clip, while in other of these embodiments, a user may perform a selection operation (e.g., a left-cursor click) in order to select the newly-added clip in the audition display area 510 and cause the composite-target clip to be updated. Furthermore, the selection of a newly-added candidate audition clip in some embodiments may cause the display in the preview display area 330 to be updated based on the content of the selected clip.

Figure 19:
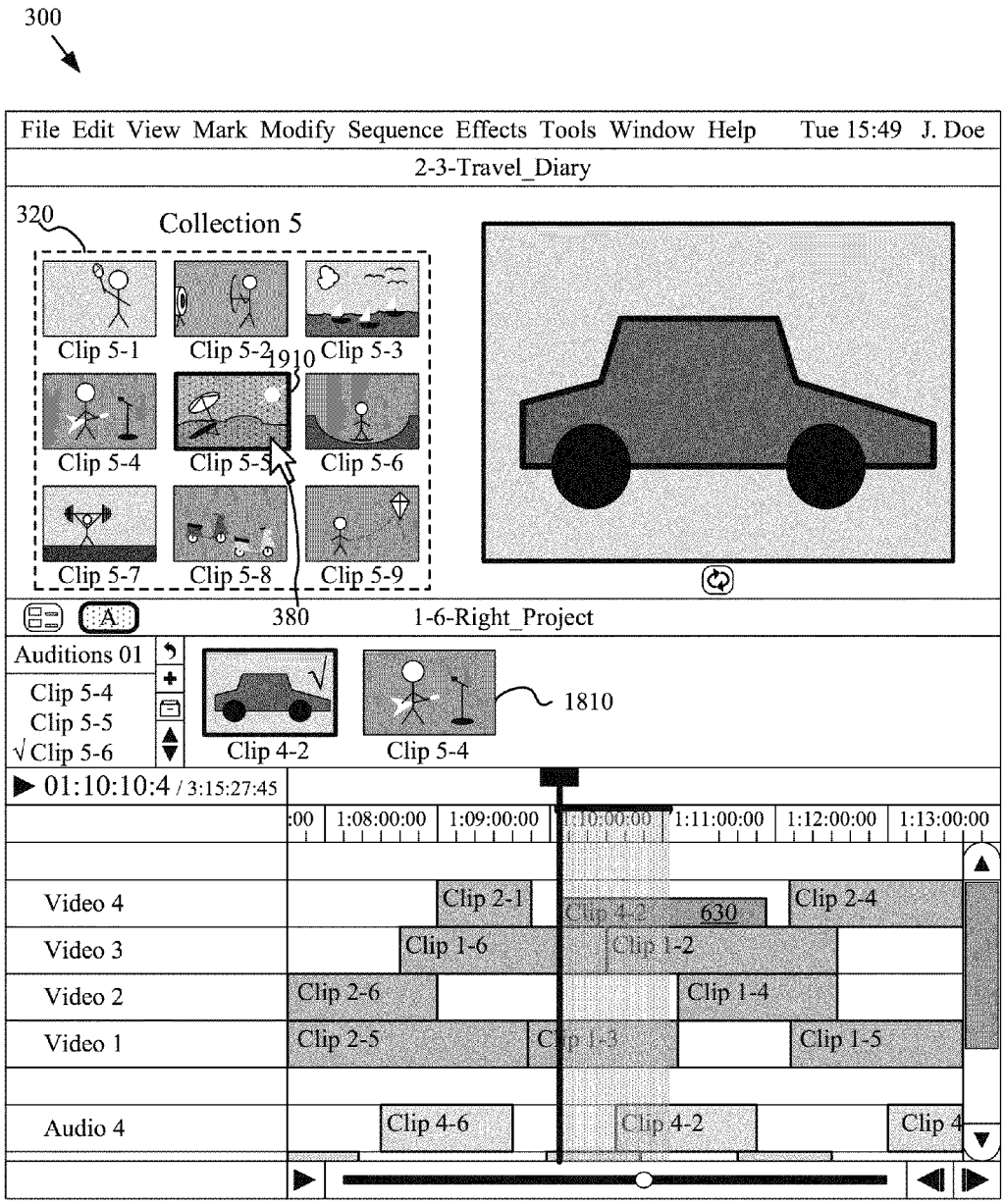
FIG. 19 illustrates the GUI of some embodiments after a second clip has been added to the set of candidate audition clips.

FIG. 19 illustrates a fourth stage that is after a second clip 1810 has been added to the set of candidate audition clips. In this stage, the user selects another clip 1910 from the media library 320 to add to the composite project as a candidate audition clip. The user makes this selection by moving the cursor 380 to a location over the clip 1910 and performing a left-cursor click operation. As shown, this selection operation has caused a change in the graphical representation of the selected clip 1910 relative to the other clips. The selected clip may be indicated in various ways, such as a bold outline, a change in background, a change in color, etc. In some embodiments, the clip 1910 may also be selected through any number of other techniques, such as a combination of keystrokes, a pull-down or pop-up menu selection, etc.

Figure 20:
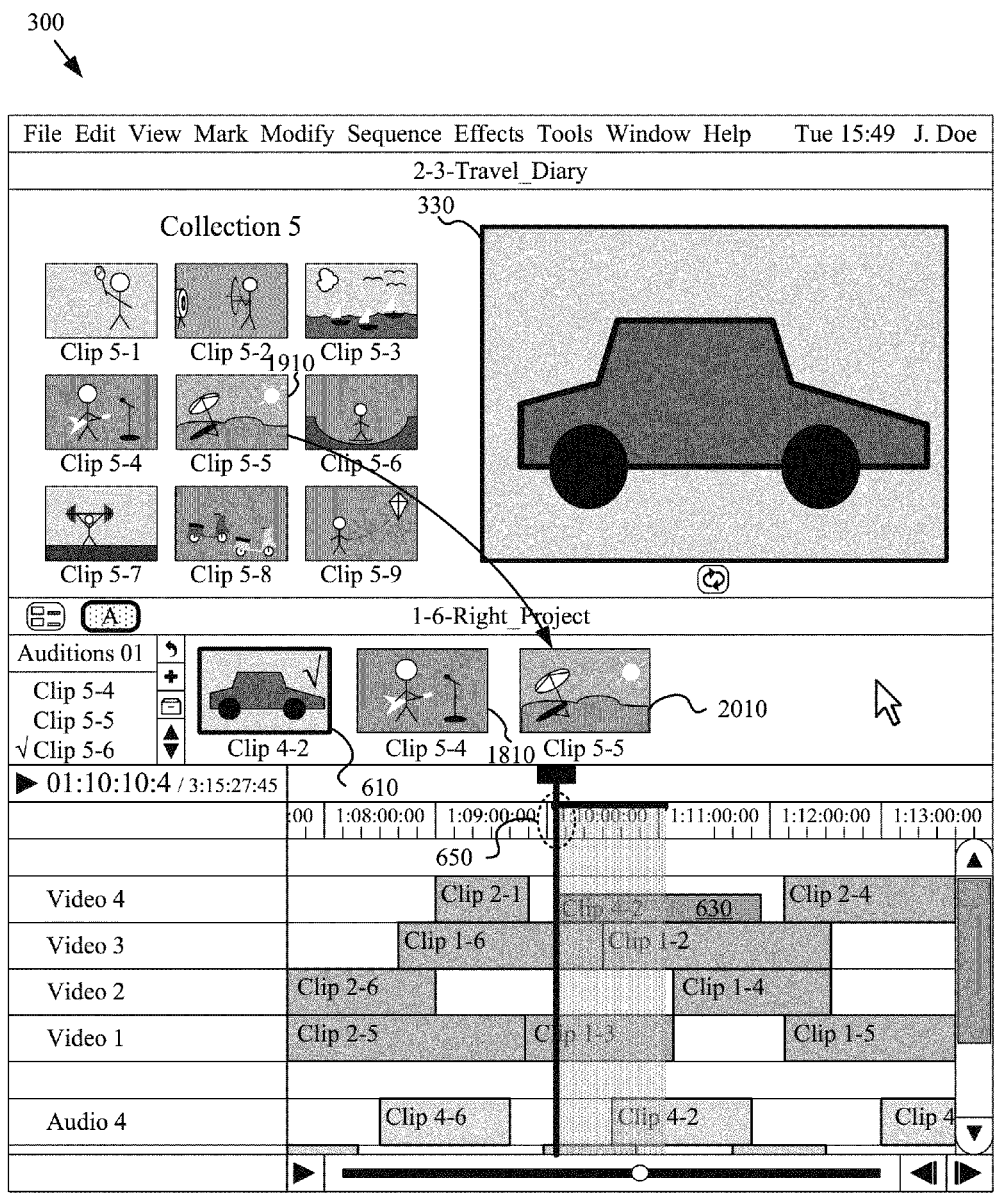
FIG. 20 illustrates the GUI of some embodiments after the user has selected a clip from the media library to add as a candidate audition clip.

FIG. 20 illustrates a fifth stage of user interaction after the user has selected a clip 1910 from the media library 320 to add as a candidate audition clip. As shown, the selected clip 1910 has been added to the audition display area 510 as a third candidate audition clip 2010. As described above, the composite-target clip may be updated in some embodiments based on the addition of another candidate audition clip, or based on a secondary operation by the user (e.g., by selecting the newly-added clip in the audition display area 510). Furthermore, when the composite-target clip is updated in some embodiments, the display shown in the preview display area 330 may also be updated based on the content of the selected clip.

Figure 21:
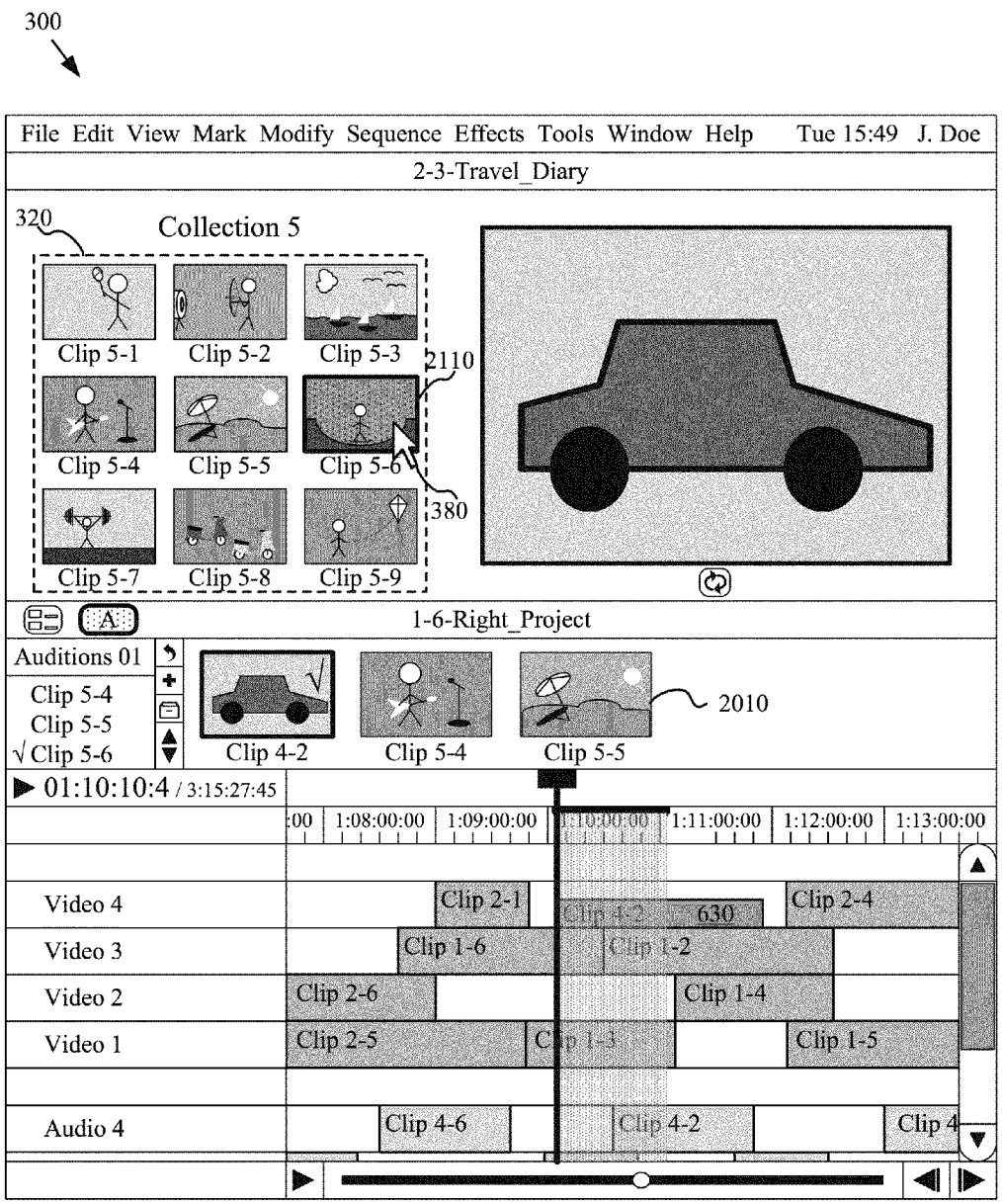
FIG. 21 illustrates the GUI of some embodiments after a third clip has been added to the set of candidate audition clips.

FIG. 21 illustrates a sixth stage that is after a third clip 2010 has been added to the set of candidate audition clips. In this stage, the user selects another clip 2110 from the media library 320 to add to the composite project as a candidate audition clip. As described above, the user may make this selection by moving the cursor 380 to a location over the clip 2110 and performing a left-cursor click operation. As shown, this selection operation has caused a change in the graphical representation of the selected clip 2110 relative to the other clips. The selected clip may be indicated in various ways, such as a bold outline, a change in background, a change in color, etc. In some embodiments, the clip 2110 may also be selected through any number of other techniques, such as a combination of keystrokes, a pull-down or pop-up menu selection, etc.

Figure 22:
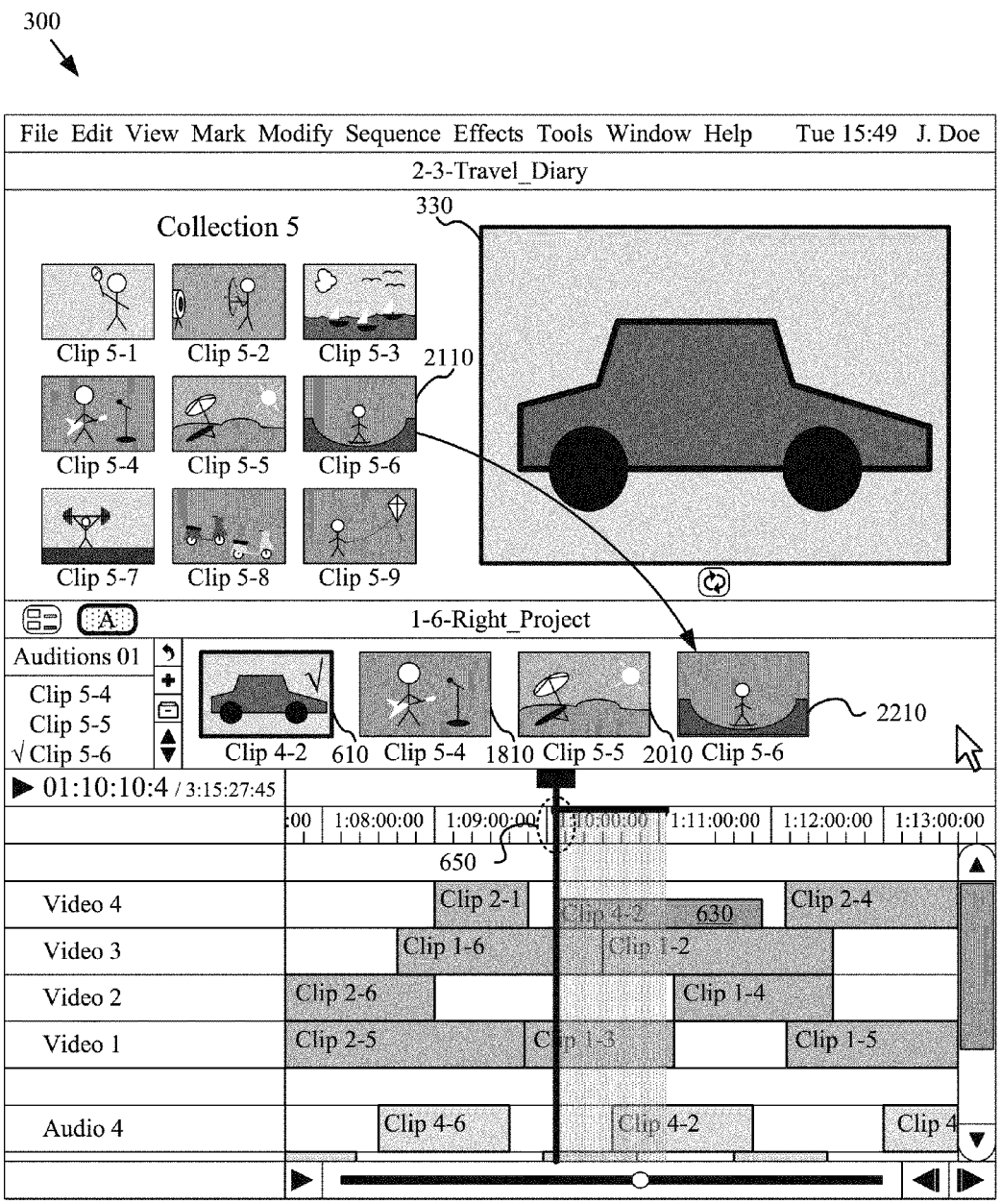
FIG. 22 illustrates the GUI of some embodiments after the user has selected a clip from the media library to add as a candidate audition clip.

FIG. 22 illustrates a seventh stage of user interaction after the user has selected a clip 2110 from the media library 320 to add as a candidate audition clip. As shown, the selected clip 2110 has been added to the audition display area 510 as a fourth candidate audition clip 2210. As described above, the composite-target clip may be updated in some embodiments based on the addition of another candidate audition clip, or based on a secondary operation by the user (e.g., by selecting the newly-added clip in the audition display area 510). Furthermore, when the composite-target clip is updated in some embodiments, the display shown in the preview display area 330 may also be updated based on the content of the selected clip.

Figure 23:
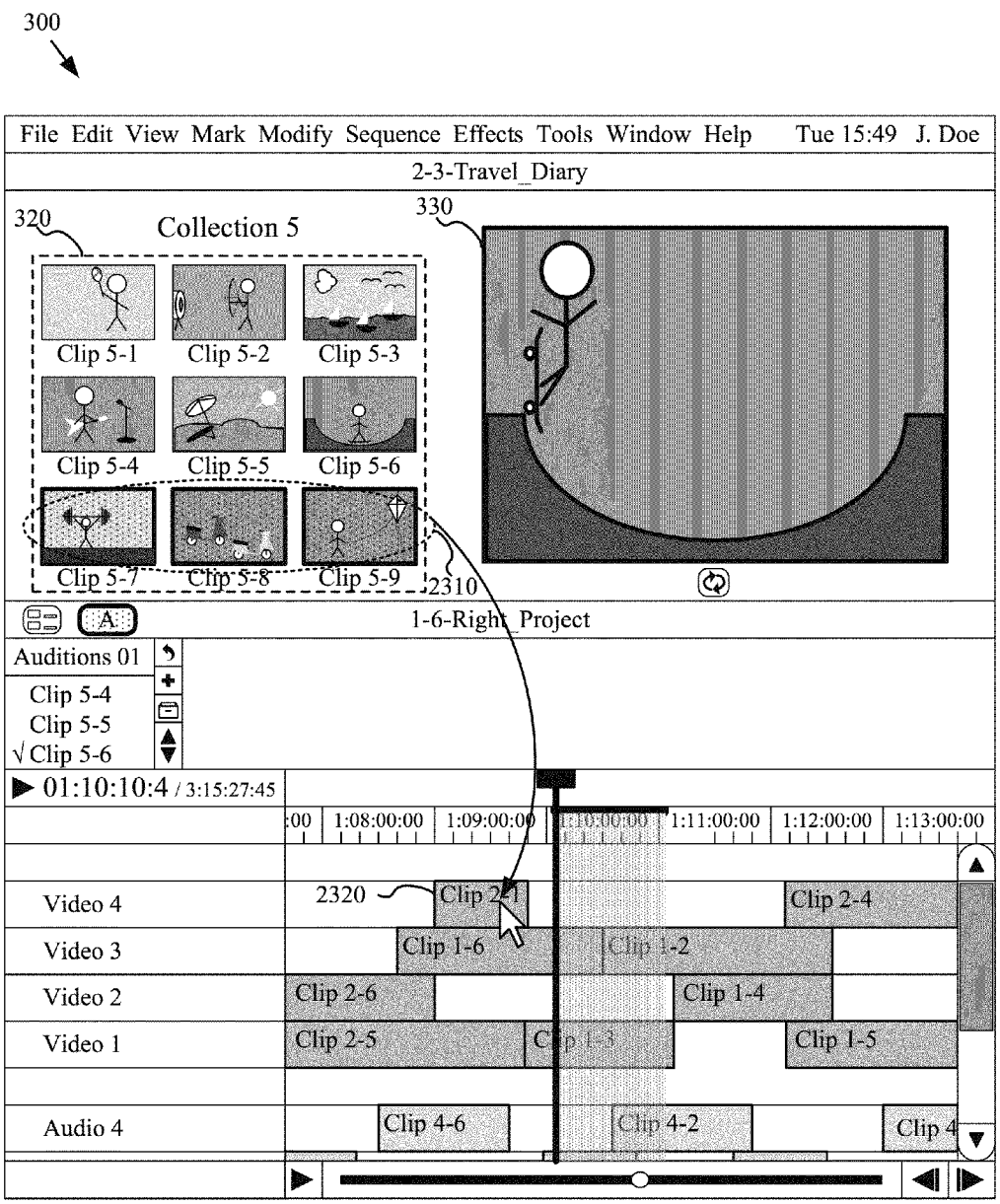
FIG. 23 illustrates the GUI of some embodiments after the user has selected a group of clips from the media library to add as candidate audition clips.
Figure 24:
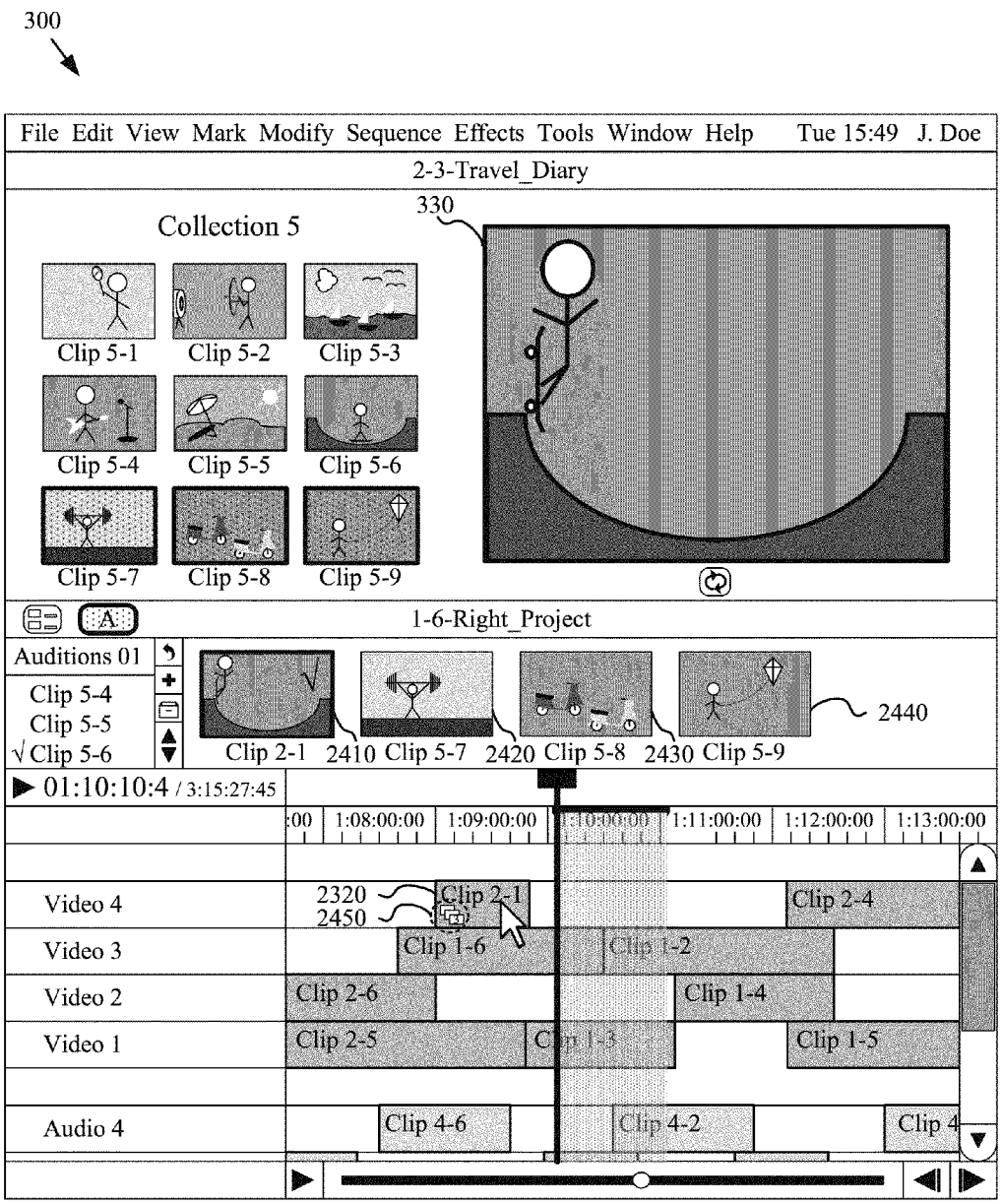
FIG. 24 illustrates the GUI of some embodiments after the user has added a group of clips as candidate audition clips.
Figure 25:
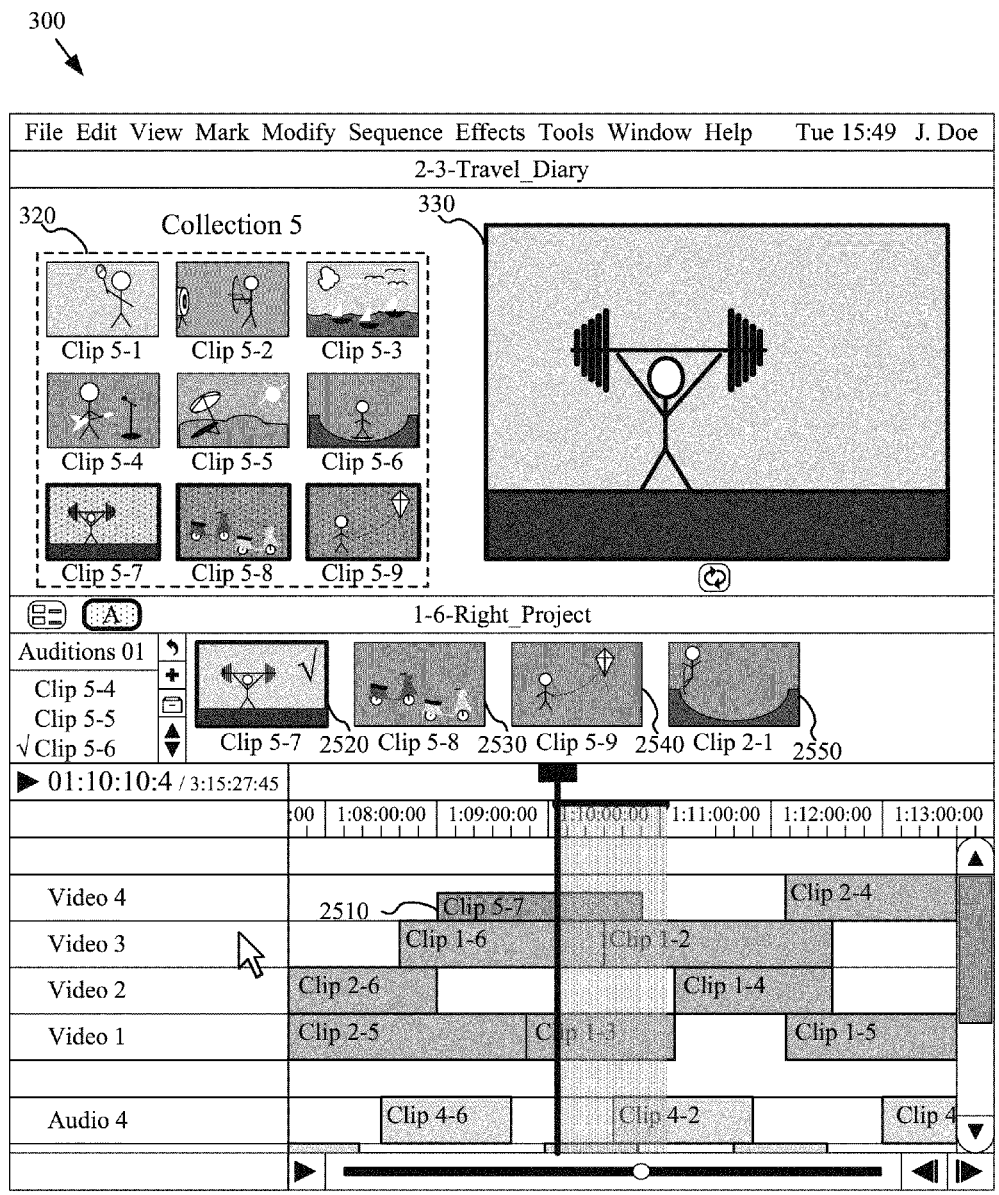
FIG. 25 illustrates an example way of creating a preview set of candidate audition clips in some embodiments.

FIGS. 23-25 illustrate an alternative way of creating a set of candidate audition clips using the GUI 300 of some embodiments. In the example of FIGS. 23-24, after invoking the audition feature, a committed set of candidate audition clips is created using the GUI 300 by performing a series of cursor operations. In the example of FIG. 25, after invoking the audition feature, a preview set of candidate audition clips is created using the GUI 300 by performing a series of cursor operations. The GUI 300 is the same GUI 300 described above in reference to FIGS. 3-22. Also, to illustrate the example of adding clips to the set of candidate audition clips through an alternative series of cursor operations, FIGS. 23-25 explain two different stages of a user's interaction with the GUI 300.

FIG. 23 illustrates a first stage of user interaction using the GUI 300 after the audition feature has been invoked, and multiple audition clips have been selected and dragged to the composite display area 340 to create a set of candidate audition clips. The invocation of the audition feature may have been performed in a similar manner to that described above in reference to FIGS. 3-6. In this stage, a user selects multiple clips 2310 from the media library 320 and drags them onto a committed clip 2320 that had previously been placed in the composite display area 340.

In some embodiments, a user may select multiple clips from the media library by performing successive left-cursor control-click operations, by selecting a particular clip and then performing a left-cursor shift-click operation, by performing a drag-and-select operation, or some other appropriate method. The user may then perform a drag-and-drop operation on the multiple selected clips in order to place the clips at a particular location in the composite display area 340. In some embodiments (not shown) a contextual pop-up menu similar to those described above in reference to FIGS. 10 and 12 may be invoked when the user drags one or more clips to an occupied location of the composite display area 340.

FIG. 24 illustrates a second stage of user interaction that is after a user has dragged and dropped a group of clips to a particular location in the composite display area 340. As shown in FIG. 24, in response to the user dragging multiple clips onto the committed clip 2320, the audition feature of some embodiments is invoked, and the committed clip 2320 and the group of selected clips are all added to the audition display area 510. In this example, the audition display area has been invoked along with the audition feature. In some cases, the audition display area may not be automatically invoked with the audition feature, and a user may make another selection to activate the audition display area (e.g., through a selection made in response to a pop-up menu). Thus, the audition display area shows the four clips 2410, 2420, 2430, and 2440. In some embodiments, a marker 2450 or other indication is displayed, thus indicating that alternative audition clips are associated with the particular committed clip 2320. In some embodiments, the marker 2450 may be selected (e.g., through a left-cursor click operation) in order to invoke the audition display area 510 when the audition display area has not previously been invoked.

Instead of including an existing clip in the set of candidate audition clips, a user may elect that the committed clip be replaced by the group of selected clips (e.g., by making a selection from a contextual menu). In some embodiments, a user may further elect whether the group of selected clips will replace the committed clip as a committed or preview composite-target clip. When the user elects that the group will replace the committed clip as a committed composite-target clip, the replaced clip's representation is completely removed from the composite display area 340 and a composite-target clip representing the group of selected clips is placed at the same location. In addition, the replaced clip would not be included in the set of clips displayed in the audition display area 510. Alternatively, in some embodiments, when a user elects that the group replace the committed clip as a preview clip, the committed clip is not removed from the composite display area 340 and the preview clip does not completely obscure the existing committed clip.

FIG. 25 illustrates an alternative second stage of user interaction after a user has performed a group selection and drag-and-drop operation as described above in reference to FIG. 23. A user may elect that the group of selected clips replace the existing committed clip as a preview composite-target clip. The user may make this election using a pop-up or pull-down menu, a series of keystrokes, or some other appropriate way. As shown in FIG. 25, the composite display area 340 has been updated to show the composite target-clip 2510 as a preview clip and the committed clip 2320 has been removed from the composite display area 340. In some embodiments, the committed clip 2320 may not be removed from the composite display area such that a user may still manipulate the committed clip in addition to the set of candidate audition clips.

In this example, the preview clip is represented as a half-height rectangle. In addition to its half-height representation, the composite-target clip 2510 is shown as a different color than the committed non-audition clips. Such a visual differentiation may be used in some cases to allow a user to more easily identify a clip's status. In some embodiments, the visual differentiation may be based on a default selection, a user's previous election, or some other criteria. In some embodiments (not shown), the preview composite-target clip 2510 may include a marker (e.g. marker 2450) or some other notation to indicate that the clip has associated alternative audition clips.

In addition to the updated composite display area 340, the audition display area 510 has been updated to include a representation of each clip 2520-2550 in the selected group 2310. In some cases, the preview display area 330 may also be updated to show the content in the selected candidate audition clip 2520. Also, in some embodiments, playback will begin automatically whenever a clip or group of clips is released to the composite display area 340.

Although the examples of FIG. 23-25 show multiple clips being moved to the composite display area, a user may also perform similar operations when only one clip is selected and moved to the composite display area. In such cases, a user may still be prompted (e.g., by a contextual pop-up menu) as to whether any existing clip will be replaced, placed in a candidate audition clip set, etc. In addition, a user may perform other similar edit operations using various types of clips. For instance, a user may drag a group of clips onto an existing composite-target clip that represents multiple audition clips, or the user may drag a group of clips (preview or committed) onto an existing preview clip. In these cases, various different pop-up menus may be invoked, or the user may otherwise indicate the appropriate way of adding the group of clips (e.g., as additional alternatives to an existing set of audition clips, as a replacement for a committed or preview clip, etc.).

While the operations used to create and manipulate an audition clip set have been described with reference to numerous specific details in the foregoing examples, one of ordinary skill in the art will recognize that the invention can be embodied in other specific forms (i.e., different embodiments may implement or perform different operations) without departing from the spirit of the invention. For example, while the examples shown illustrate a candidate audition clip set with four or fewer clips, one of ordinary skill in the art would recognize that some embodiments may include a larger number of clips in a candidate audition clip set.

Figure 26:
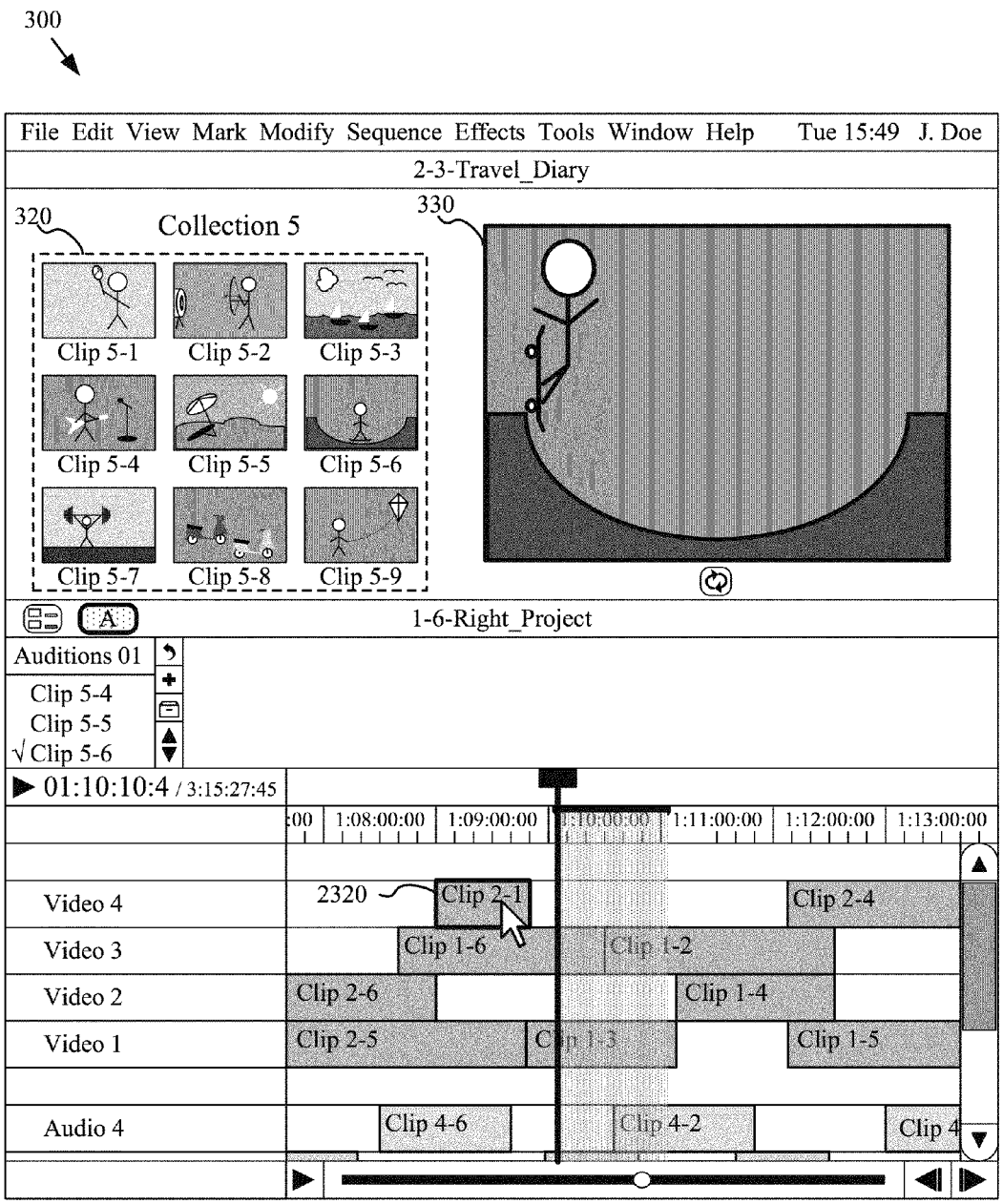
FIG. 26 illustrates the GUI of some embodiments after the user has selected a committed clip in the composite display area.
Figure 27:
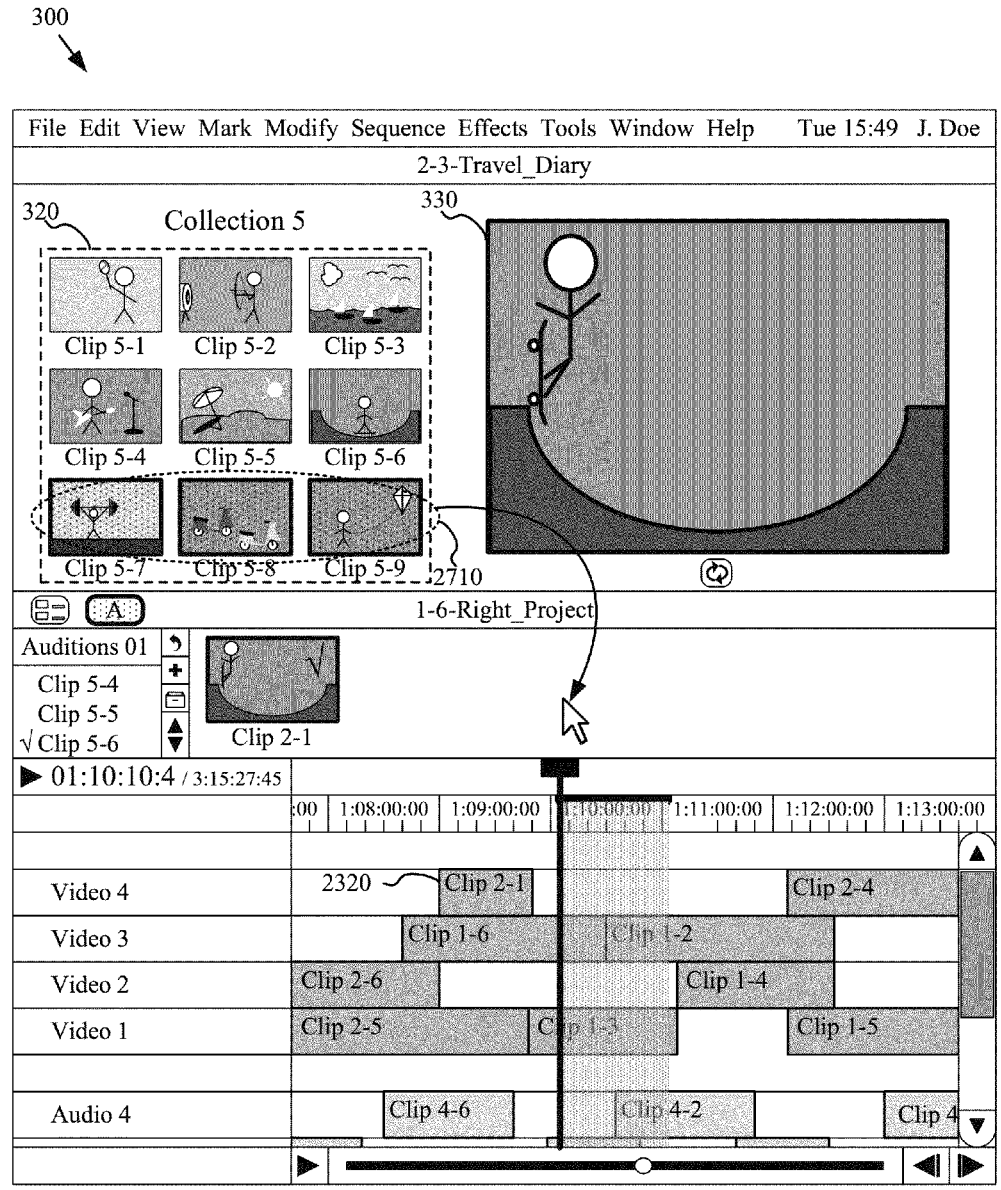
FIG. 27 illustrates the GUI of some embodiments after the user has selected a group of clips from the media library to add to a set of candidate audition clips.

The example illustrated in FIGS. 23-25 showed one way of associating multiple clips simultaneously with a committed clip in one audition set. Other operations may be used to achieve the same result. One such addition sequence is illustrated in FIGS. 26-27 and 24. These figures illustrate the multiple clips can be associated with one committed clip in one audition set by (1) first selecting a committed clip 2320 (as shown in FIG. 26), and (2) then dragging multiple clips 2710 into the audition display area 510 (as shown in FIG. 27). As shown in FIG. 24, such a selection and drag operation results in the creation of an audition set that includes committed clip 2410 along with clips 2420-2440. As further shown in this figure, a marker 2450 is placed on composite-target clip 2320 to indicate the creation of this audition set for the committed clip.

Figure 28:
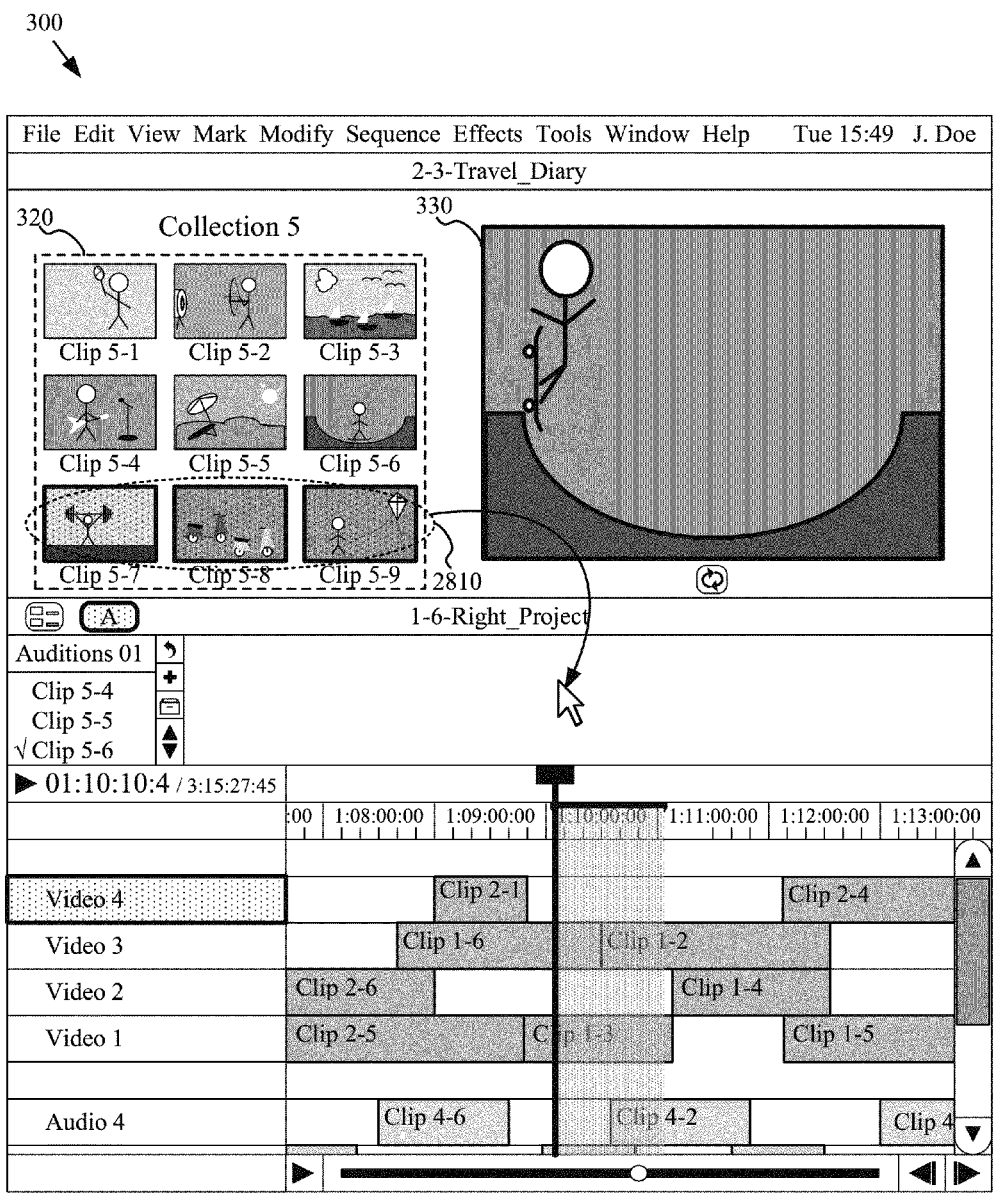
FIG. 28 illustrates the GUI of some embodiments after the user has selected a group of clips from the media library to add as candidate audition clips.
Figure 29:
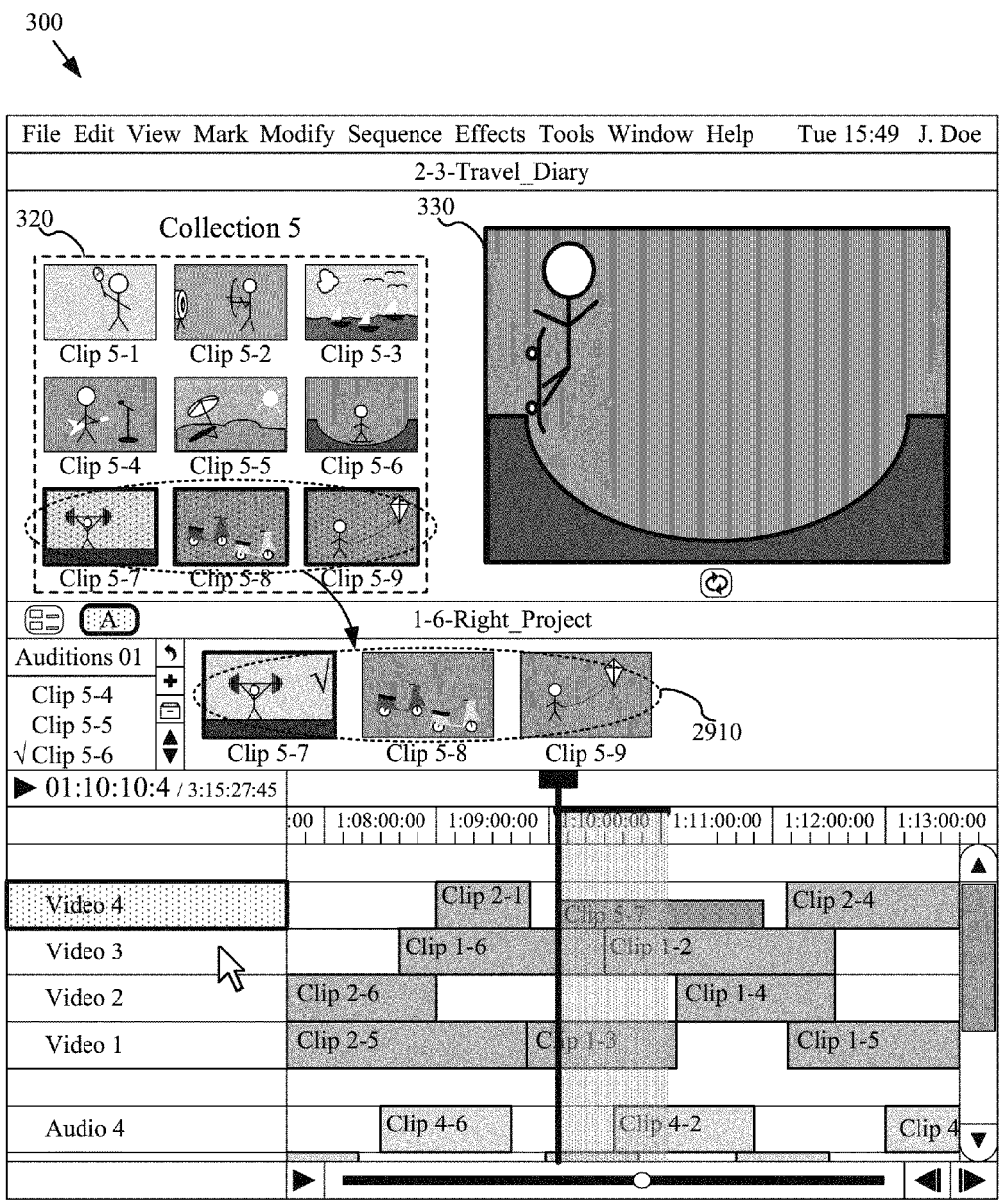
FIG. 29 illustrates the GUI of some embodiments after the user has added a group of clips to the audition display area as candidate audition clips.

Some embodiments provide still other techniques for creating an audition set through the simultaneous selection of multiple clips. One such other technique is illustrated in FIGS. 28-29. These figures illustrate the creation of an audition set through the dragging of several clips 2810 onto the audition display area, as shown in FIG. 28. FIG. 29 illustrates that this drag operation creates an audition set that includes the dragged clips 2910. The audition set that is created that includes these clips in some embodiment is associated with a destination track, which in this case is track 350. In this example, the track is a track that was previously selected by a user (as indicated by its thicker border and different fill pattern relative to the other tracks).

Although in this example, a user has previously selected a destination track, in other cases the user may not have selected a track. In such cases, a default track may be selected (e.g., the lowest-numbered track that has available space for the added clips). In different embodiments the destination track may be selected using different operations (or criteria for a default selection). In any case, there is always an active destination track. Thus, the active destination track will receive any clips that are added to the audition display area in the manner described above in reference to FIGS. 26-27 and 24 or FIGS. 28-29.

The three examples given above by reference to FIGS. 23-25, 26-27 and 24, and 28-29, illustrate the creation of an audition set that is displayed in the audition pane. As mentioned above in reference to FIG. 8, some embodiments use other display windows for displaying the clips of an audition set, instead of or in lieu of using the audition display area. For instance, for the audition set example that was described above by reference to FIGS. 23-25, FIGS. 30-32 illustrate another way of displaying such an audition set.

Figure 30:
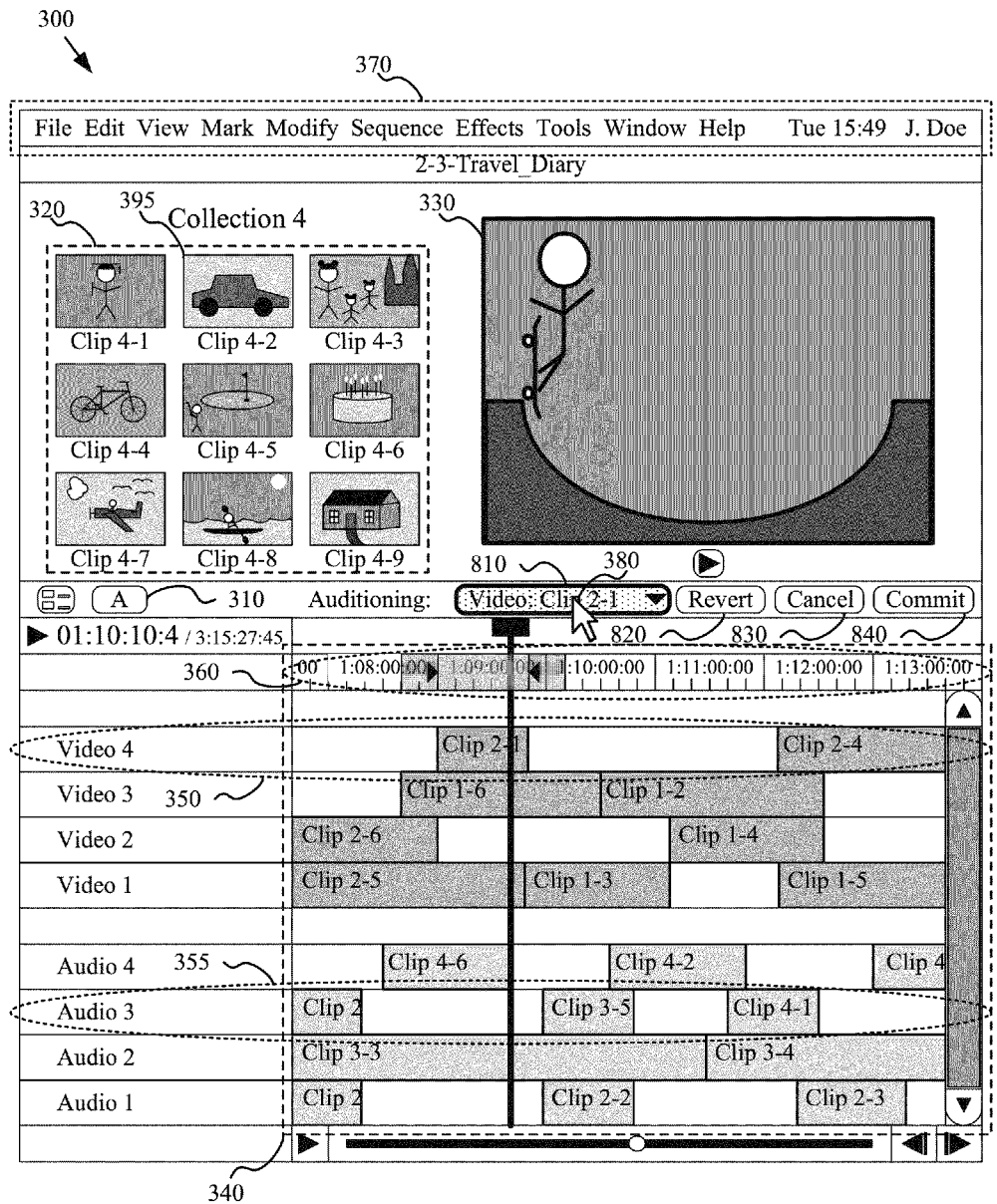
FIG. 30 illustrates the GUI of some embodiments after the alternative audition feature of some embodiments has been invoked.
Figure 31:
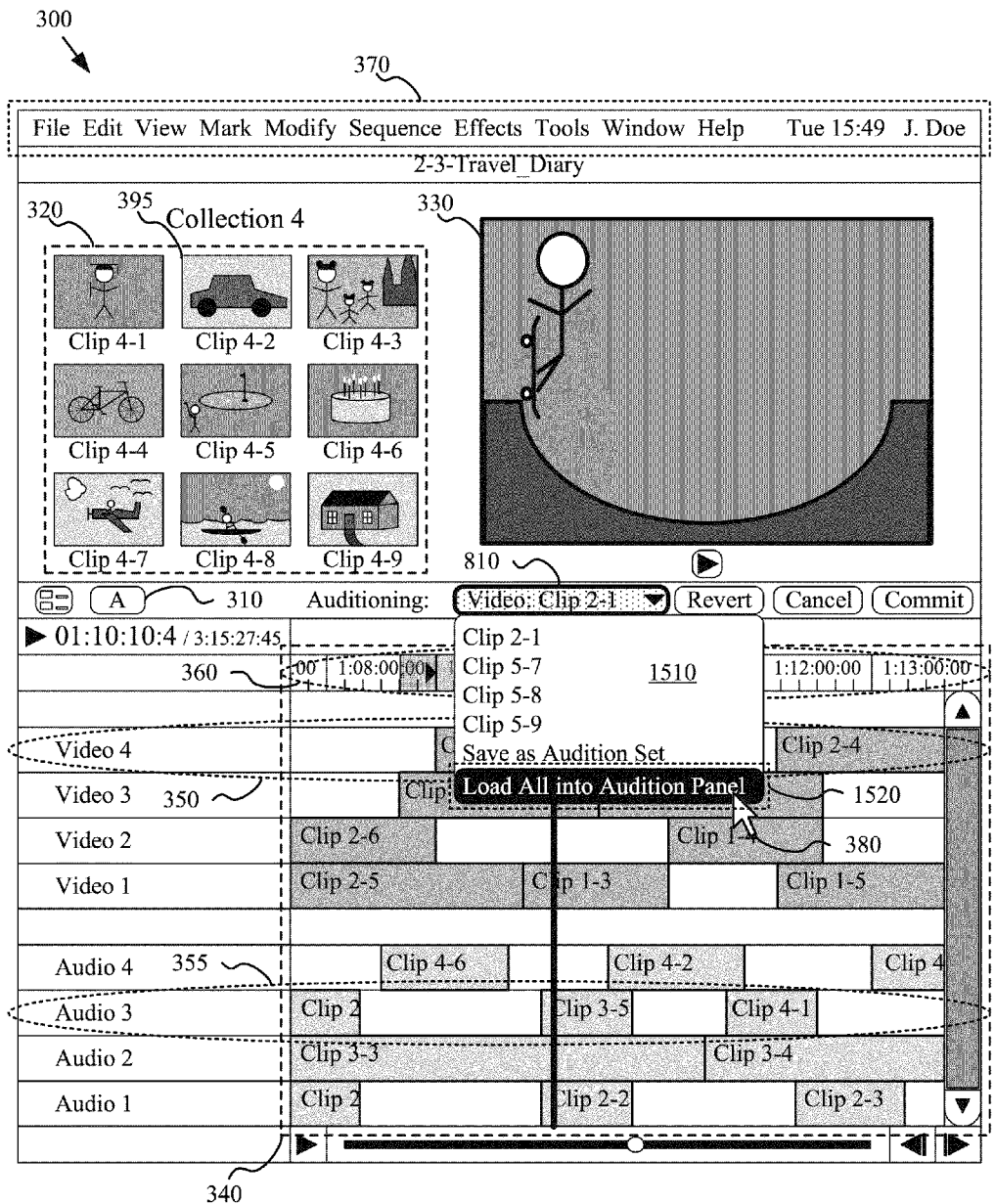
FIG. 31 illustrates the GUI of some embodiments after the user has activated a pull-down list selection item using a cursor selection operation.

FIGS. 30-31 illustrate using an alternative interface to invoke the audition display area of some embodiments. In the example of FIGS. 30-31, a user activates a drop-down menu 810 in order to load a set of clips to the audition display area. The GUI 300 is the same GUI 300 described above in reference to FIGS. 3-29. Also, to illustrate the example of invoking the audition display area through the use of a drop-down menu 810, FIGS. 30-31 explain two different stages of a user's interaction with the GUI 300.

FIG. 30 illustrates a first stage that is after the alternative audition feature of some embodiments has been invoked. A user might have invoked the alternative audition feature in a similar manner to that described above in reference to FIGS. 23 and 24.

In this stage, as shown in FIG. 30, a user activates the drop-down menu selection item 810 using a cursor selection operation. This activation has been indicated by displaying a thicker border around the drop-down menu selection item 810 and highlighting the background of the selection item. In some embodiments, the user activates the pull-down list using a left-cursor click operation after positioning the cursor 380 over the desired clip. One of ordinary skill in the art will recognize that other operations may be used to activate the drop-down menu selection item 810. For instance, a user may perform a combination of keystrokes, use a hotkey to select a particular clip, etc. Once invoked, the FIG. 31 illustrates a second stage of user interaction after the user has activated the drop-down menu selection item 810 using a cursor selection operation. As shown, a drop-down list 1510 has been displayed over the composite display area 340. The drop-down list 1510 of this example is represented as having particular options and/or commands, but one of ordinary skill in the art will recognize that different embodiments may include different options and/or commands.

In this stage, the user selects the "load all into audition panel" option 1520 from the drop-down list 1510 to load the various clips in the drop-down list into the audition display area of some embodiments. The user makes this selection by moving the cursor 380 to a location over the desired list option 1520 and performing a left-cursor click operation. As shown, moving the cursor 380 over the load all into audition panel option 1520 has caused a change in the graphical representation of the option relative to the other options or commands in the drop-down list 1510. The selected option may be indicated in various ways, such as a bold outline, a change in background, a change in color, etc. In some embodiments, such an option may also be selected through any number of other techniques, such as a combination of keystrokes, a pop-up menu selection, etc.

One example of the resulting display (specifically, the display of the audition display area 510 and the representation of the composite-target clip 2320), after the user has selected the "load all into audition panel" option 1520 is the same display shown in FIG. 24. As shown in FIG. 24, the audition display area 510 has been invoked and the clips 2410, 2420, 2430, and 2440 shown in the audition display area 510 are the same clips that were listed in the drop-down list 1510 of FIG. 31. By invoking the "load all into audition panel" option 1520, a user is thus able to more easily view and select the various clips in the candidate audition clip set.

Figure 32:
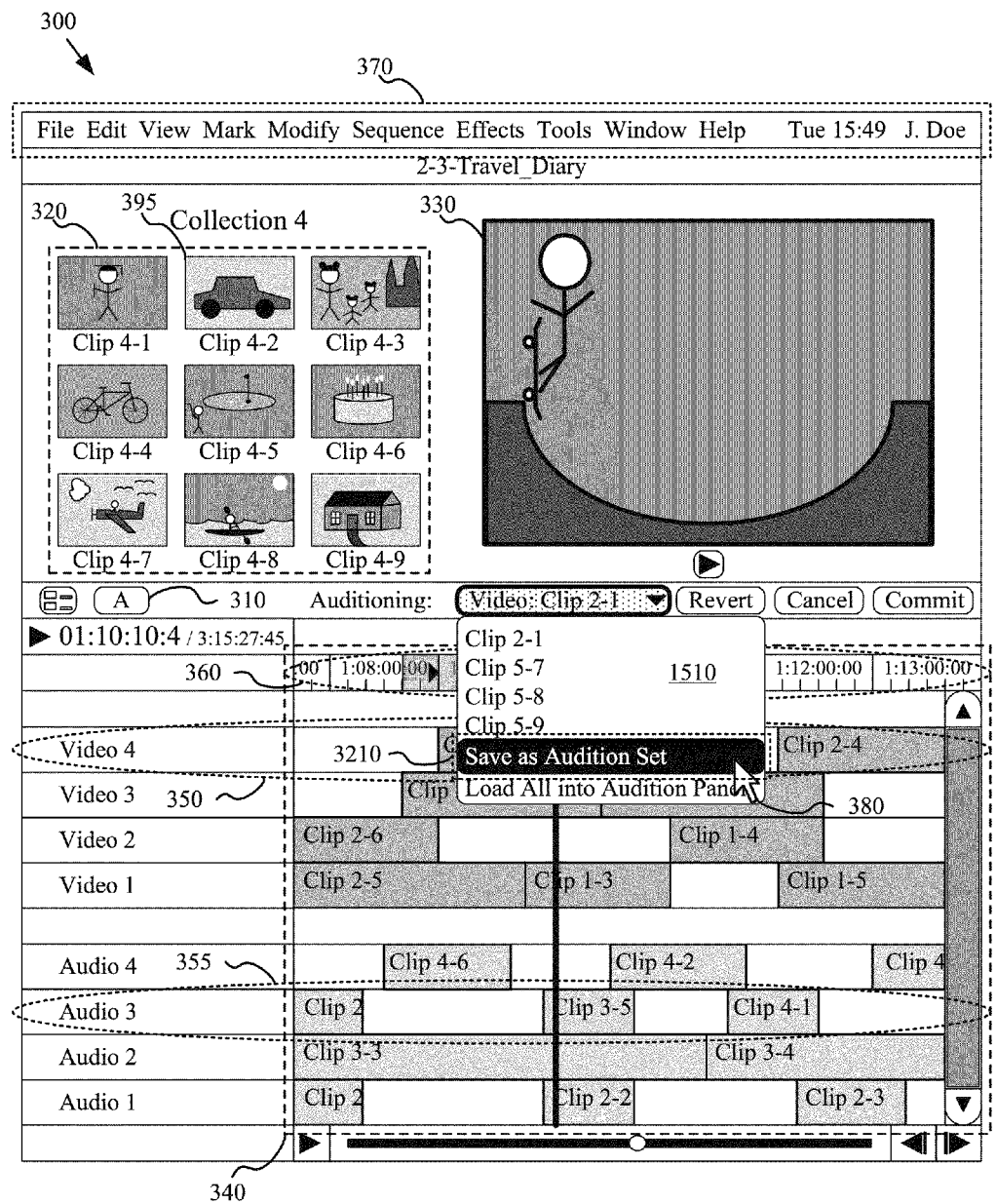
FIG. 32 illustrates the GUI of some embodiments after the user has activated the pull-down list selection item using a cursor selection operation.

FIGS. 30 and 32 illustrate using an alternative interface to invoke an audition set representation in the composite display area 340 of some embodiments. In the example of FIGS. 30 and 32, a user activates a pull-down list 810 in order to save a group of candidate audition clips as an audition set. The GUI 300 is the same GUI 300 described above in reference to FIGS. 3-29. Also, to illustrate the example of invoking the audition display area through the use of a drop-down menu 810, FIGS. 30 and 32 explain two different stages of a user's interaction with the GUI 300. The first stage was described above in reference to FIG. 30.

FIG. 32 illustrates a second stage of user interaction after the user has activated the drop-down menu selection item 810 using a cursor selection operation. As shown, a drop-down list 1510 has been displayed over the composite display area 340. The drop-down list 1510 of this example is represented as having particular options and/or commands, but one of ordinary skill in the art will recognize that different embodiments may include different options and/or commands.

In this stage, the user selects the "save as audition set" option 3210 from the drop-down list 1510 to save the various clips in the drop-down list as an audition set in some embodiments. The user makes this selection by moving the cursor 380 to a location over the desired list option 3210 and performing a left-cursor click operation. As shown, moving the cursor 380 over the "save as audition set" option 3210 has caused a change in the graphical representation of the option relative to the other options or commands in the drop-down list 1510. The selected option may be indicated in various ways, such as a bold outline, a change in background, a change in color, etc. In some embodiments, such an option may also be selected through any number of other techniques, such as a combination of keystrokes, a pop-up menu selection, etc. Furthermore, in some embodiments, a group of clips may be saved as an audition set by default, without requiring the user to make any particular selection.

The resulting composite display area 340 (specifically, the representation of the composite-target clip 2320 with associated mark 2450), after the user has selected the "save as audition set" option 3210 is the same composite display area 340 shown in FIG. 24. Although not shown, the committed clip 2320 includes the same associated alternative audition clips that were listed in the drop-down list 1510 of FIG. 32. In some cases, when performing preview or audition edits, these edits are not saved to the composite project data. Thus, in some embodiments, a user may select the "save as audition set" option 3210 from the pull-down menu 1510 in order to save a set of candidate audition clips within the composite project data so that the set of candidate audition clips may be loaded and reviewed during a later editing session.

While the operations used to create and manipulate an audition clip set have been described with reference to numerous specific details in the foregoing examples, one of ordinary skill in the art will recognize that the invention can be embodied in other specific forms (i.e., different embodiments may implement or perform different operations) without departing from the spirit of the invention. For example, while the examples shown illustrate a candidate audition clip set with four or fewer clips, one of ordinary skill in the art would recognize that some embodiments may include a larger number of clips in a candidate audition clip set. In addition, although the examples above all describe operations used to add clips to an audition clip set, clips may also be removed from an audition clip set after they have been added.

Figure 33:
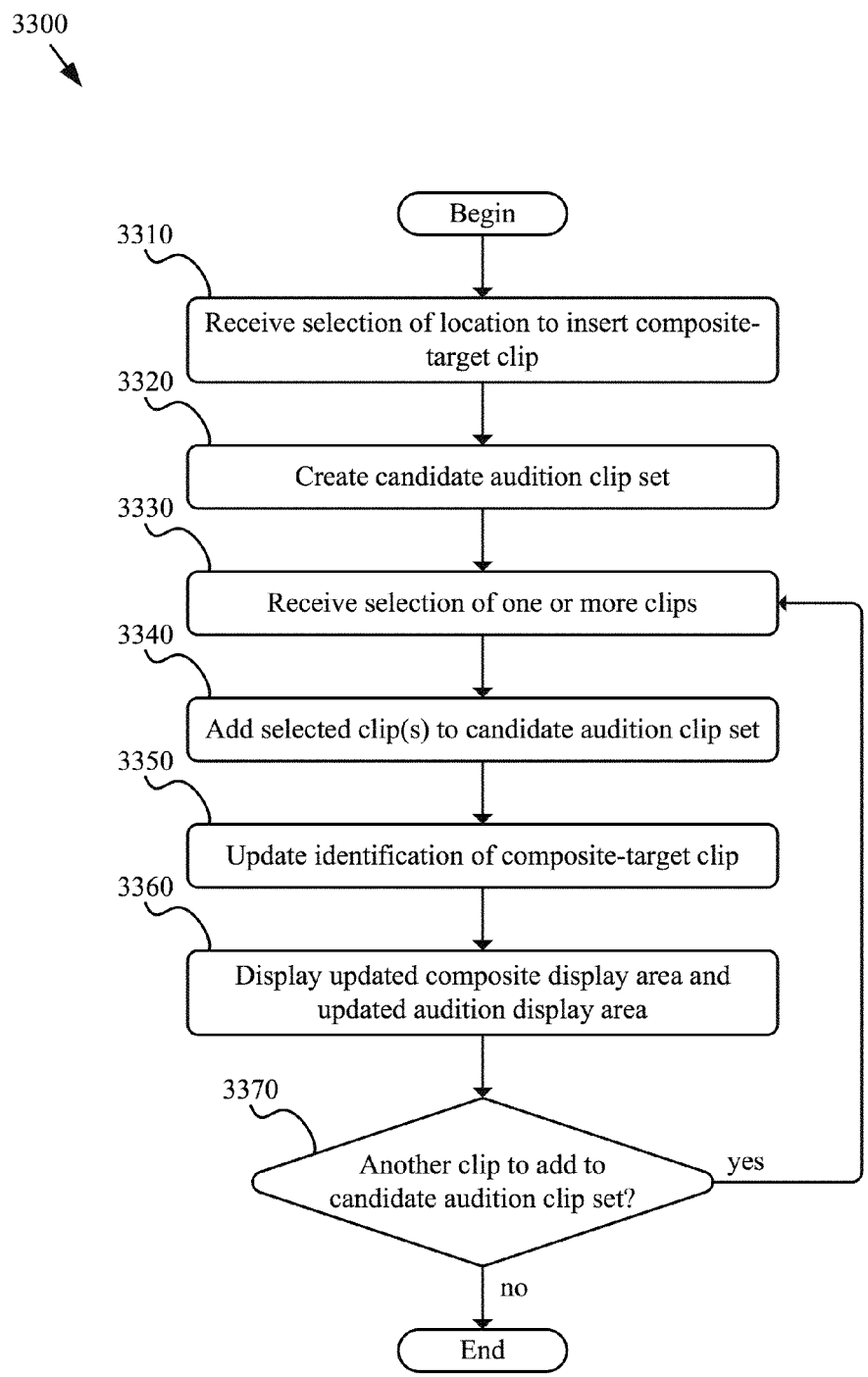
FIG. 33 illustrates an example of a conceptual process that some embodiments use to create a set of audition candidate clips.

C. Processes and Data Structures Used to Create Sets of Candidate Audition Clips Some embodiments allow clips to be added as committed or preview clips. Some of these embodiments may user a process to distinguish between the preview and committed clips. FIG. 33 illustrates an example of such a conceptual process 3300 that some embodiments use to create a set of candidate audition clips. The process 3300 will be described with reference to the conceptual data structures illustrated in FIG. 34 and the example operations and GUI displays described above in reference to FIGS. 3-32.

In some embodiments, the process 3300 starts when the audition feature is activated. Different embodiments may activate the audition feature in various ways (e.g., by using the audition selection item 310, as described above in reference to FIGS. 3-6, using a pull-down or pop-up menu command, etc.).

Next, process 3300 receives (at 3310) a selection of a location in the composite display area to insert a target-composite clip. One example of a selecting a location was provided in reference to FIG. 6 above, where the composite-target clip 630 was inserted into the composite display area 340 at a location 650 set by the playhead 390. As discussed above, the insertion location may be set in a variety of ways (e.g., moving the playhead using a cursor operation, making a pull-down or pop-up menu selection, performing a drag-and-drop operation, etc.). Although in the example of FIG. 6 the composite-target clip was a video clip, some embodiments allow a composite-target clip to be an audio clip or some other type of media (e.g., an overlay clip, a digital photo, etc.).

After receiving (at 3310) a selection of a location to insert a composite-target clip, the process creates (at 3320) a candidate audition clip set. In some embodiments, the process may be modified to determine if there is an existing candidate audition clip set before either creating a candidate audition clip set (if none previously existed) or retrieving the existing candidate audition clip set. The creation of a candidate audition clip set may use various data structures to define such a candidate audition clip set. One example of these data structures is described below.

Figure 34:
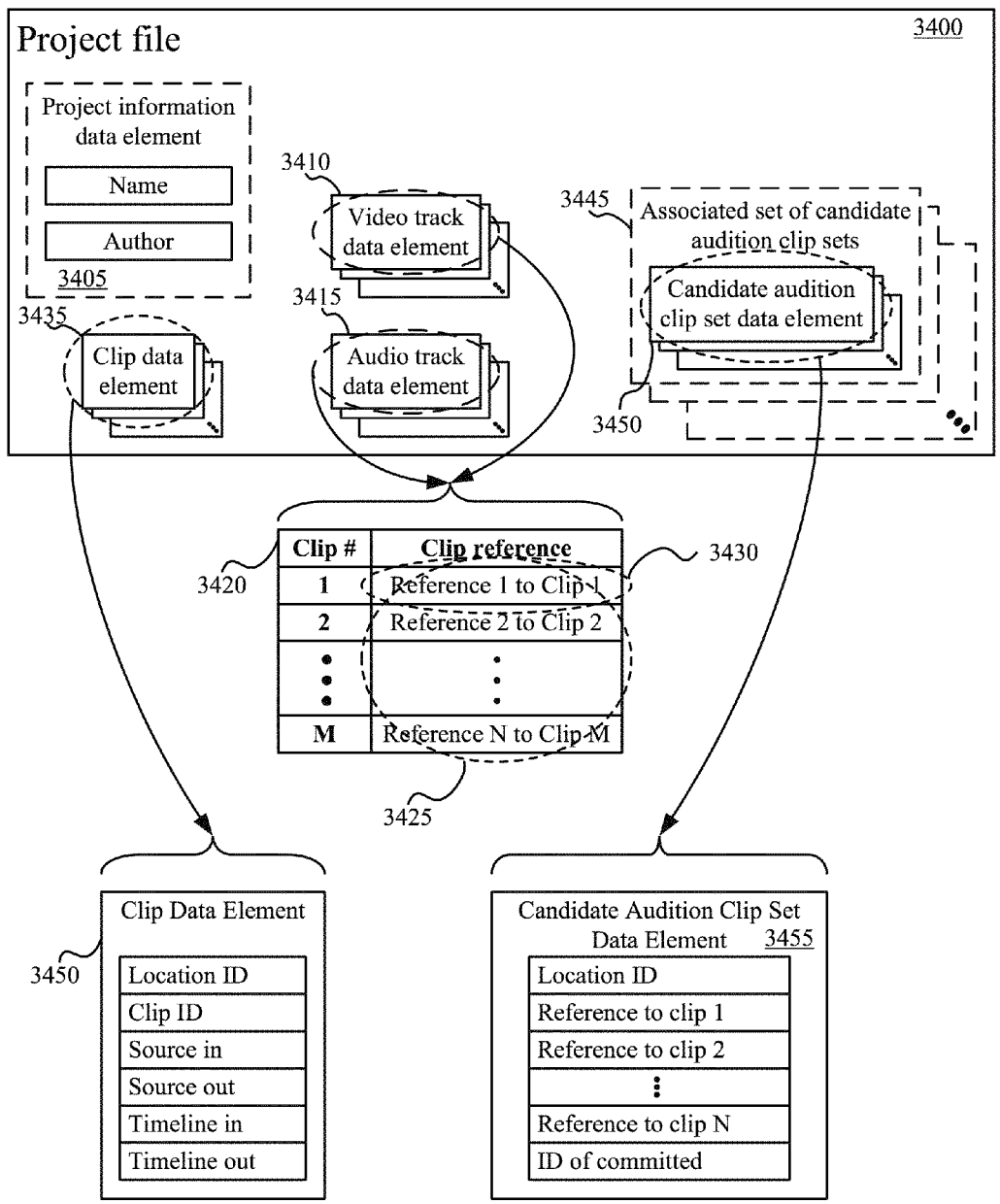
FIG. 34 conceptually illustrates the data structures used by process to perform at least some of its operations in some embodiments.

FIG. 34 conceptually illustrates the data structures used by process 3300 to perform at least some of their operations in some embodiments. Specifically, FIG. 34 illustrates various attributes and data structures that may be included in some embodiments of the media editing application's composite project file 3400. As shown, the project file 3400 may include a project information data element 3405. The project information data element may include attributes such as, for example, the project's name, author, etc. Although these attributes are represented as a single data structure, some embodiments may store each of the attributes in a separate data element.

In addition, the project file 3400 may include video track data elements 3410 and audio track data elements 3415 for storing information corresponding to various clips that have been placed in the different tracks. A single project may include multiple audio tracks and multiple video tracks. In addition, other types of track data elements may be stored in the project file. For instance, effects track data elements, overlay track data elements, or other types of track data elements may be stored in the project file in addition to audio and video track data elements. The audio and video track data elements 3410-3415 are shown in more detail in breakout section 3420.

As shown, in some embodiments each individual track data element 3420 may include a list of references 3425 to each clip that has been placed in a track (i.e., each clip shown in the composite display area). Each clip reference 3430 in each track data element 3420 refers to an individual clip data element 3435 that is part of the project file 3400. These clip data elements 3435 are shown in more detail in breakout section 3450.

As shown in FIG. 34, each clip data element 3450 may include information such as a set of location identifiers, a set of clip identifiers, source in and out references, timeline in and out references, and/or various other attributes (e.g., color settings, audio settings, effects settings, etc.). One of ordinary skill will recognize that the clip data elements may include other data than is shown, or may not include all of the data shown in the conceptual diagram 3450.

In addition to referring to clip data elements 3435, each clip reference may refer to an associated set of candidate audition clip sets data element 3445. As shown, each associated set of candidate audition clip sets data element 3445 includes one or more candidate audition clip set data elements 3450. The candidate audition clip set data element is shown in more detail in breakout section 3455. As shown, each candidate audition clip set data element 3455 may include a set of location identifiers, references to clips (e.g., references to data elements such as clip data element 3450), an identifier of a committed clip (if any), and/or other attributes (e.g., identification of the composite-target clip, color settings, audio settings, effects settings, etc.). Although the candidate audition clip set data element 3455 is illustrated as a single data structure, different embodiments may be implemented in different ways. For instance, in some embodiments, the candidate audition clip set data element 3455 may simply include a list of references to individual clip data elements 3435, similar to the track data element 3420.

Referring again to FIG. 33, in some embodiments, the candidate audition clip set is created (at 3320) by inserting a clip reference 3430 into the track data element 3420 shown in FIG. 34. In some of these embodiments, the clip reference 3430 would refer to a data structure similar to the data structure 3455 shown in FIG. 34.

Once the process has created (at 3320) a candidate audition clip set, the process then receives (at 3330) a clip selection of one or more clips. Different embodiments may receive the clip selection in different ways. For instance, as shown in the example of FIG. 3, a clip 395 may be selected from the media library 320 before the audition feature is invoked using the audition selection item 310 in some embodiments. Some embodiments may receive the clip selection through a series of keystrokes, a pop-up or pull-down menu command, or some other appropriate method. In addition, some embodiments may receive a selection that includes multiple clips.

After receiving (at 3330) a clip selection, process 3300 adds (at 3340) the selected clip(s) to the candidate audition clip set. The clip(s) may be added to the audition clip set by creating or modifying a data structure such as the candidate audition clip set data element 3455 shown in FIG. 34. For instance, the columns of the data element 3455 may be populated with data that corresponds to the selected clip(s).

Next, the process may update (at 3350) the identification of the composite-target clip. As described above, in some embodiments the composite-target clip is updated whenever a new audition clip is added to the set of candidate audition clips. In other embodiments, the identification of the composite-target clip is not automatically updated, and a user must select a menu option or perform some other operation to update the identity of the composite-target clip. This identification may be achieved in different ways. For example, the candidate audition clip set data element 3455 may be updated such that a particular attribute of the data element (e.g., "clip type", "clip attributes", or some other attribute that is not shown in FIG. 34) reflects the added clip's status as a composite-target clip. As another example, when the candidate audition clip set data element 3455 includes data representative of multiple clips, the clips may be arranged such that the composite-target clip is placed in the first column of the data element.

After updating (at 3350) the identification of the composite-target clip, the process displays (at 3360) an updated composite display area and an updated audition display area to reflect the added clip and its status as a composite-target clip. As described above, in some cases the composite-target clip identity is not changed when a new clip is added to the candidate audition clip set, and thus the composite display area is not updated. In addition, the display may not be updated when the identification of the composite-target clip is not updated. The updated display may be based on the data stored in the example project file 3400 of FIG. 34. In some embodiments, as shown in FIG. 33, the display is updated every time a clip is added as an audition clip. In other embodiments, the display may be updated at regular time intervals, or in response to certain user commands and/or actions. The display of the updated audition display area 510 was described above.

Once the process displays (at 3360) the updated audition display area and the potentially updated composite display area, the process determines (at 3370) whether there is another clip to add to the candidate audition clip set. When there is another clip to add, the process repeats operations 3330-3370 as described above, until the process determines (at 3370) that there are no other clips to add to the candidate audition clip set, at which point the process ends.

Some embodiments may allow a user to create multiple candidate audition clip sets for a particular location in the composite project. Thus, the process 3300 may be repeated to create a candidate audition clip set for a new location, as described above, or to create an additional candidate audition clip set for a location that is already associated with one or more previously-created candidate audition clip sets. FIG. 34 illustrates an example data structure 3445 that includes an associated set of one or more candidate audition clip sets 3450, where each candidate audition clip set 3450 in the associated set 3445 is associated with a particular location in the composite project.

One of ordinary skill in the art will recognize that process 3300 is a conceptual representation of the operations used to create a candidate audition clip set. The specific operations of the process may not be performed in the exact order described or different specific operations may be performed in different embodiments. Also, the process may not be performed as one continuous series of operations. Furthermore, the process could be implemented using several sub-processes, or as part of a larger macro-process. Similarly, the data structures, elements, and attributes described in reference to FIG. 34 are conceptual representations of the structures, elements, and attributes that may be used to implement some embodiments.

Figure 35:
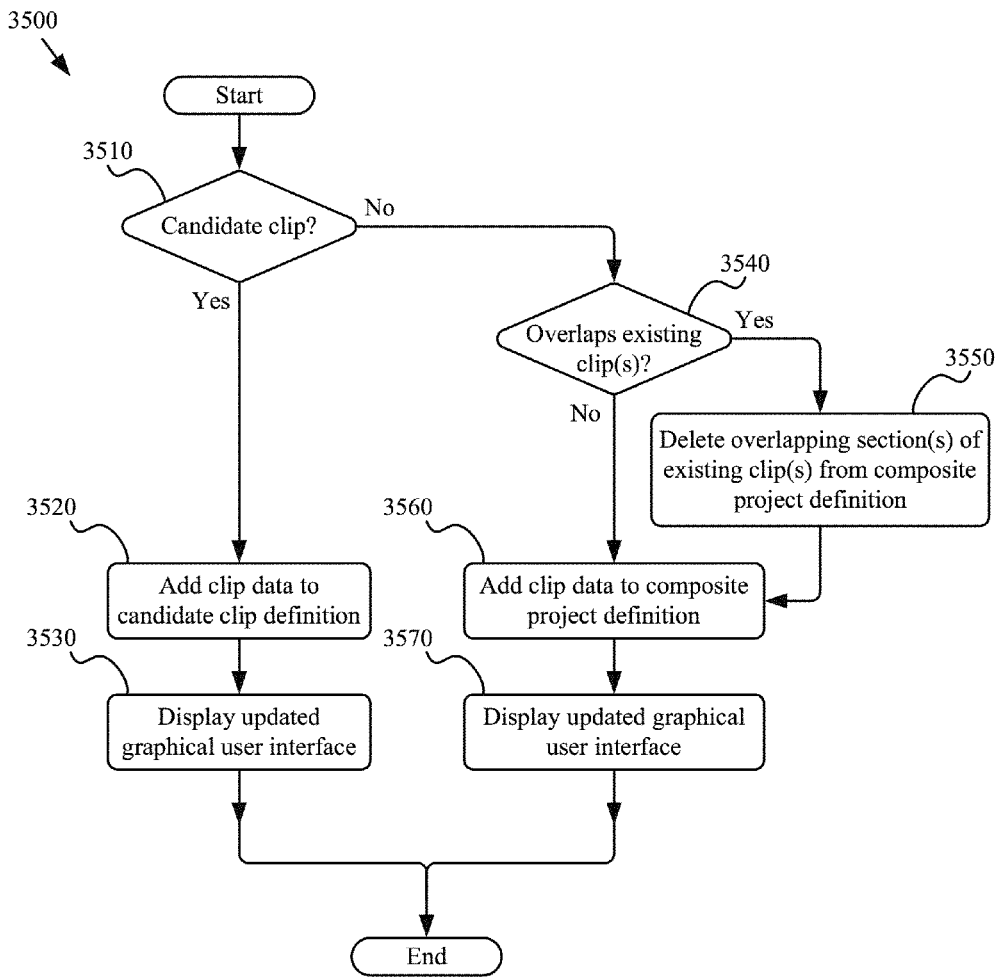
FIG. 35 illustrates an example of a conceptual process that some embodiments perform when a request is made to add media content to the composite display area.

FIG. 35 illustrates an example of a conceptual process 3500 that some embodiments perform when a request is made to add media content to the composite display area. The process 3500 starts when the media editing application receives a request to add a clip (or group of clips) to the media project. The request to add a clip may be received in various ways. For example, a drag-and-drop cursor operation, pull-down or pop-up menu selection, or series of keystrokes may be used to request that a clip be added to the composite display area.

As described above, the process of selecting and adding a clip may be performed using a variety of operations. Thus, one of ordinary skill will recognize that in some embodiments, the process may determine whether the clip to be added is a preview clip before the clip has been selected. Or, the operations of receiving a selection and determining whether the clip is to be added as a preview clip may be performed at the same time based on a single user action.

In addition, process 3500 is a conceptual representation of the operations used when a clip is added to a media project. The specific operations of the process may not be performed in the exact order described or different specific operations may be performed in different embodiments. Also, the process may not be performed as one continuous series of operations. Furthermore, the process could be implemented using several sub-processes, or as part of a larger macro-process.

After receiving a request to add a clip, the process determines (at 3510) whether the clip is a preview clip. When determining (at 3510) that the clip to be added is a preview clip, process 3500 adds (at 3520) data to the preview clip definition (e.g., data structure(s) that define data for any preview clip(s) that will not be included in the composite presentation).

After the data corresponding to the preview clip has been added (at 3520) to the preview clip definition, the process displays (at 3530) an updated GUI. The updated GUI may show a new representation of a preview clip in the composite display area. In addition to (or in place of) being performed following the addition of clip data to the composite project definition, display operation 3530 may be performed in response to certain user actions or commands, at regular time intervals, etc. In addition, the updated GUI may be at least partially generated based on the updated composite project definition.

Thus, when adding a preview clip, both the display and the underlying data in the preview clip definition may be updated based on the addition of a preview clip. After the process updates (at 3520) the preview clip definition and displays (at 3530) the updated graphical user interface, the process ends.

When determining (at 3510) that the clip is not a preview clip, the process next determines (at 3540) whether any section of the added clip overlaps any section(s) of any existing clip(s) in the composite display area. The process may determine whether any section(s) of the added clip overlap any section(s) of existing clip(s) by evaluating the composite project definition. Thus, process 3500 may determine (at 3540) whether any clip sections overlap by evaluating neighboring clips in the same track to, for instance, determine if one clip's timeline out occurs after another clip's timeline in. In addition to determining (at 3540) whether any clip sections overlap, the process may determine (not shown) which sections of the clips overlap.

When the process determines (at 3540) that the added clip does overlap section(s) of existing clip(s), the process deletes (at 3550) the overlapping section(s) of the existing clip(s) from the composite project definition (e.g., data structure(s) that define the composite presentation).

After deleting (at 3550) any overlapping section of an existing clip from the composite project definition, or determining (at 3540) that no sections overlap, the process adds (at 3540) data to the composite project definition corresponding to the clip to be added.

After the data has been added (at 3560) to the composite project definition, the process displays (at 3570) an updated GUI. The updated GUI may show a new representation of a committed clip in the composite display area. Similar to the display operation 3530 described above, the display operation 3570 may be performed in response to certain user actions or commands, at regular time intervals, etc. In addition, the updated GUI may be at least partially generated based on the updated composite project definition.

When adding a committed clip, both the display and the underlying data in the composite project definition may be updated based on the addition of a committed clip. After the process updates (at 3560) the composite project definition and displays (at 3570) the updated graphical user interface, the process ends.

In addition, in some embodiments the preview clip definition is not saved unless a user commits the preview edit(s) to the composite project. In other embodiments, the preview clip definition may be saved as preview data (i.e., saved without affecting the composite project definition). Alternatively, some embodiments may allow the user to save preview clip definition in a separate file location from the composite project definition.

Furthermore, although the process of adding a clip has been described with references to certain features and actions, one of ordinary skill in the art will recognize that the process may be implemented using other specific embodiments without departing from the spirit of the invention. For instance, the process could initially add all clips as preview clips before receiving another indication causing the preview clip to be converted to a committed clip. In addition, some potential operations have been omitted for clarity.

For instance, after inserting one or more clips, a user may choose to save the composite project data before continuing. In the next section, various editing functions that may be used on the added preview or committed clips are described. In addition, some embodiments of the process may determine if the added preview clip overlaps an existing preview clip in the same track and delete the overlapping section of the existing preview clip from the preview clip definition. Other embodiments, however, may allow preview clips to overlap in the same track.

In addition, although the process of creating a candidate audition clip set has been described with references to certain features and actions, one of ordinary skill in the art will recognize that the process may be implemented using other specific embodiments without departing from the spirit of the invention. For instance, the process could receive a clip selection before creating a candidate audition clip set. Furthermore, some potential operations have been omitted for clarity. For instance, after adding one or more clips to a candidate audition clip set, a user may choose to save the composite project data before continuing. The next sub-section describes the operations used to select from among multiple candidate audition clip sets that are associated with a particular location in the composite project.

D. Managing Candidate Audition Clip Sets

FIGS. 36-41 illustrate one example way of selecting from among multiple candidate audition clip sets that are associated with a particular location in the composite project. In the example of FIGS. 36-41, after invoking the audition feature and creating an associated set of candidate audition clip sets, a user may select a particular candidate audition clip set from the associated set of candidate audition clip sets using the GUI 300 by performing a series of cursor operations. The GUI 300 is the same GUI 300 described above in reference to FIGS. 3-32. Also, to illustrate the example of selecting a particular candidate audition clip set through the use of cursor operations, FIGS. 36-41 explain six different stages of a user's interaction with the GUI 300.

Figure 36:
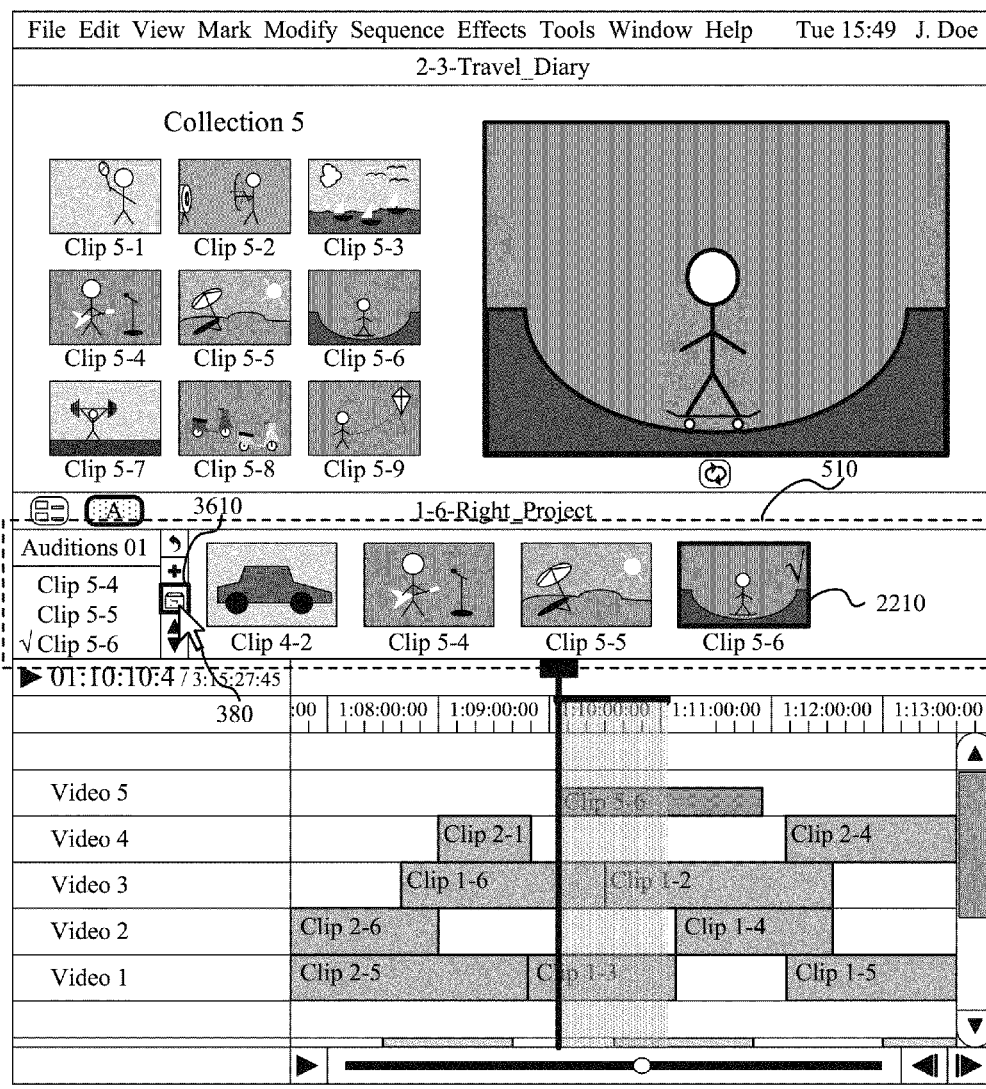
FIG. 36 illustrates the GUI of some embodiments after the audition feature has been invoked, and a particular set of candidate audition clips has been selected.

FIG. 36 illustrates a first stage that is after the audition feature has been invoked, and a particular set of candidate audition clips has been selected. The invocation of the audition feature may have been performed in a similar manner to that described above in reference to FIGS. 3-6. In addition, the candidate audition clip set may have been created as described above in reference to FIGS. 16-22. In this stage, a user activates a candidate audition clip set selection item 3610 in the audition display area 510.

As shown in FIG. 36, a user may position the cursor 380 at a particular location of the GUI 300, before performing a left-cursor click operation to activate the candidate audition clip set selection item 3610 in order to select a different set of candidate audition clips to be displayed in the audition display area 510. As shown, this activation operation has caused a change in the graphical representation of the candidate audition clip set selection item 3610. This activation may be indicated in various ways, such as a bold outline, a change in background, a change in color, etc.

Figure 37:
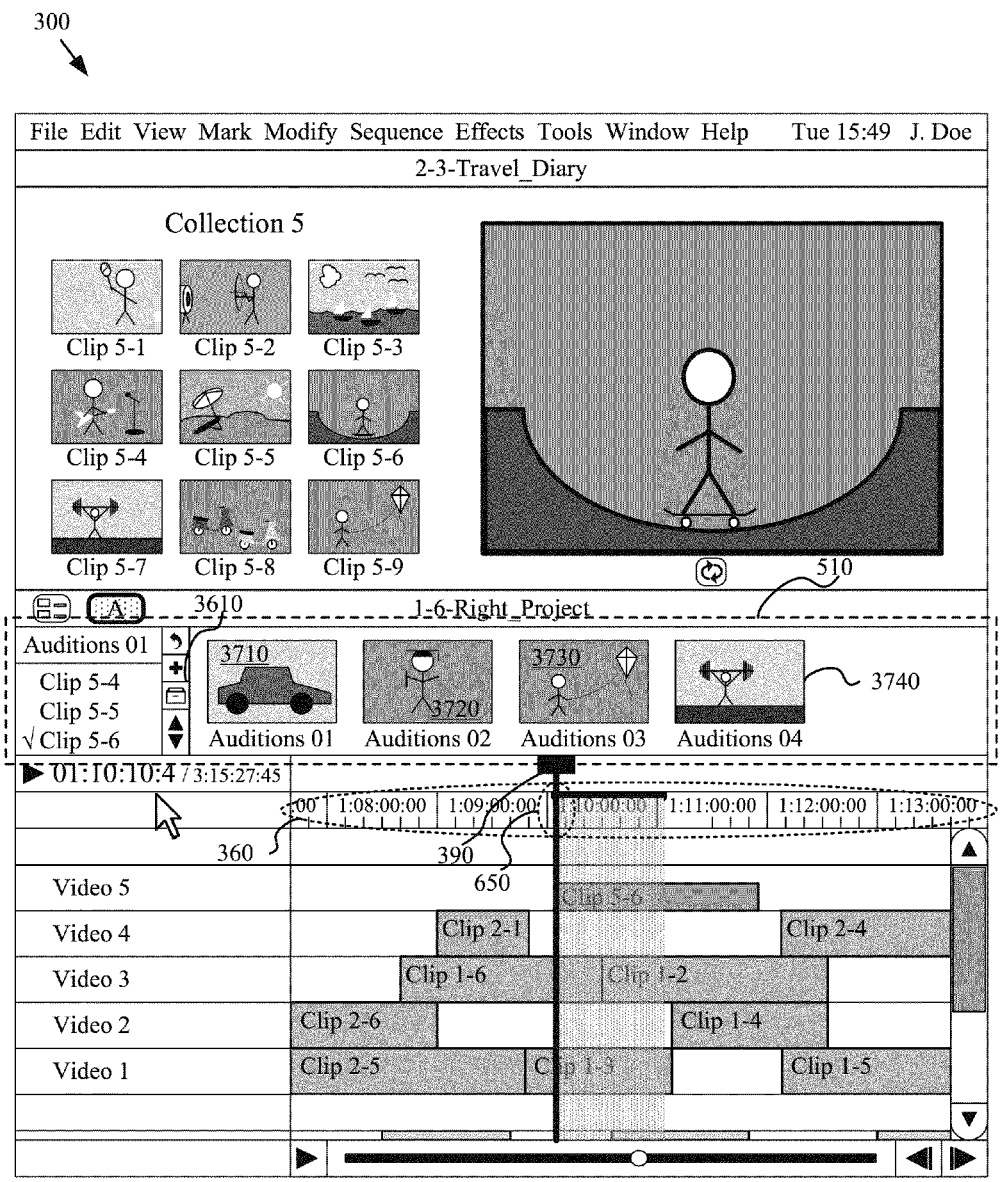
FIG. 37 illustrates the GUI of some embodiments after the user has activated the candidate audition clip set selection item.

FIG. 37 illustrates a second stage of user interaction after the user has activated the candidate audition clip set selection item 3610. As shown, this selection operation has caused the audition display area 510 to display several thumbnails 3710-3740 where each thumbnail represents a set of candidate audition clips. Each of the sets of candidate audition clips may have been created as described above in the example of FIGS. 16-22, or by some other appropriate method. The sets of candidate audition clips 3710-3740 are all associated with a particular location 650 along the timeline 360.

In some embodiments, the location 650 is determined by the position of the playhead 390. Some embodiments may identify the particular location by identifying the location corresponding to a selected clip or set of candidate audition clips (e.g., by determining the location of the selected clip 2210 as shown in FIG. 36). Because audition clips may be placed on any of the available tracks, some embodiments may require the user to select a particular track as well as a particular location in order to identify any sets of candidate audition clips associated with the particular location in the particular track.

Figure 38:
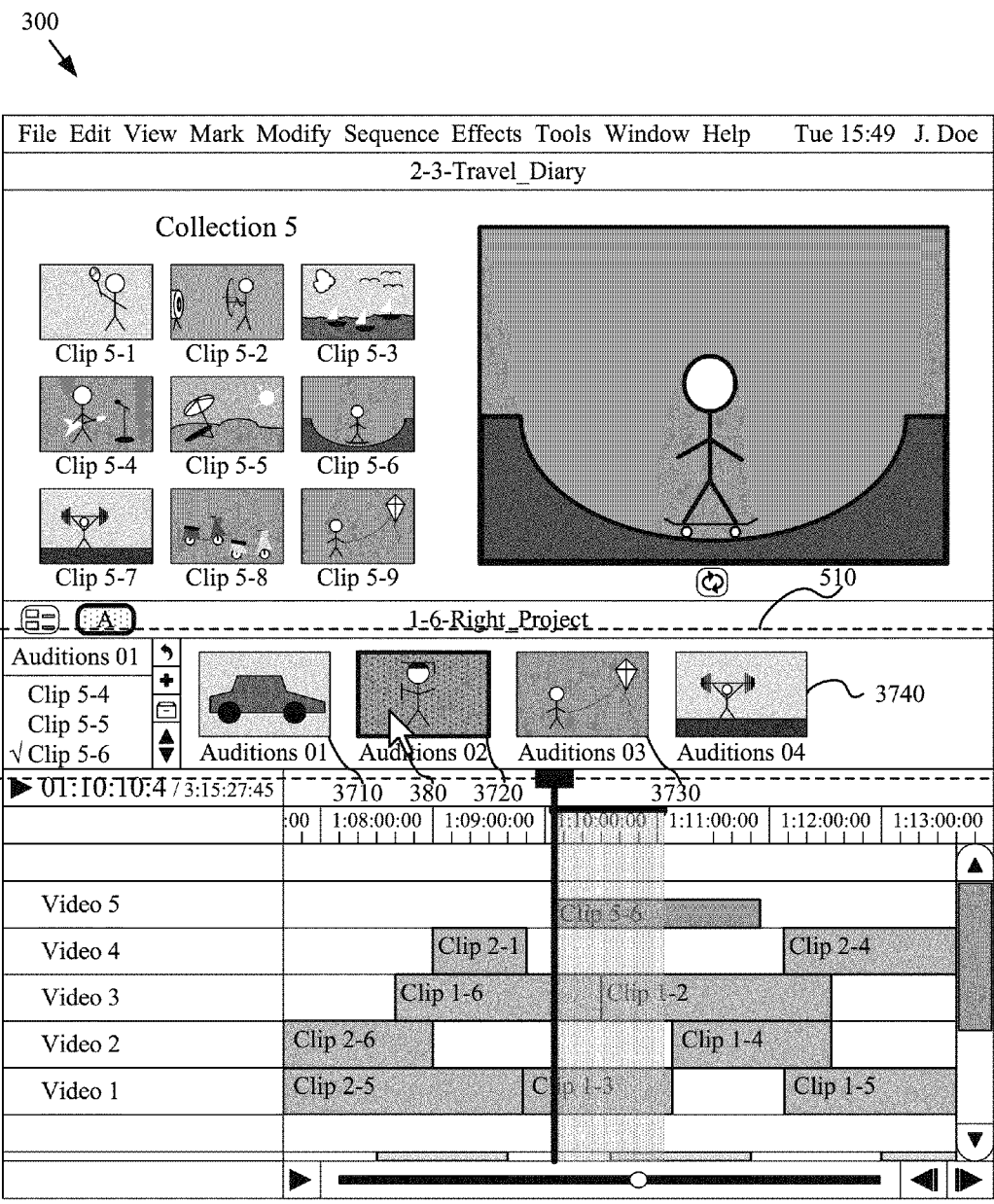
FIG. 38 illustrates the GUI of some embodiments after the user has activated the candidate audition clip set selection item and the audition display area has been updated to show several sets of candidate audition clips.

FIG. 38 illustrates a third stage of user interaction after the user has activated the candidate audition clip set selection item 3610 and the audition display area 510 has been updated to show several sets of candidate audition clips 3710-3740. In this stage, the user selects a particular candidate audition clip set 3720 from the audition display area 510. The user makes this selection by moving the cursor 380 to a location over the thumbnail representation of the candidate audition clip set 3720 and performing a left-cursor click operation.

As shown, this selection operation has caused a change in the graphical representation of the selected candidate audition clip set 3720 relative to the other candidate audition clip sets. The selected candidate audition clip set may be indicated in various ways, such as a bold outline, a change in background, a change in color, etc. In some embodiments, the candidate audition clip set 3720 may also be selected through any number of other techniques, such as a combination of keystrokes, a pull-down or pop-up menu selection, etc.

Figure 39:
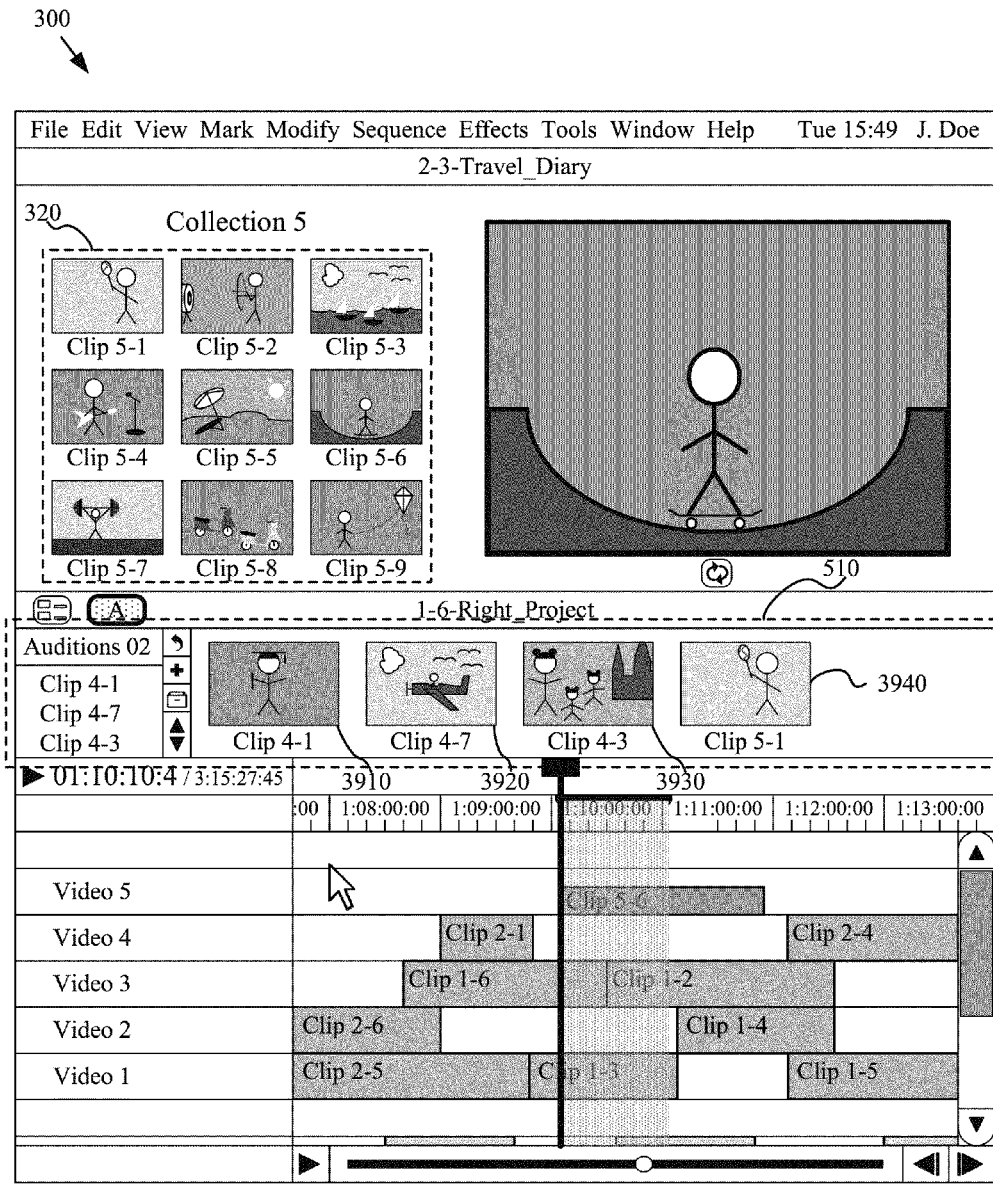
FIG. 39 illustrates the GUI of some embodiments after the user has selected an alternative set of candidate audition clips.

FIG. 39 illustrates a fourth stage of user interaction after the user has selected an alternative set of candidate audition clips. As shown, this selection operation has caused the audition display area 510 to be updated to show the candidate audition clips 3910-3940 that are included in the set of candidate audition clips 3720 that was selected in the third stage as described above in reference to FIG. 38.

The ability to recall different sets of candidate audition clip allows a user to easily switch between groups of clips. In addition, a user may access groups of clips that are not included in a single media library 320 or file location. For instance, in the example of FIG. 39, three clips 3910-3930 in the set of candidate audition clips are not included in the currently-displayed media library 320, while one clip 3940 is included in the media library 320. Thus, the user may access multiple clips from multiple media library sources without performing, for example, the series of operations described above in reference to FIGS. 16-17 to successively select different media libraries in order to access individual clips.

Figure 40:
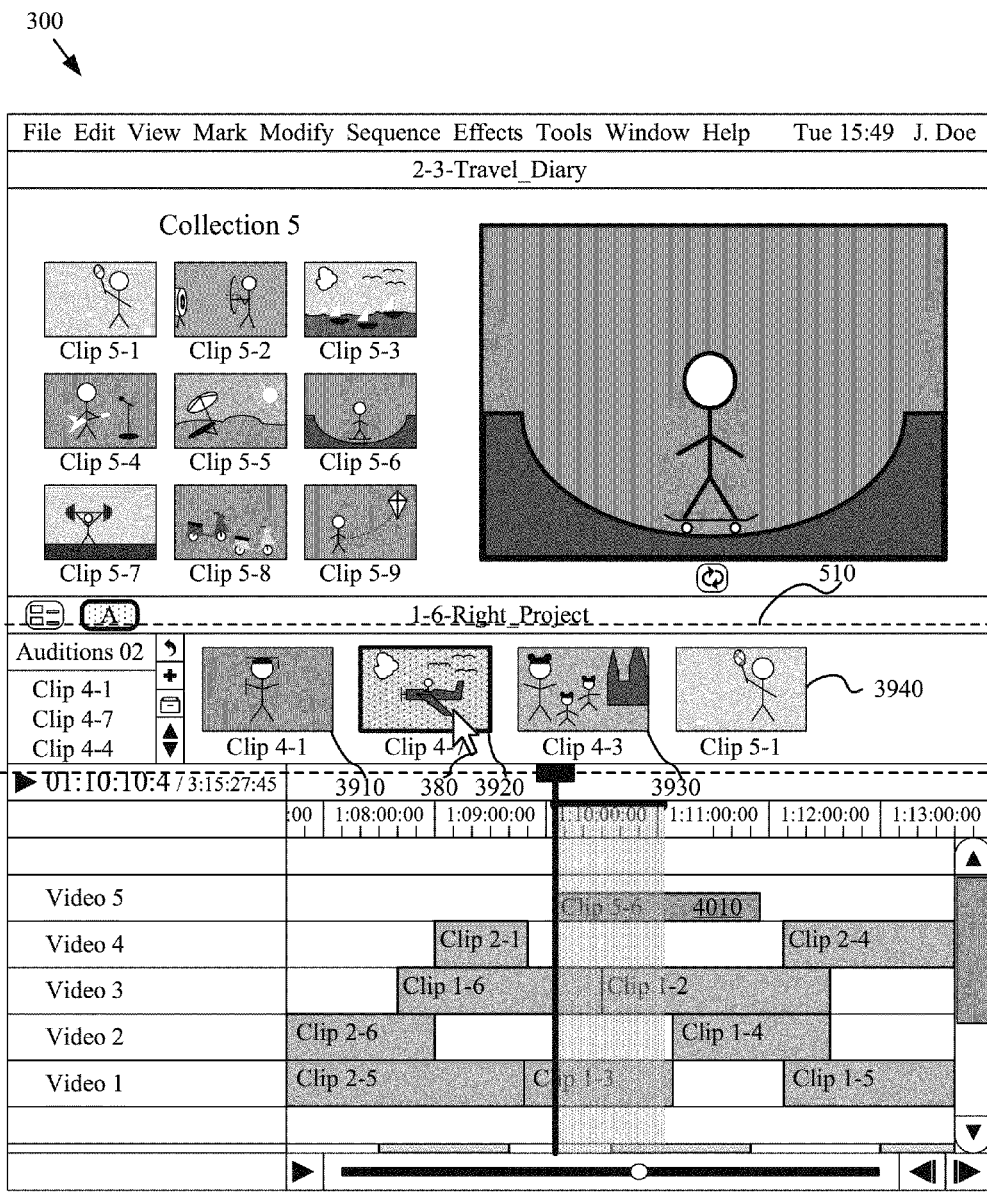
FIG. 40 illustrates the GUI of some embodiments after the audition display area has been updated based on a selection of a set of candidate audition clips.

FIG. 40 illustrates a fifth stage of user interaction after the audition display area 510 has been updated based on a selection of a set of candidate audition clips. In this stage, the user selects a particular candidate audition clip 3920 from the audition display area 510. The user makes this selection by moving the cursor 380 to a location over the candidate audition clip 3920 and performing a left-cursor click operation.

As shown, this selection operation has caused a change in the graphical representation of the selected candidate audition clip 3920 relative to the other candidate audition clips. As above, the selected candidate audition clip may be indicated in various ways, such as a bold outline, a change in background, a change in color, etc. In some embodiments, the candidate audition clip 3920 may also be selected through any number of other techniques, such as a combination of keystrokes, a pull-down or pop-up menu selection, etc.

Figure 41:
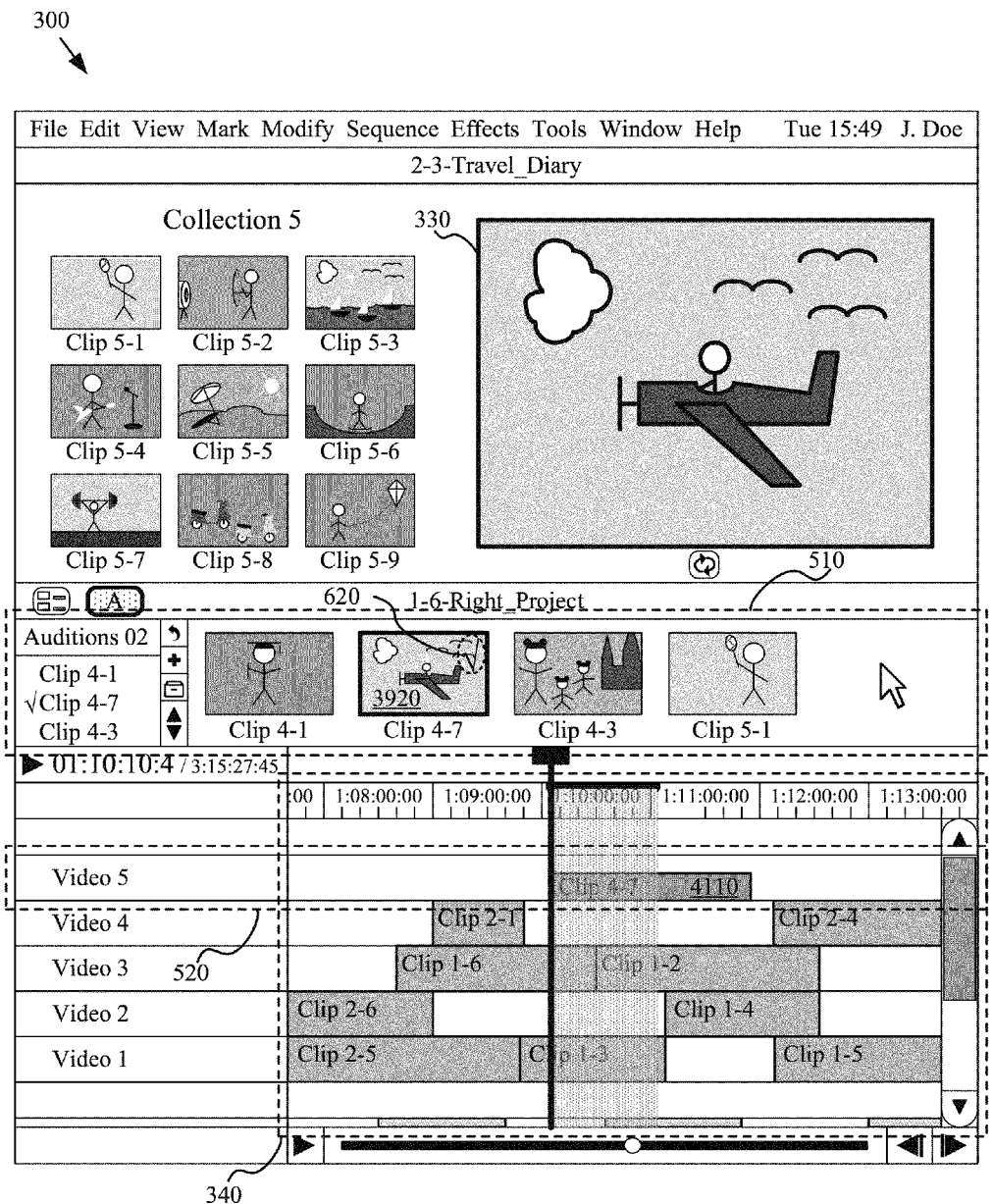
FIG. 41 illustrates the GUI of some embodiments after the user has selected a particular audition clip in the set of candidate audition clips.

FIG. 41 illustrates a sixth stage of user interaction after the user has selected a particular audition clip 3920 in the set of candidate audition clips. As shown, this selection operation has caused several updates to the GUI 300 display. The particular audition clip 3920 is shown with a bold border and a mark 620 indicating that the audition clip 3920 has been selected as the composite-target clip. In addition, the composite display area 340 has been updated with a new composite-target clip 4110 representing the selected candidate audition clip 3920. The updated composite-target clip 4110 replaces the previous composite-target clip 4010 in track 520. The preview display area 330 has also been updated to reflect the content of the newly-selected composite-target clip 3920.

II. Editing and Committing Audition Clips

Several edit operations that may be performed on the audition and/or non-audition clips shown in the composite display area are described below. Sub-section II.A describes various "live-edit" functions that are commonly performed on non-audition clips and may also be applied to audition clips in conjunction with the audition feature of some embodiments. Next, sub-section III.B describes the operations used by some embodiments to commit preview clips to the composite project data in some embodiments. Finally, sub-section II.C describes one example way of de-invoking the audition feature.

A. Live-Edit Functions

Figure 42:
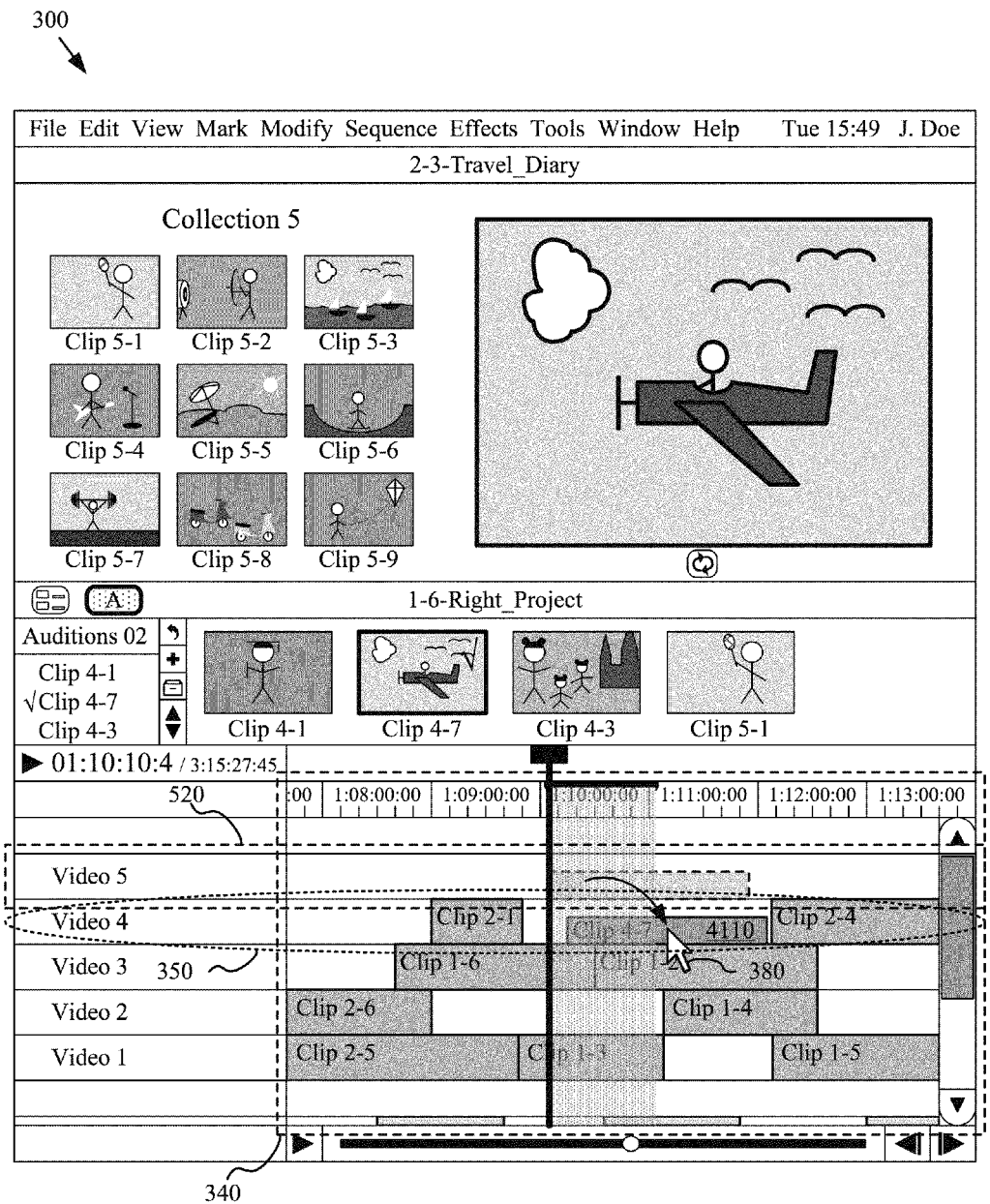
FIG. 42 illustrates a live-edit operation of moving a clip from one track to another in some embodiments.
Figure 43:
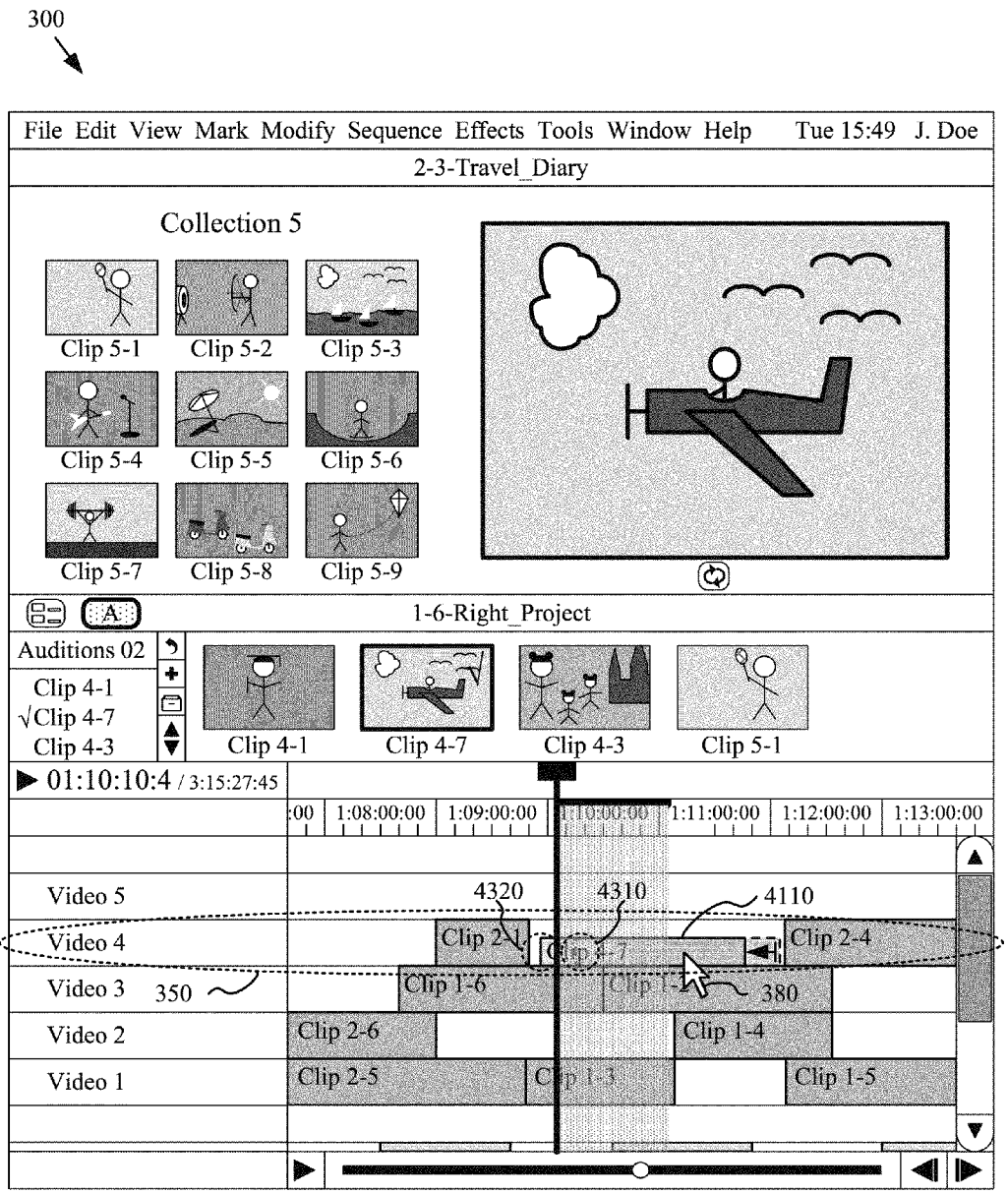
FIG. 43 illustrates a live-edit operation of moving a clip along a track in some embodiments.
Figure 44:
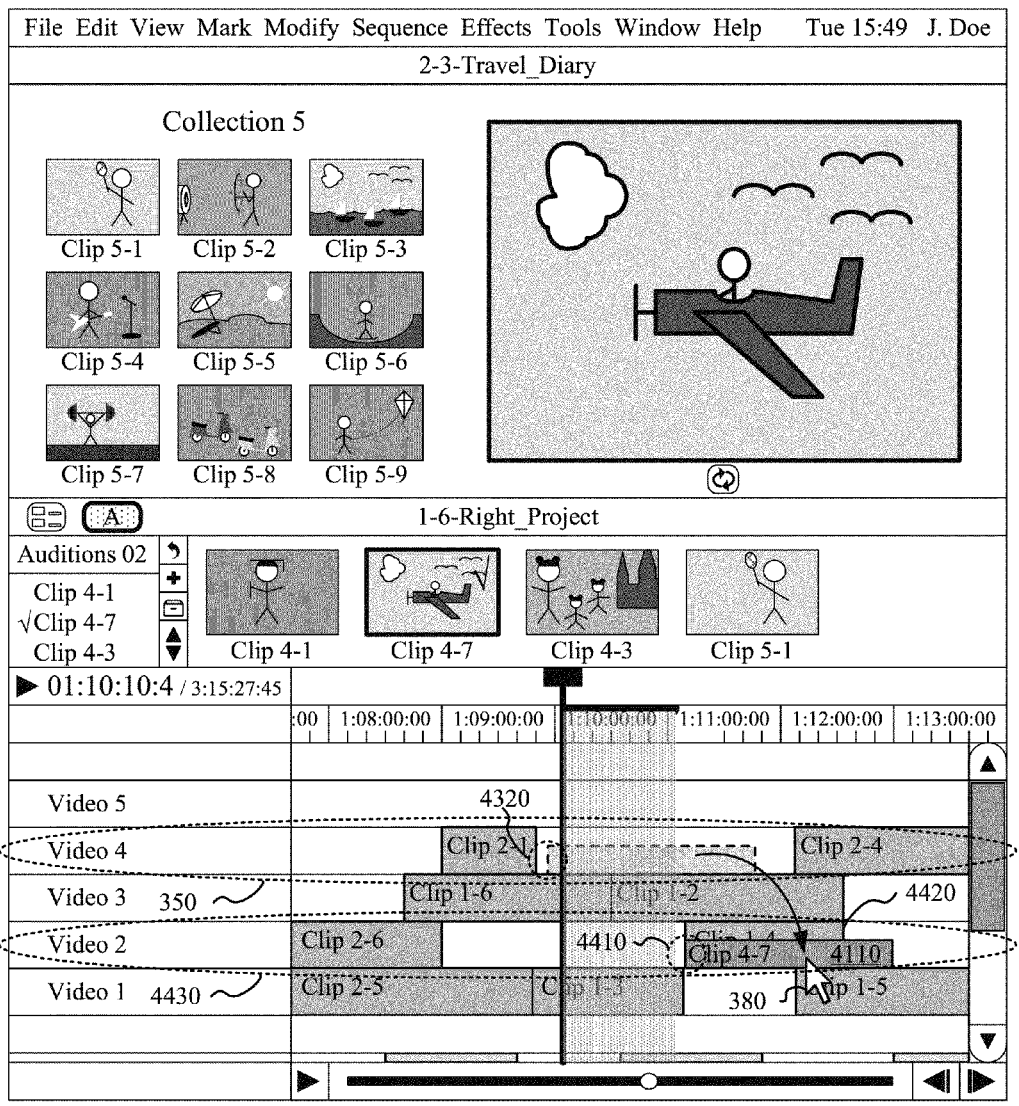
FIG. 44 illustrates a live-edit operation of replacing one clip with another in some embodiments.

FIGS. 42-44 illustrate several live-edit functions that may be performed in some embodiments. In the examples of FIGS. 42-44, the audition feature has been invoked and a set of candidate audition clips has been created and selected. The GUI 300 is the same GUI 300 described above in reference to FIGS. 3-32 and 36-41. Also, to illustrate the examples of performing various live-edit functions through the use of cursor operations, FIGS. 42-44 describe five different editing operations that may be performed on audition or non-audition clips.

FIG. 42 illustrates a live-edit operation of moving a clip from one track to another in some embodiments. Specifically, this figure illustrates moving an audition clip 4110 from track 520 to track 350. In this example, the clip 4110 is moved by using the cursor 380 to perform a drag-and-drop operation.

As shown, the audition clip 4110 is moved from track 520 to track 350. In this example, a user selects the audition clip 4110 by performing a left-cursor click operation and moving the cursor to another location in the composite display area 340 before releasing the left-cursor. The clip 4110 is moved to an open location in track 350 in this example, but may also be moved to an occupied location in a track as will be described below. In addition, non-audition clips may be moved between tracks in a similar manner. After being moved, the clip 4110 is still a preview audition clip (as indicated by its differentiating color).

FIG. 43 illustrates a live-edit operation of moving a clip 4110 along a track 350 in some embodiments. Specifically, this figure describes the operations used to move a clip along a track 350 using a click-and-drag operation. As shown, the clip 4110 is moved from one location 4310 to a second location 4320 along track 350. Clips on other tracks may be moved in a similar manner. In this example the clip is moved within an open location, but may also be moved to overlap an occupied location, as will be described below.

FIG. 44 illustrates a live-edit operation of replacing one clip with another in some embodiments. In this example, this figure describes the operations used to move a preview clip from a first location 4320 to a second location 4410 that had been occupied by another clip 4420. As described above, a preview clip does not overwrite existing composite project data, but may still be manipulated in the same manner as committed clip. The preview clip 4110 has been moved from one location 4320 to a second location 4410 in a different track 4430. A clip may be moved within a single track in a similar manner.

In this example the clip is an audition clip, and is also a preview clip, and thus does not completely displace the previously-existing clip 4420. The preview clip has been represented as a half-height rectangle 4110 in this example, but other embodiments may represent preview clips in other ways (e.g., different colors, shapes, etc.). As shown, the preview clip does not completely displace the existing clip, thus allowing a user to manipulate the preview audition clip 4110 without affecting the existing composite clip 4420 or the composite project, as defined by the committed clips. In some embodiments, a pop-up menu may be invoked such that the user may indicate whether clip 4420 should be added to the audition clip set. In other embodiments, the clip 4420 is added to the audition clip set by default.

Figure 45:
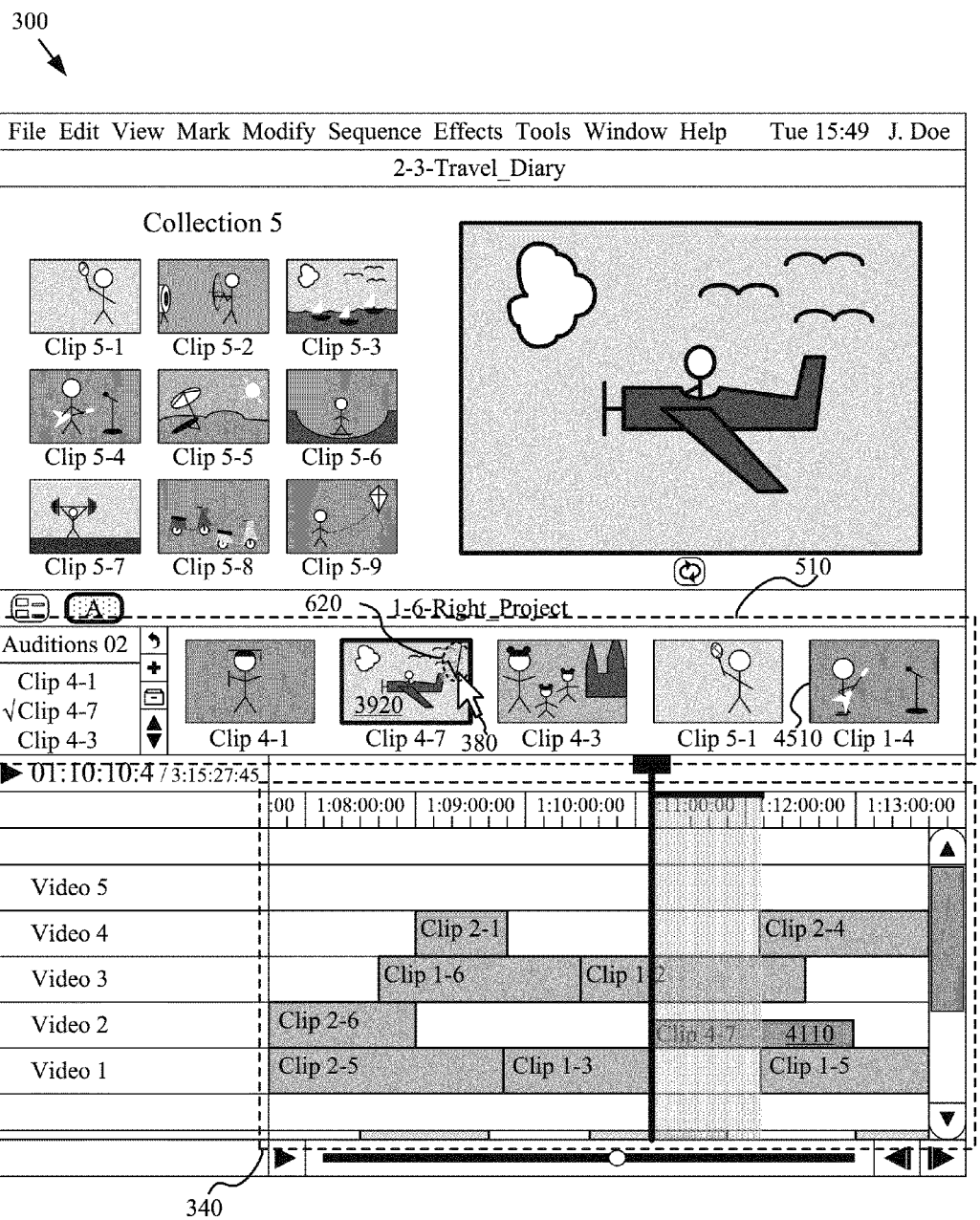
FIG. 45 illustrates the GUI of some embodiments after a user has invoked the audition feature and selected an audition clip for conversion.

FIG. 45 shows the result of the operation performed in FIG. 44 when a user has elected to include clip 4420 in the audition clip set. As shown, clip 4420 has been added to the audition display area 510 and is displayed as a thumbnail 4510. In addition, clip 4420 has been removed from the composite display area 340. In some embodiments, the clip 4420 may be left in the audition display area, with the composite-target clip 4110 displayed over the committed clip 4420 (e.g., as shown in FIG. 44).

In some embodiments (not shown) the committed clip (i.e., clip 4420) may be automatically selected as the composite-target clip when it is added to the set of candidate audition clips. Furthermore, in some embodiments (not shown), when the committed clip 4420 is selected as the composite-target clip, the composite-target clip's graphical representation is changed from that of a preview clip to a committed clip, where the committed clip representation may have some indication that there is an associated set of candidate audition clips (e.g., marker 2450). In any case, a set of candidate audition clips will include no more than one committed audition clip at any time.

In some embodiments, once the committed clip has been added to a set of audition clips, the committed clip will be moved along with the composite-target clip that represents the set of candidate audition clips (i.e., the committed clip will not be restored to its previous location if the set of candidate audition clips is moved to a different location, deleted, etc.). In some cases, a user may select a "cancel" or "revert" option to restore the committed clip to its location (and/or to remove the committed clip from the set of audition clips) before it was added to the set of audition clips.

Although many editing operations have been described above using the example of cursor-control operations, one of ordinary skill will recognize that such operations may be performed in other ways (e.g., pull-down or pop-up menus, a combination of keystrokes, etc.).

B. Converting Audition Clips to Non-Audition Clips

Figure 46:
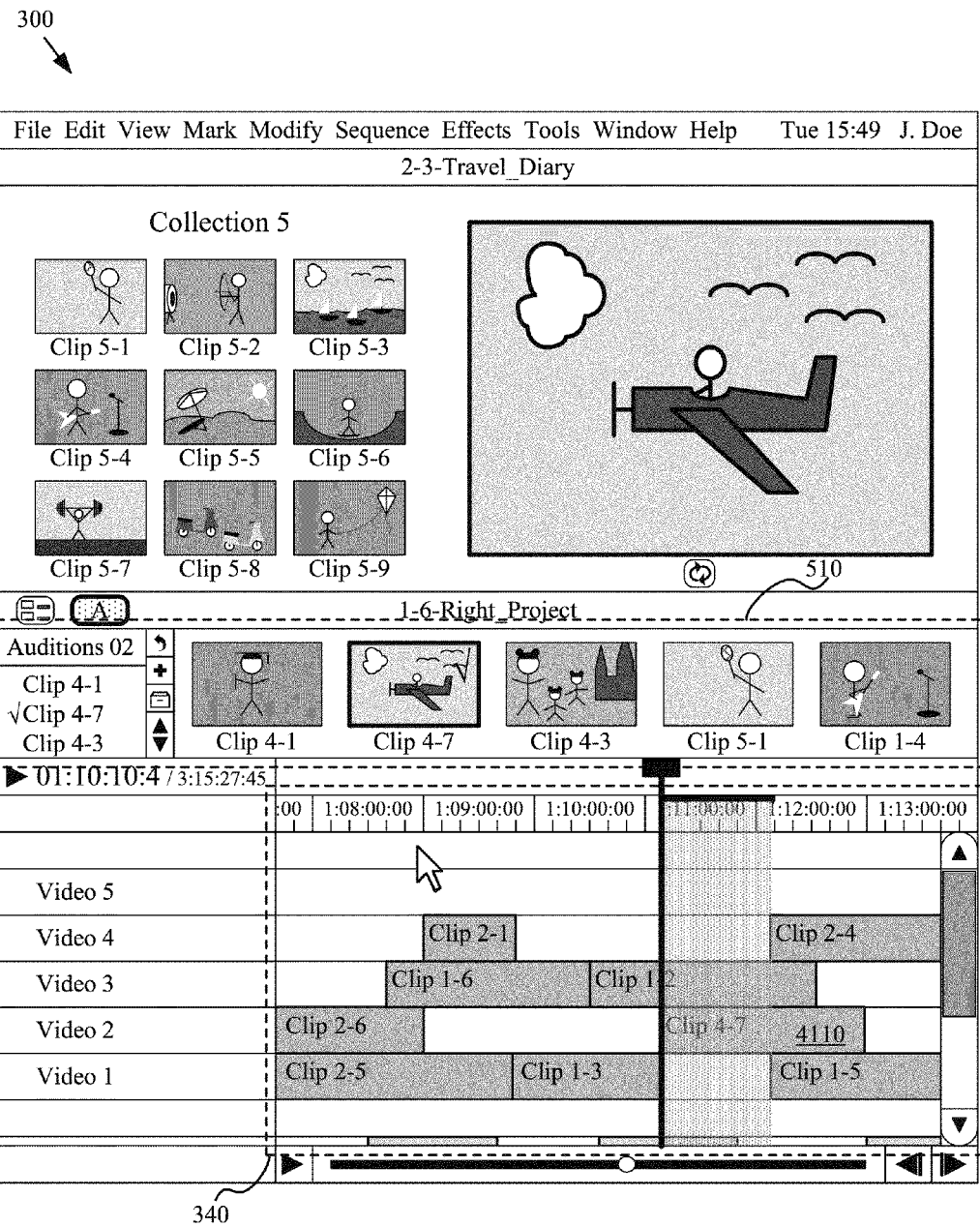
FIG. 46 illustrates the GUI of some embodiments after the user has selected the mark in some embodiments.

FIGS. 45-46 illustrate one example of converting an audition clip to a non-audition clip. In the examples of FIGS. 45-46, the audition feature has been invoked and a set of candidate audition clips has been created and selected. The GUI 300 is the same GUI 300 described above in reference to FIGS. 3-32 and 36-44. The state of the GUI 300 follows the state of the GUI as shown in FIG. 44. The invocation of the audition feature may have been performed in a similar manner to that described above in reference to FIGS. 3-6. In addition, the candidate audition clip set may have been created as described above in reference to FIGS. 16-22. Also, to illustrate the example of converting a particular audition clip to a non-audition clip through the use of cursor operations, FIGS. 45-46 explain two different stages of a user's interaction with the GUI 300.

FIG. 45 illustrates a first stage that is after a user has invoked the audition feature and selected an audition clip for conversion. The state of the GUI 300 follows the state described above in reference to FIG. 44, after the audition clip was moved to a location that replaced the existing committed clip. As shown in FIG. 45, in this stage a user initiates a conversion of an audition clip by selecting the mark 620 indicating that the audition clip 3920 has been selected as the composite-target clip 4110.

As shown in FIG. 45, a user may position the cursor 380 at a particular location of the GUI 300, before performing a left-cursor click operation to activate the mark 620 in order to convert the composite-target clip 4110 from an audition clip to a non-audition clip. As shown, this activation operation has caused a change in the graphical representation of the mark 620. This activation may be indicated in various ways, such as a change in background, a change in color, etc. A user may alternatively initiate the conversion operation using a series of keystrokes, a pull-down or pop-up menu command, etc. In addition, some embodiments may allow a user to convert a committed clip to a preview clip.

FIG. 46 illustrates a second stage of user interaction after the user has selected the mark 620 in some embodiments. As shown, this selection operation has caused the composite-target clip 4110 shown in the composite display area 340 to be updated such that the clip 4110 is represented as a non-audition clip (i.e., the clip 4110 is now represented as the same shape and color as the other non-audition clips shown in the composite display area 340). Although the clip 4110 is no longer represented as an audition clip in the composite display area 340, in some embodiments, the user may still be able to recall the various candidate audition clip sets that were associated with the since-converted composite-target clip 4110. In addition, in some of these embodiments the associated audition clip sets may be indicated by a marker such as the marker 2450 described above in reference to FIG. 24. In other embodiments, the associations to any audition clip sets may be removed by the conversion and would not be available for recall by the user at a future time.

C. Ending the Audition Session

Figure 47:
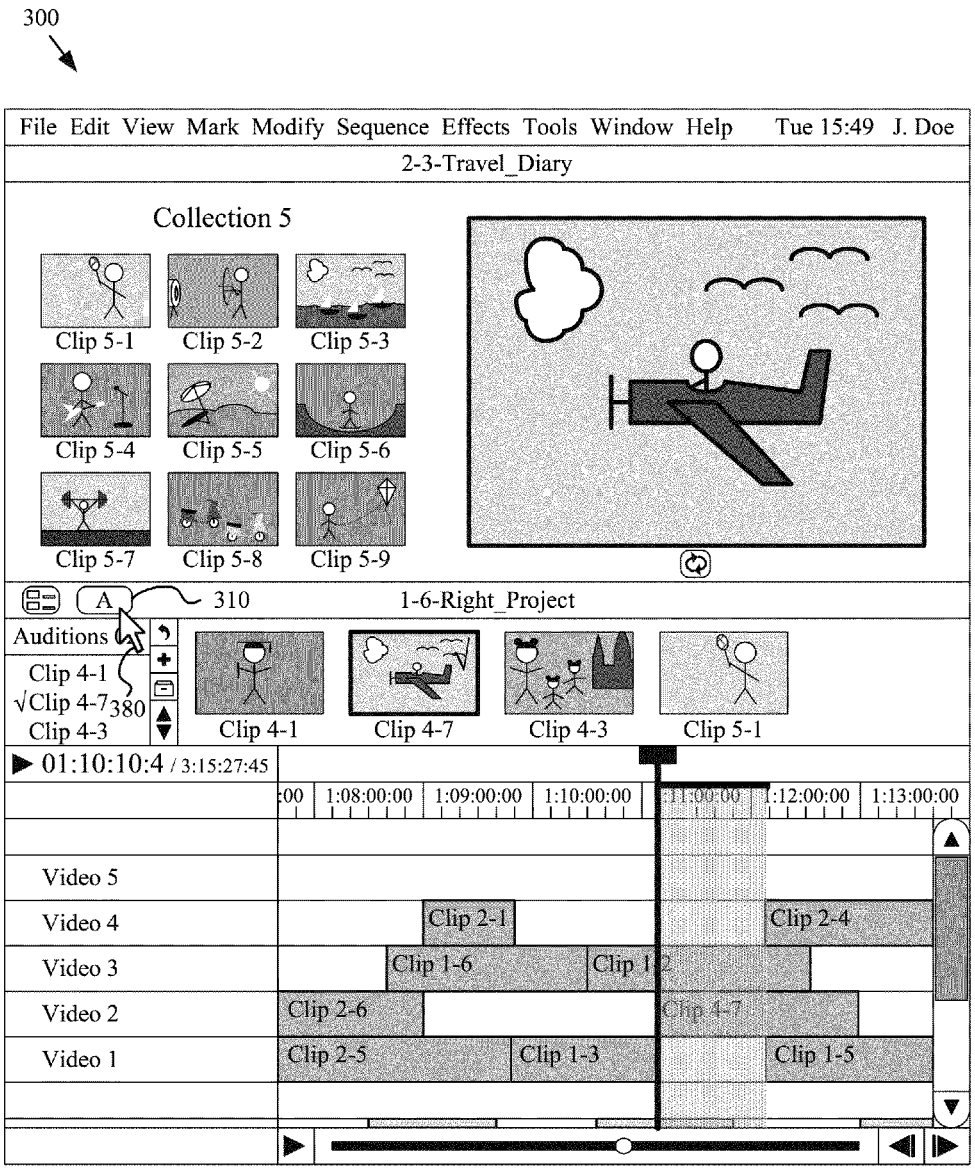
FIG. 47 illustrates the GUI of some embodiments after a user has invoked the audition feature in some embodiments.
Figure 48:
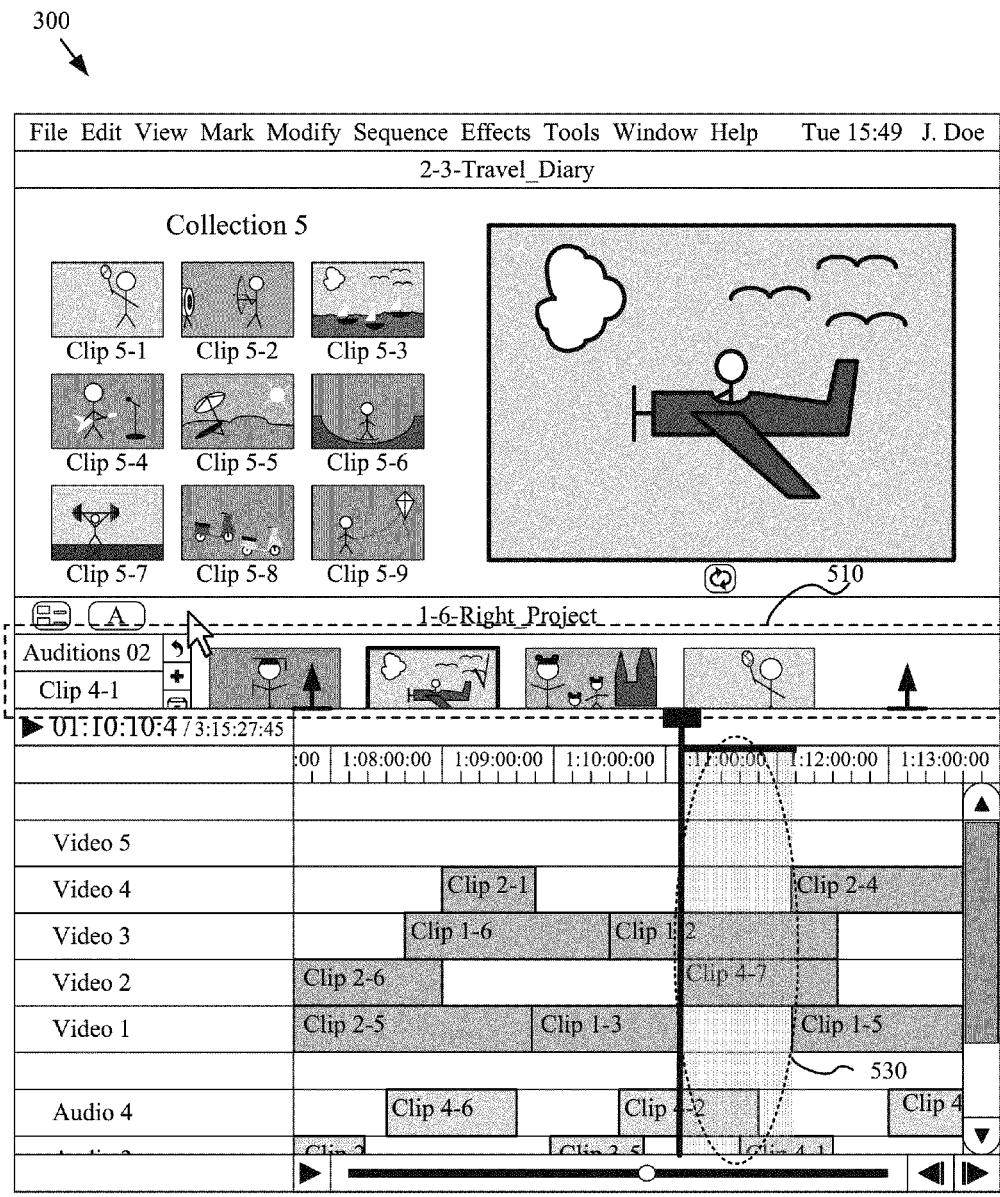
FIG. 48 illustrates the GUI of some embodiments after the user has selected the audition selection item.
Figure 49:
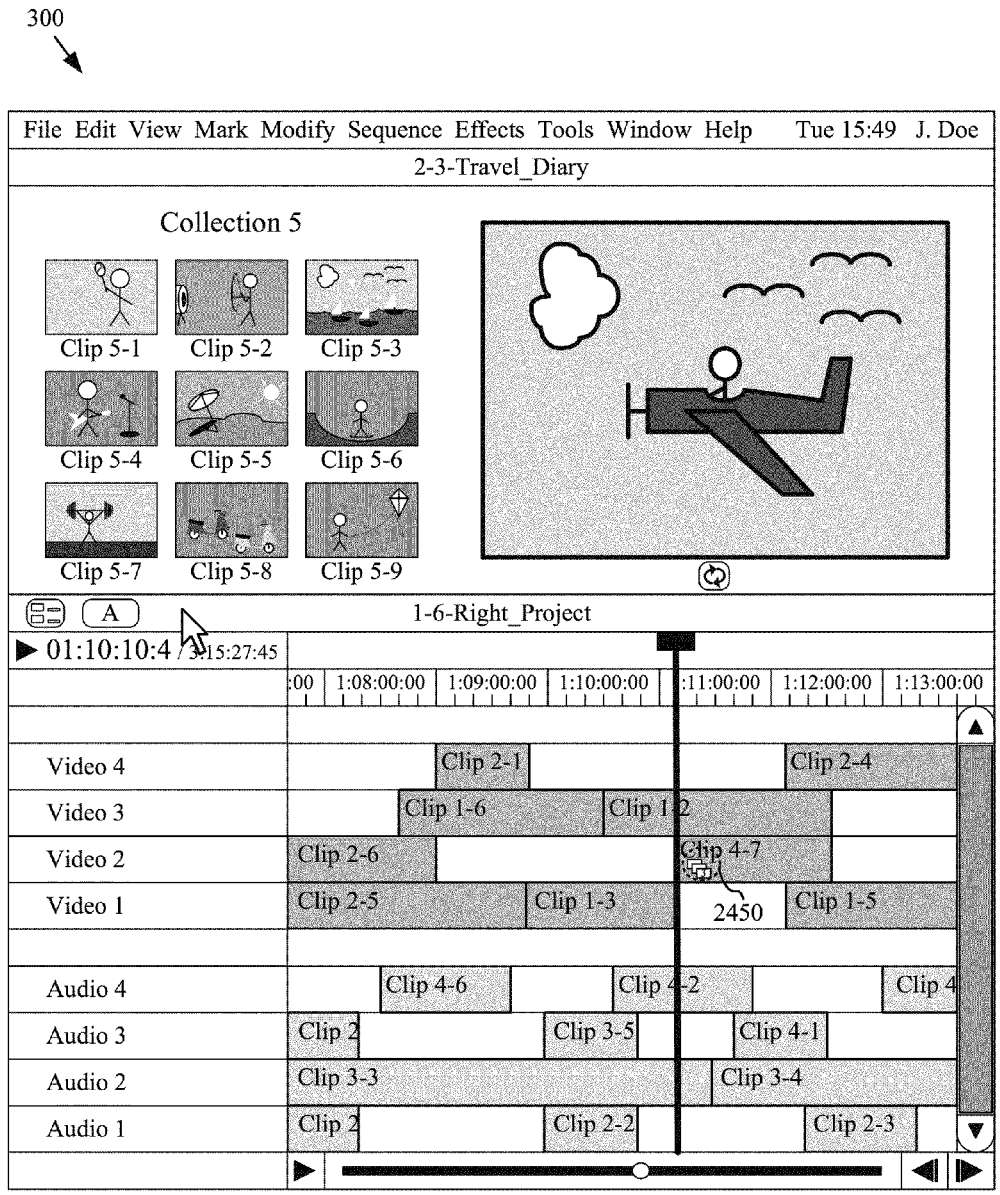
FIG. 49 illustrates the GUI of some embodiments after the user has de-invoked the audition feature.

FIGS. 47-49 illustrate one example way of ending an audition session (i.e., de-invoking the audition feature). In this example, the user has previously invoked the audition feature and converted an audition clip to a non-audition clip, as described above in reference to FIGS. 45-46. However, in some cases, a user may also wish to end the audition session without converting any audition clips to non-audition clips. The GUI 300 in the example of FIGS. 47-49 is the same GUI 300 described above in reference to FIGS. 3-32, 36-46. The invocation of the audition feature may have been performed in a similar manner to that described above in reference to FIGS. 3-6. Also, to illustrate the example of ending an audition session through the use of cursor operations, FIGS. 47-49 explain three different stages of a user's interaction with the GUI 300.

FIG. 47 illustrates a first stage that is after a user has invoked the audition feature in some embodiments. The state of the GUI 300 follows the state described above in reference to FIG. 46, after the audition clip 4110 was converted to a non-audition clip. As shown in FIG. 47, in this stage a user selects the audition selection item 310.

As shown in FIG. 47, a user may position the cursor 380 at a particular location of the GUI 300, before performing a left-cursor click operation to select the audition selection item 310 in order to terminate the audition session and de-invoke the audition feature. As shown, this selection operation has caused a change in the graphical representation of the audition selection item 310. This selection (or de-selection) may be indicated in various ways, such as a change in background, a change in color, etc. A user may alternatively de-invoke the audition feature using a series of keystrokes, a pull-down or pop-up menu command, etc.

FIG. 48 illustrates a second stage of user interaction after the user has selected the audition selection item 310. As shown, this selection operation has caused the audition display area 510 to be partially removed from the GUI 300, although the audition range selector 530 is still completely visible in this example. In some embodiments, the track 520 that was created when the audition tool was invoked would be removed from the composite display area when the audition session is ended (so long as there on no clips remaining on the newly-created track). The audition feature may be de-invoked immediately or removed from the display in a different manner in different embodiments. In addition, some embodiments may display the audition feature components (e.g., the audition display area 510) even when the audition feature has not been invoked (or has been de-invoked).

FIG. 49 illustrates a third stage of user interaction after the user has de-invoked the audition feature. As shown, the audition range selector, audition display area, and newly-added track have been completely removed from the GUI 300.

In some embodiments, the audition session information (e.g., clips in the candidate audition clip set) may be saved when the audition session is ended (as indicated by marker 2450 in this example). In other embodiments, the audition session information may be deleted when the audition session ends. In some cases, the determination of whether to save the audition information may be based on a selection made by the user. In other cases, the determination may be a default determination or may be made based on the status of the audition clip or clips (e.g., committed versus preview). In some embodiment, when the audition feature is de-invoked, the marker 2450 would not be displayed (i.e., the user would have to invoke the audition feature in order to enable the display of the marker).

The preceding section has described several example live-edit operations, the operations used to convert an audition clip to a non-audition clip in some embodiments, and an example way of de-invoking the audition tool. Section III, below, describes some example ways that a user may review these edit operations and preview the composite project as it would appear with a particular audition clip. In this manner, a user may verify that a particular audition clip suits the particular location that it will be inserted in the project before the user commits to the particular audition clip.

III. Invoking Playback Preview

The following section describes the operations used by some embodiments to perform playback preview (i.e., playback of a presentation or a section of a presentation in the preview display area).

Figure 50:
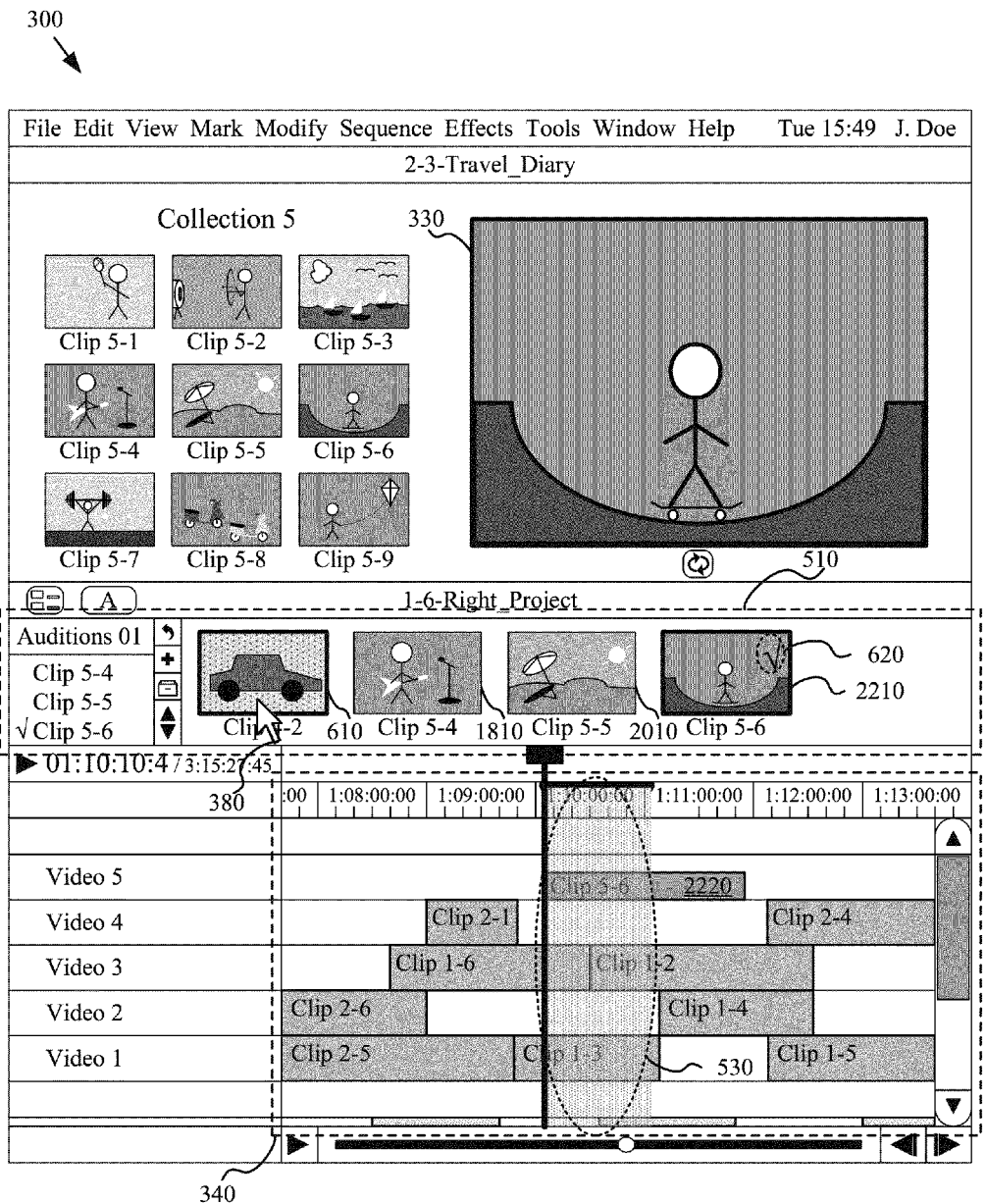
FIG. 50 illustrates the GUI of some embodiments after the audition feature has been invoked and a particular candidate audition clip has been selected.
Figure 51:
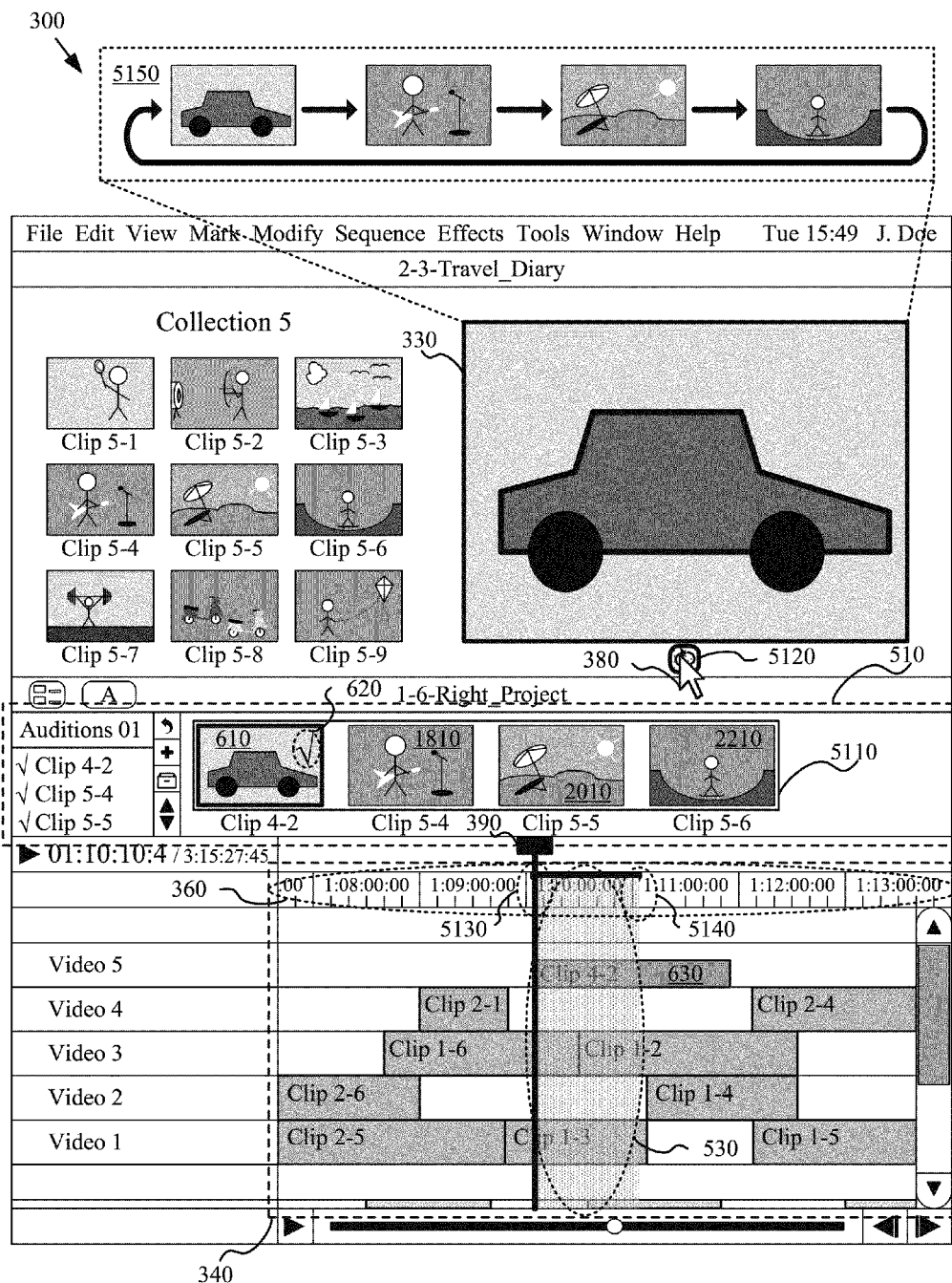
FIG. 51 illustrates the GUI of some embodiments after the user has selected multiple candidate audition clips and invoked preview playback.

FIGS. 50-51 illustrate one example way of invoking playback preview. In the examples of FIGS. 50-51, the audition feature has been invoked and a set of candidate audition clips has been created and selected. The GUI 300 in the example of FIGS. 50-51 is the same GUI 300 described above in reference to FIGS. 3-32, and 36-49. The example of FIGS. 50-51 follows the state of the GUI 300 described above in reference to FIG. 36. Also, to illustrate the example of performing preview playback through the use of cursor operations, FIGS. 50-51 explain two different stages of a user's interaction with the GUI 300.

FIG. 50 illustrates a first stage that is after the audition feature has been invoked and a particular candidate audition clip 2210 has been selected. The invocation of the audition feature may have been performed in a similar manner to that described above in reference to FIGS. 3-6. In addition, the candidate audition clip set may have been created as described above in reference to FIGS. 16-22. The first stage shown in FIG. 50 follows the state of the GUI 300 as described above in reference to FIG. 22. As shown in FIG. 50, in this stage, a user selects multiple candidate audition clips 610, 1810, 2010, and 2210 from a set of candidate audition clips displayed in the audition display area 510.

As shown in FIG. 50, a user may position the cursor 380 at a particular location of the GUI 300, before performing a shift-left-cursor click operation to select the candidate audition clip 610 without releasing the selection of the previously-selected candidate audition clip 2210 (as indicated by the thicker border and mark 620). Alternatively, a user may perform a drag-and-select operation to select a group of clips, perform a series of keystrokes, or some other appropriate operations to select multiple clips. As shown, this selection operation has caused a change in the graphical representation of the candidate audition clip 610. This selection (or de-selection) may be indicated in various ways, such as a change in background, a change in color, etc.

FIG. 51 illustrates a second stage of user interaction after the user has selected multiple candidate audition clips in some embodiments. As shown, this selection operation has caused the candidate audition clips 610, 1810, 2010, and 2210 in the audition display area 510 to be surrounded by a selection box 5110. The selection box indicates that each clip inside the box will be played in succession when viewing a preview playback of the composite presentation including the candidate audition clips. The audition display area 510 has been updated to show that the clip 610 is now active (as indicated by the thicker border and mark 620). In addition, the composite-target clip 630 has been updated in the composite display area 340 to reflect the selection of a different clip 610 in the candidate audition clip set shown in the audition display area 510. The preview display area 330 has also been updated to reflect the content of the newly-selected composite-target clip 630.

In this stage, a user activates the preview playback function by using a cursor operation to select a preview playback item 5120. As shown in FIG. 51, a user may position the cursor 380 at a location over the preview playback item 5120 of the GUI 300, before performing a left-cursor click operation to activate the preview playback operation. As shown, this activation operation has caused a change in the graphical representation of the preview playback item 5120. This activation may be indicated in various ways, such as a change in background, a change in color, etc. Although the activation has been performed using a cursor-control operation, different embodiments may allow a user to activate preview playback in different ways (e.g., though a pull-down or pop-up menu command, a series of keystrokes, etc.).

In this example, the preview playback has been invoked using a "loop" feature. In this way, the playback continuously plays the portion of the composite presentation that is within the range along the timeline 360 defined by the audition range selector 530. Thus, during the looped playback, the playback continuously loops from one point 5130 along the timeline to another point 5140 along the timeline. Although the range selector is shown as starting at the playhead 390 location, the range selector 530 is not necessarily associated with the position of the playhead 390. In any case, in the example shown in FIG. 51, the preview playback shown in the preview display area 330 includes the composite-target clip 630, and covers the range defined by the audition range selector 530.

FIG. 51 further illustrates breakout section 5150 that indicates the iterative cycling of the selected candidate audition clips in the preview display area 330. Specifically, this breakout section shows the content of the preview display area 330 as the preview playback transitions through the clips 610, 1810, 2010, and 2210 in the set of candidate audition clips. In some embodiments, upon reaching the end of the range defined by the audition range selector 530, the composite-target clip is automatically updated to reflect the next clip included in the selection box 5110. In other embodiments, the composite-target clip (and associated preview display, etc.) may not be updated automatically, and may require that a user issue a "next clip" command using a GUI selection item or other appropriate method. In addition to updating the composite-target clip, the audition display area 510 may be updated to indicate which clip is now active in the preview playback. Thus, the thicker border and mark 620 may move from clip to clip in the audition display area 510 as different clips are included in the preview playback.

The preview playback will continue in this manner, continually selecting the next candidate audition clip in the selection box 5110 to be included in the playback preview display shown in the preview display area 330 until the user halts the playback operation (e.g., by de-activating the preview playback item 5120). Thus, the preview playback will continuously cycle through the selected candidate audition clips, repeating the playback described above in reference to breakout section 5150, until stopped.

Although the example above used cursor control operations to select the candidate audition clips to preview, and to initiate the preview playback, different embodiments may perform these operations using different methods (e.g., pull-down or pop-up menu commands, a series of keystrokes, etc.).

Figure 52:
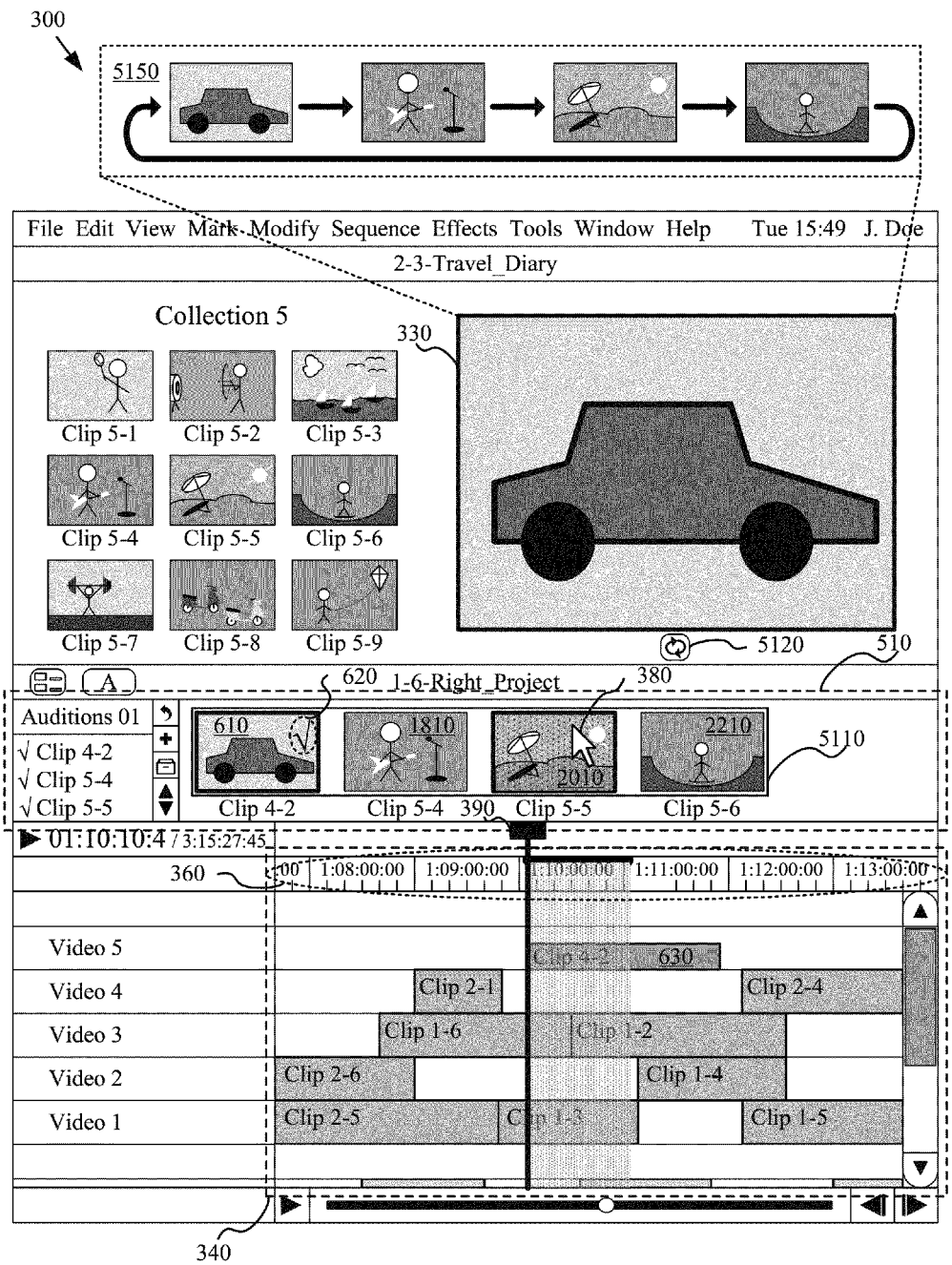
FIG. 52 illustrates the GUI of some embodiments after a user has selected multiple candidate audition clips from a set of candidate audition clips displayed in the audition display area.
Figure 53:
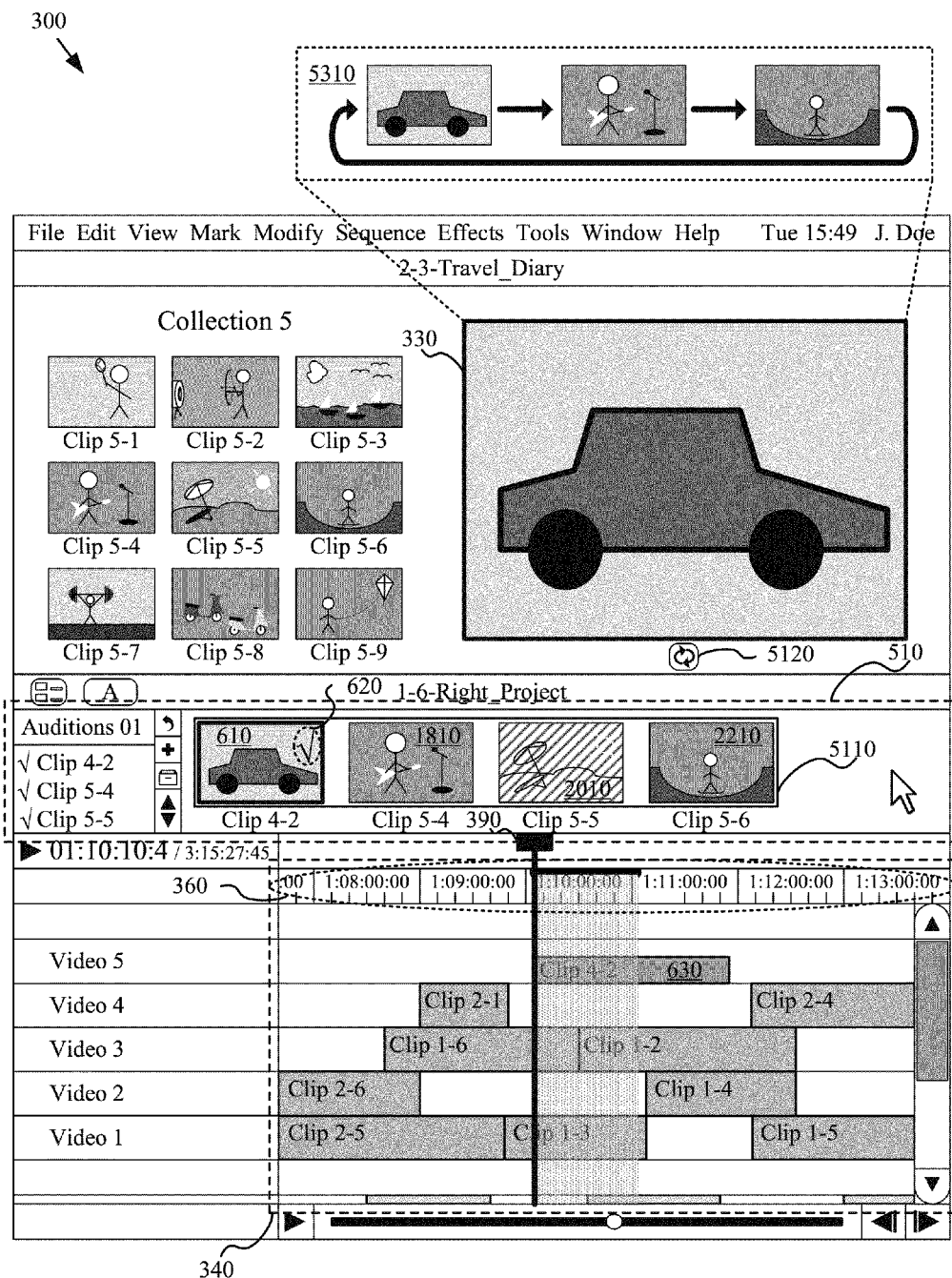
FIG. 53 illustrates the GUI of some embodiments after the user has de-selected a candidate audition clip in some embodiments.

FIGS. 52-53 illustrate another example of playback preview. In the example of FIGS. 52-53, the audition feature has been invoked and a set of candidate audition clips has been created and selected. The GUI 300 in the example of FIGS. 52-53 is the same GUI 300 described above in reference to FIGS. 3-32, and 36-51. Also, to illustrate the example of performing preview playback through the use of cursor operations, FIGS. 52-53 explain two different stages of a user's interaction with the GUI 300.

FIG. 52 illustrates a first stage that is after a user has selected multiple candidate audition clips 610, 1810, 2010, and 2210 from a set of candidate audition clips displayed in the audition display area 510. The invocation of the audition feature may have been performed in a similar manner to that described above in reference to FIGS. 3-6. In addition, the candidate audition clip set may have been created as described above in reference to FIGS. 16-22. Furthermore, a user may have selected multiple candidate audition clips from the audition display area as described above in reference to FIG. 50. The first stage shown in FIG. 52 follows the state of the GUI 300 as described above in reference to FIGS. 50-51. As shown in FIG. 52, in this stage, a user de-selects a candidate audition clip 2010 from the set of selected candidate audition clips displayed in the audition display area 510.

As shown in FIG. 52, a user may position the cursor 380 at a particular location of the GUI 300, before performing a left-cursor click operation to de-select the candidate audition clip 2010 (as indicated by the thicker border). Alternatively, a user may perform a series of keystrokes, or some other appropriate operations to de-select one or more clips.

FIG. 53 illustrates a second stage of user interaction after the user has de-selected a candidate audition clip in some embodiments. As shown, this de-selection operation has caused the representation of the candidate audition clip 2010 in the audition display area 510 to be updated to show that the clip 2010 is no longer selected (as indicated by the change in fill pattern and background color). Different embodiments may indicate this de-selection in different ways. Some embodiments may indicate the de-selection differently depending on the position of the de-selected clip within the group of clips in the audition display area 510. For instance, when the de-selected clip is the first or last clip in the selected group, the selection box 5110 may be resized such that it does not enclose the de-selected clip.

FIG. 53 further illustrates breakout section 5310 that indicates the iterative cycling of the selected candidate audition clips in the preview display area 330. Specifically, this breakout section shows the content of the preview display area 330 as the preview playback transitions through the clips 610, 1810, and 2210 (skipping de-selected clip 2010) in the set of candidate audition clips. In some embodiments, upon reaching the end of the range defined by the audition range selector 530, the composite-target clip is automatically updated to reflect the next clip included in the selection box 5110. In addition, the audition display area 510 may be updated to indicate which clip is now active in the preview playback. Thus, the thicker border and mark 620 may move from clip to clip in the audition display area 510 as different clips are included in the preview playback.

The preview playback will continue in this manner, continually selecting the next candidate audition clip in the selection box 5110 to be included in the playback preview display shown in the preview display area 330 until the user halts the playback operation (e.g., by de-activating the preview playback item 5120). Thus, the preview playback will continuously cycle through the selected candidate audition clips, repeating the playback described above in reference to breakout section 5310, until stopped.

Although the example above used cursor control operations to de-select the candidate audition clips to preview, and to initiate the preview playback, different embodiments may perform these operations using different methods (e.g., pull-down or pop-up menu commands, a series of keystrokes, etc.). In addition, although the examples of FIGS. 50-53 showed particular candidate audition clips in a set being designated as active, a user may select various combinations of one or more candidate audition clips in a set to be active during playback, as desired. This selection may be performed before playback begins, during playback, or at some other appropriate time.

IV. Playback Preview Processes, Data Structures, and Software Modules

The following section describes the processes, data structures, and software modules used by some embodiments to perform playback preview. First, sub-section IV.A describes a conceptual process used in some embodiments to implement the preview playback feature. Next, sub-section IV.B describes a conceptual process and data structures used to generate a preview playlist for preview playback. Finally, sub-section IV.C describes the software modules used by some embodiments to perform playback preview and other functions of the media editing application.

A. Audition Clip Playback Preview Process

The following sub-section describes the processes and data structures used in some embodiments to perform playback preview. One of ordinary skill will recognize that the process is a conceptual representation of the actual implementation. Different embodiments may use different operations (or a different order of operations) to allow playback preview.

Figure 54:
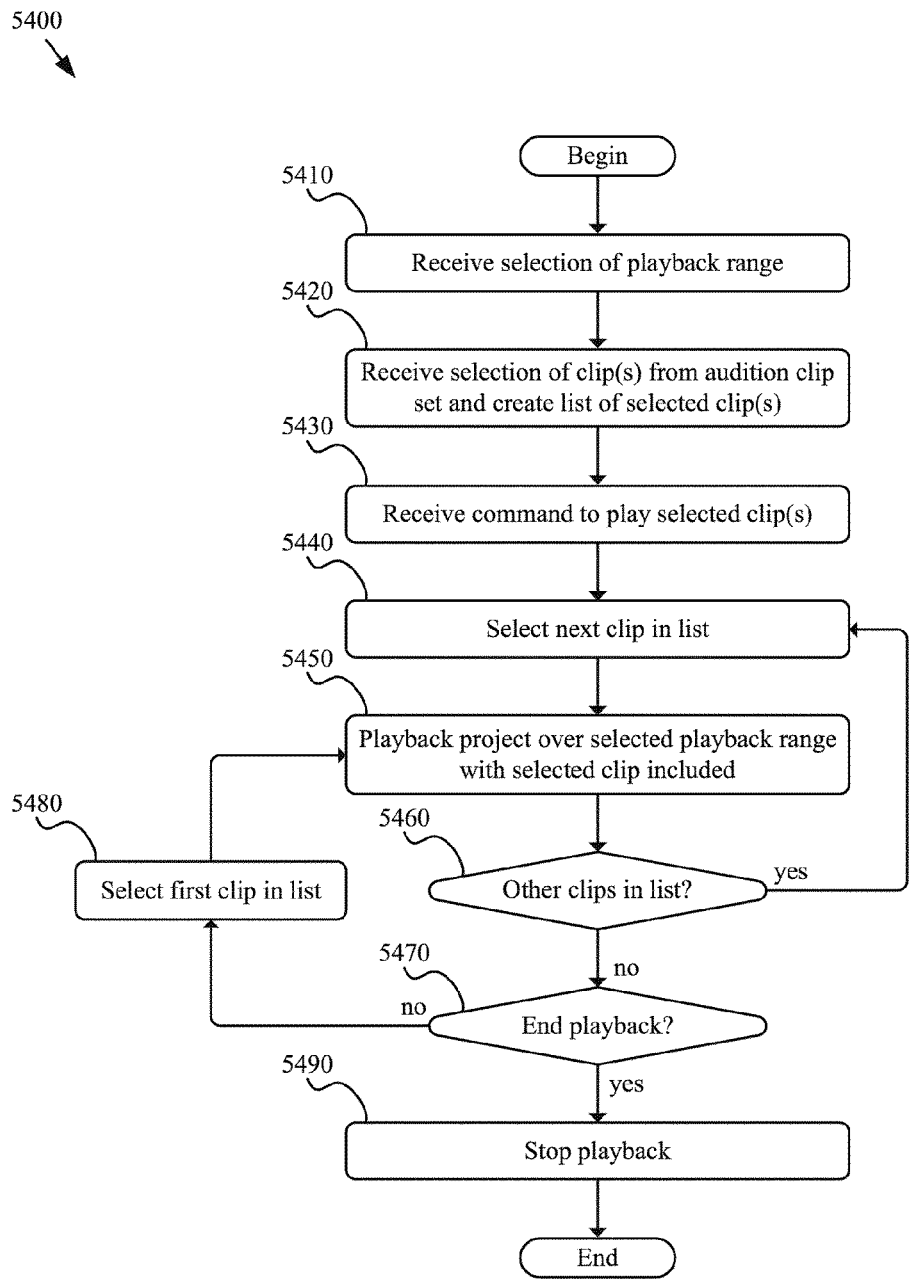
FIG. 54 illustrates a conceptual process used by some embodiments to perform the preview playback operation of some embodiments.

FIG. 54 illustrates a conceptual process 5400 used by some embodiments to perform the preview playback operation of some embodiments. The process 5400 will be described in reference to FIG. 34 and FIGS. 50-53. The process 5400 begins when it receives a selection of an audition clip set. The selection of an audition clip set may direct the process to retrieve a candidate audition clip set data element 3455, as described above in reference to FIG. 34.

Next, the process receives (at 5410) a selection of a playback range. This range selection may be achieved by positioning and/or adjusting the audition range selector 530 as described above in reference to FIG. 51. In some cases, no range is selected. In those cases, a default range may be determined by the media editing application, or the entire project may be played in the playback preview. In some instances, the default range may be selected to match the length and location of the composite-target clip, with pre and post-roll segments as described above in reference to FIG. 8.

After receiving (at 5410) a selection of a playback range, the process receives (at 5420) a selection of clips from the active audition clip set and creates a list of the selected clips. The selection (and/or de-selection) of one or more clips was described above in reference to FIGS. 50 and 52. In some embodiments, the process may create the list of clips using attributes retrieved from the candidate audition clip set data element 3450, as shown in FIG. 34. In some embodiments, the list of clips may have a format similar to the track data element 3420 described above in reference to FIG. 34.

One of ordinary skill will recognize that the operations of process 5400 are conceptual and may not necessarily be performed in the order shown. For instance, in some embodiments, the preview playback process may receive a selection of clip(s) before receiving a selection of a playback range. In addition, the process used to implement playback preview may not be invoked when an audition clip set is selected. Instead, the process may begin when, for example, a playback command is received, as described above in reference to FIG. 51. Furthermore, different specific operations may be performed in different embodiments. Also, the process may not be performed as one continuous series of operations. Furthermore, the process could be implemented using several sub-processes, or as part of a larger macro-process.

Once the process has received (at 5420) a selection of one or more clips from the audition clip set and created a list of the selected clips, the process receives (at 5430) a playback command directing the process to begin display of the preview playback. One way of selecting the playback command was described above in reference to FIG. 51.

After receiving (at 5430) the playback command, the process selects (at 5440) the next clip in the list of clips created at 5420. This operation was described above in reference to FIG. 51, where the first clip 610 in the set of selected clips was selected, and thus included in the preview playback.

Next, the process plays (at 5450) the project over the selected playback range with the selected clip included in the preview playback. This operation was described above in reference to FIG. 51, where the selected clip 610 was included in the playback (as composite-target clip 630) of the project over the range defined by the audition range selector 530.

After playback (at 5450) of the project over the selected range, the process determines (at 5460) whether there are other clips in the list of clips. When the process determines that there are other clips, operations 5440-5460 are repeated until all clips in the list have been successively included in the preview playback. These operations were described above in reference to FIGS. 51 and 53.

When the process determines (at 5460) that there are no other clips in the list of clips, the process determines (at 5470) whether to end playback. In some embodiments, the determination to end playback is based on receiving a user command as described above. In other embodiments, playback may be ended after one iteration through the list of clips (i.e., non-looped playback).

When the process determines (at 5470) that playback will not be ended, the process selects (at 5480) the first clip in the list of selected clips and repeats the operations 5450-5480 until the process determines (at 5470) that playback will be ended. When the process determines that playback will be ended, the process stops (at 5490) the preview playback and the process ends.

B. Generating a Playback Preview Playlist

The following sub-section describes the process and data structures used in some embodiments to generate a playback preview playlist (i.e., playback of a project with committed, preview and/or audition clips included), for a project that includes preview clips, audition clips, and/or committed clips. One of ordinary skill will recognize that these data structures and process are conceptual representations of the actual implementation. Different embodiments may use different structures or a different process to allow playback preview.

Figure 55:
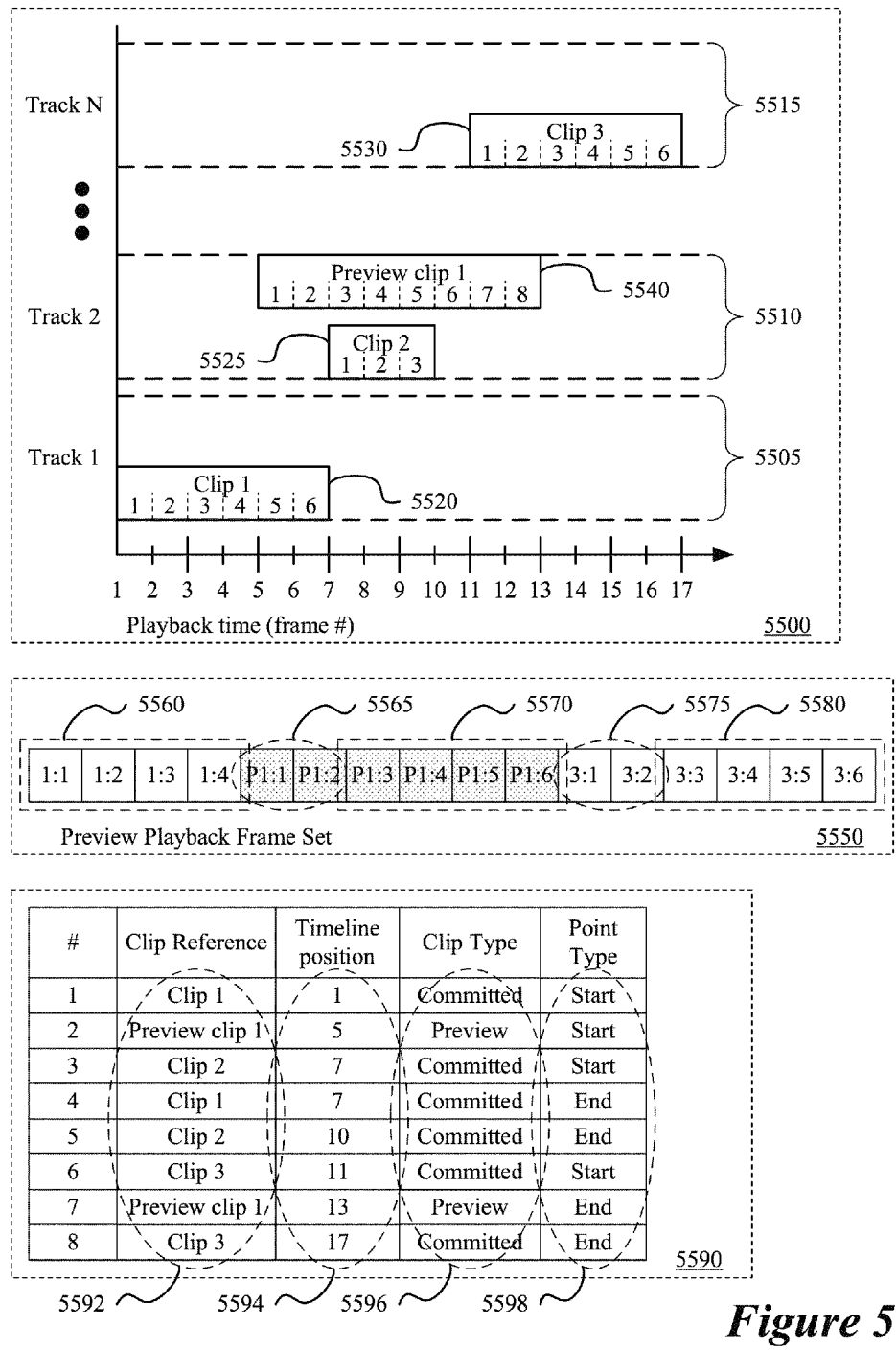
FIG. 55 illustrates some embodiments that include a timeline, and a corresponding preview playback frame set and/or segment table used to perform preview playback.

FIG. 55 illustrates some embodiments that include a timeline 5500, and a corresponding preview playback frame set 5550 and/or segment table 5590 used to perform playback preview. Specifically, this figure illustrates several data structures of an example timeline 5500, a segment table 5590 generated from the example timeline data and a preview playback frame set 5550 that may be generated from the example timeline 5500 and/or the segment table 5590. As shown in the figure, the timeline 5500 includes several tracks 5505-5515 for displaying and manipulating media clips that are part of the media project. This figure further illustrates the preview playback frameset 5550 that allows a user to view a display of the project with any preview clips included in the displayed media presentation.

The tracks 5505-5515 include data corresponding to a set of clips 5520-5540 that have been placed in the tracks 5505-5515. As shown, in addition to committed clips, each track may also include preview clips. Furthermore, each track may include multiple non-overlapping committed clips and multiple non-overlapping preview clips (not shown). Although the timeline is represented as using increments of one frame, some embodiments may use other increments. For example, some timelines may use a time increment (i.e., 30 ms).

The preview playback frame set 5550 represents one particular conceptual data structure that may be used to display a preview for the user that shows how the composite presentation would appear if the preview clips were committed to the project. The preview playback frameset 5550 generated from the timeline 5500 includes multiple frames, where some frames are committed frames 5560, 5575, and 5580 from individual committed clips, and some frames are preview frames 5565 and 5570 from the preview clip. Although each frame in the preview playback frame set 5550 have been represented as coming from a single clip, in some embodiments one or more frames may be composite frames that are generated by combining one or more clip frames.

The segment table 5590 represents another conceptual data structure that may be used to display a preview for the user or to generate the preview playback frame set 5550. The segment table 5590 of some embodiments may include information such as a reference to all clips 5592 in the timeline, a frame number or other location indicator 5594, a clip type attribute 5596, and/or a point type indicator 5598. In some embodiments the segment table 5590 may be used to optimize the playback operation by allowing the media application to perform preview playback more efficiently.

Figure 56:
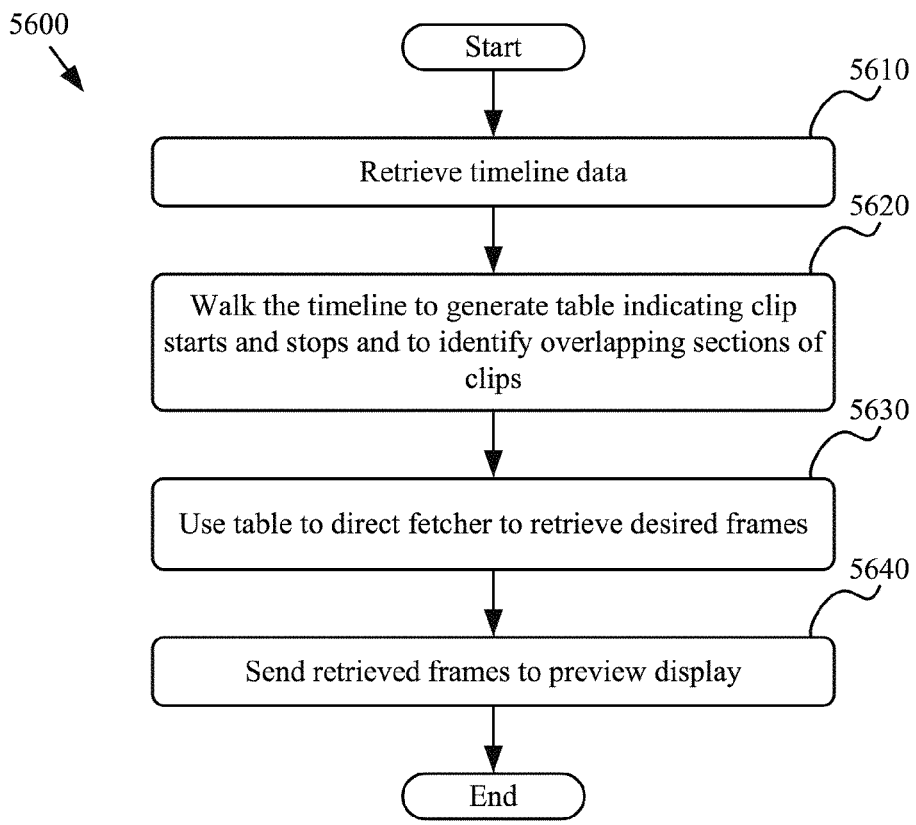
FIG. 56 illustrates a conceptual process of some embodiments used to generate the segment table and preview playback frame set from timeline data.

The generation of the segment table 5590 and the preview playback frame set 5550 from the timeline data 5500 will now be described by reference to process 5600, as illustrated in FIG. 56. One of ordinary skill will recognize that process 5600 is a conceptual representation of the operations used to generate a segment table. The specific operations of the process may not be performed in the exact order described, or different specific operations may be used in different embodiments. Also, the process may not be performed as one continuous series of operations. Furthermore, the process could be implemented using several sub-processes, or as part of a larger macro-process.

As shown, the process 5600 begins at 5610 by retrieving timeline data. In this example, the timeline data 5500 will be used. Next, the process walks (at 5620) the timeline in order to generate a segment table indicating clip start and stop points and identify overlapping sections of clips. Thus, for the example timeline 5500, the timeline starts at frame 1. The process then progresses through the timeline and identifies any frames where any clips start or stop.

For the example timeline 5500, there is only one clip 5520 identified as starting or ending at frame 1, so the first clip 5520 is added to the segment table 5590 as a clip start point. In addition, several clip properties may also be added to the table (e.g., track number, whether the clip includes audio data or video data, etc.). In addition to walking (at 5620) the timeline to generate the segment table, the process identifies overlapping sections of clips in order to define segments. This identification of overlapping sections may be achieved, for instance, by determining when consecutive entries in the segment table 5590 are "start" points.

In some embodiments, the segment table includes information related to the overlapping sections of clips (not shown). In addition, some embodiments may remove entries from the table when the associated data will be superseded by other data. For example, as the preview clip 5540 completely overlaps the committed clip 5525 in track 2 5510, the entries in the segment table corresponding to clip 2 5525 may simply be removed from the table.

The process 5600 proceeds along the timeline 5500 until it determines that preview clip 1 5540 begins at frame 5. This begin point is added to the segment table 5590 as the next clip start or end point. The process proceeds in this manner, identifying clip start and end points and adding them to the segment table 5590 until it reaches the end of the timeline 5500 at the start of frame 17 in this example.

In some embodiments, the tracks are arranged hierarchically in the timeline, so that a clip on a track with a higher number supersedes the display of a track with a lower number. In some of these embodiments, frames on different tracks may also be composited (e.g., when performing a transition between clips on different tracks, the clips may overlap for at least a portion of the transition). The preview playback frame set 5550 shows the resulting frames under the hierarchical arrangement of one embodiment.

In some of these embodiments, the superseding clip is a smaller size than the superseded clip and thus, the superseding clip is only displayed over a portion of the superseded clip. In other embodiments, the superseding clip is at least as large as the superseded clip, and thus displaces the entire superseded clip or image in the display. The example playback frame set 5550 shows that the preview clip 5540 in this example supersedes the overlapping clip 5520 on a lower-numbered track 5505 in frames 5 and 6 5565. In contrast, the committed clip 5530 in a higher-numbered track 5515 supersedes the overlapping preview clip 5540 in frames 11 and 12 5575. In addition the preview clip 5540 supersedes the committed clip 5525 in the same track 5510.

As in the above example, the preview clips may follow the hierarchy of the committed clips, and thus be superseded by committed clips on higher-numbered tracks, but may supersede clips on lower or equal-numbered tracks. In other embodiments, preview clips may supersede committed clips regardless of whether the preview clip is placed in a higher-numbered track than the committed clip.

In some embodiments, when audio clips overlap, the clips may be "mixed" instead of a particular clip superseding another. In these embodiments, the mixing operation may be controlled by the user, or may be performed as a default mix (e.g., playing all audio tracks at equal relative volume). In other embodiments, the audio clips on higher-numbered tracks may supersede the audio clips on lower-numbered tracks. In some of these embodiments, a user may elect audio clips to supersede other audio clips, while in other embodiments, the election may be a default election. The preview audio clips of some embodiments will supersede any committed audio clips in the same track, but be mixed with or supersede clips in other tracks as described above.

After walking (at 5620) the timeline to generate the segment table and identify overlapping sections of clips in order to define segments, the process uses (at 5630) the table to direct a fetcher to identify and retrieve individual frames (e.g., from a content storage element). In some embodiments, the table may omit superseded clips, or make other appropriate modifications (e.g., by adding attributes to each clip entry in the table) such that the fetcher is able to efficiently identify and retrieve frames.

After using (at 5630) the fetcher to identify and retrieve frames, the process of some embodiments sends (at 5640) frames retrieved by the fetcher to the preview display. The fetcher in this example retrieves the frames shown in the preview playback frame set 5550. After sending (at 5640) the frames to the preview display, the process ends.

In some embodiments that include audition clip sets (not shown), the process 5600 may be iteratively repeated to generate a playlist for each audition clip in the set of candidate audition clips. In some of these embodiments, the timeline data structure 5500 may also be iteratively generated based on each candidate audition clip in a set. In other of these embodiments, the segment table may be initially generated with multiple audition clips associated with a particular clip reference (e.g., in cases where the audition clips all have the same timeline in and out points).

In addition, as described above, in some cases the playback may include only a section of the project (e.g., the length of an audition clip plus pre and post-roll segments). In these cases, the segment table or preview playback frame set may be generated for only that portion of the project that has been selected for playback.

Although the preview playback function has been described above using numerous specific details, one of ordinary skill in the art will recognize that the function could be implemented in different ways without departing from the spirit of the invention. For instance, some embodiments scan the timeline and generate a list of frames for playback. As another example, different embodiments may assign a particular priority to the clips in a track, such that any overlapping sections of clips are resolved by removing (or omitting) the section from the clip with a lower priority.

In addition, many of the examples given above are by reference to a video compositing application that composites video clips and provides a preview display area for displaying the composite presentation. The preview tool may also be used for other media compositing applications such as audio mixers. In the case of an audio mixer, for example, the feedback would not be provided to the user through a preview display area, but rather through another mechanism (e.g., by playing an audio preview using a PC's sound card and speakers).

C. Software Architecture

Figure 57:
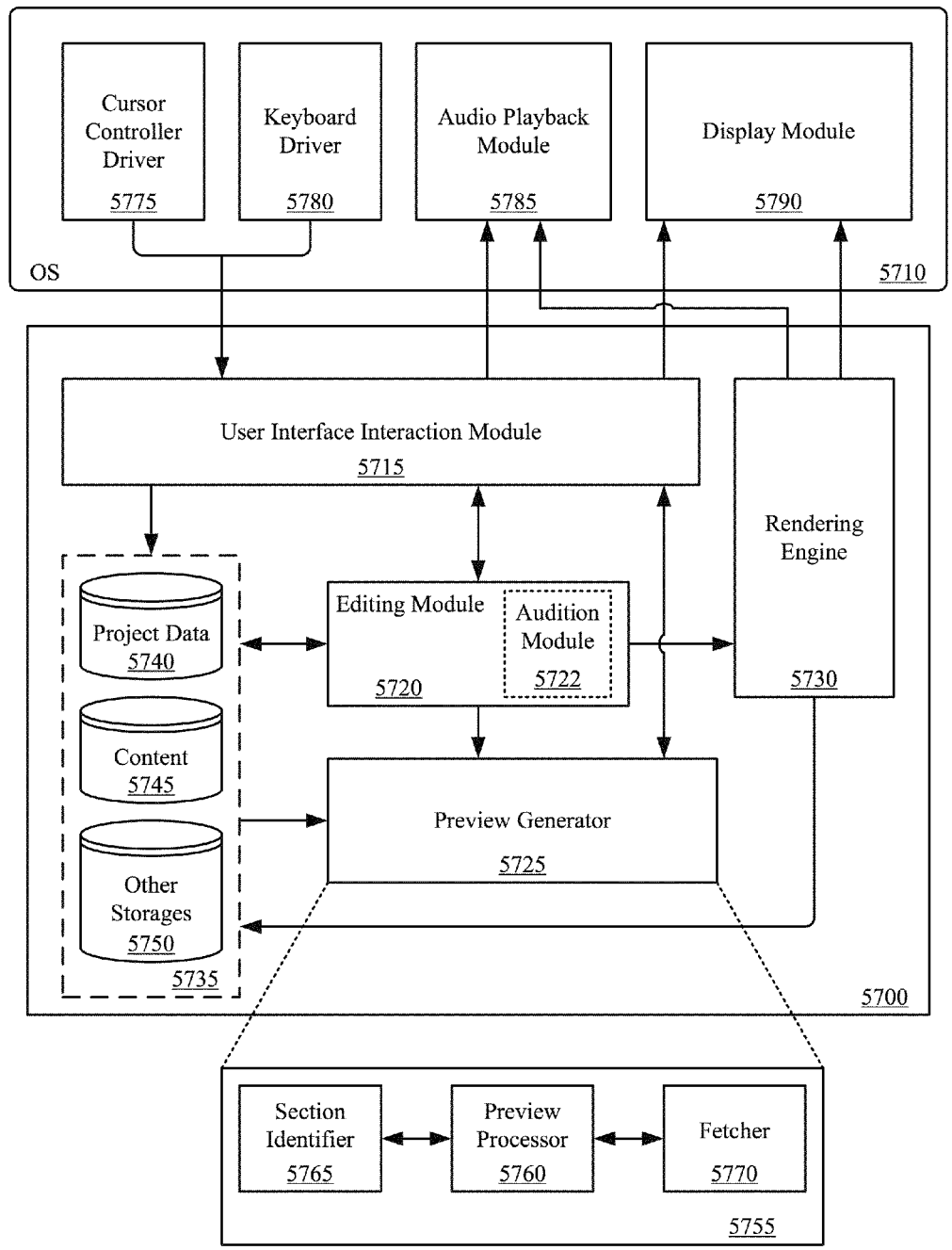
FIG. 57 conceptually illustrates the software architecture of a media editing application of some embodiments.

In some embodiments, the processes described above are implemented as software running on a particular machine, such as a computer or a handheld device, or stored in a computer readable medium. FIG. 57 conceptually illustrates the software architecture of an application 5700 of some embodiments for presenting menus such as those described in the preceding sections. In some embodiments, the application is a stand-alone application or is integrated into another application (for instance, application 5700 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

Media editing application 5700 includes a user interface interaction module 5715 for sending data to and receiving data from a user, an editing module 5720 for receiving and processing edits to a composite project, a preview generator 5725 for creating a composite presentation based on stored project data, a rendering engine 5730 used to generate image data for storage or display, and a set of storages 5735 for storing data used by the application 5700. The set of storages 5735 includes storages for project data 5740, content data 5745, as well as other data 5750 (e.g., data about media objects in a video scene). The sub-components of the preview generator 5725 of some embodiments are shown in breakout section 5755. As shown, the preview generator includes a preview processor 5760, a section identifier 5765, and a fetcher 5770.

The operating system 5710 of some embodiments includes a cursor controller driver 5775 that allows the application 5700 to receive data from a cursor control device, a keyboard driver 5780 for that allows the application 5700 to receive data from a keyboard, an audio playback module 5785 for processing audio data that will be supplied to an audio device (e.g., a soundcard and speakers), and a display module 5790 for processing video data that will be supplied to a display device (e.g., a monitor).

A user interacts with items in the user interface of the media editing application 5700 via input devices (not shown) such as a cursor controller (e.g., a mouse, touchpad, trackpad, etc.) and/or keyboard. The input from these devices is processed by the cursor controller driver 5775 and/or the keyboard driver 5780, and passed to the user interface interaction module 5715.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The user interface interaction module 5715 translates the data from the drivers 5775 and 5780 into the user's desired effect on the media editing application 5700. For example, when the user edits content in a display area of the media editing application, the user interface interaction module 5715 may translate these edits into instructions that are processed by the editing module 5720 in some embodiments. In other embodiments, the edits may be applied directly to project data 5740, or other data stored by the application 5700 in the set of storages 5735. An example of the user editing content is if the user trims a media clip in a display area of the media editing application 5700. The user interface interaction module 5715 also receives input data that is translated as instructions to preview visual content in a preview display area (for example, if a user clicks a play control while editing a media project). This information is passed to preview generator 5725 through the editing module 5720 in some embodiments.

Editing module 5720 of some embodiments processes edit instructions received from the user interface interaction module 5715 and data retrieved from the set of data storages 5735. Editing module 5720 may also create and/or update data stored within the set of data storages 5735 based on received instructions that affect the project data 5740, content 5745, or other stored data 5750. Furthermore, the editing module 5720 may also send data and/or instructions to the rendering engine 5730 of some embodiments. Editing module 5720 may perform, for example, some or all of the operations of processes 3300 and/or 5400 in some embodiments. The editing module 5720 includes an audition module 5722 in some embodiments.

The audition module 5722 is a module that places a particular clip in a particular audition set at a particular location in the composite display area according to various scenarios such as those described above by reference to FIGS. 3-6, FIGS. 9-11, FIGS. 16-22, FIGS. 23-25, FIGS. 26-29, FIGS. 36-41, and/or FIGS. 45-49. In some embodiments, the selection of a UI item can invoke an audition session in which the audition module creates, modifies, and/or deletes a set of audition clips. An audition UI item (such as a radio button, series of keystrokes, etc.), the various audition display areas mentioned above (such as an audition pane, audition window, drop-down list, etc.), and the audition module (e.g., audition module 5722) collectively form an audition tool that provides the audition feature of some embodiments. In this audition tool, the UI item is the item that invokes or ends a session for creating, modifying, or deleting sets of audition clips. Other than this UI item (or series of keystrokes, hotkey selection, etc.), some embodiments provide other schemes for starting an audition session, for example through a cursor selection of an audition clip (e.g., by right-clicking or control-clicking on a preview audition clip or committed clip with an associated audition set, clicking a committed clip's marker that indicates an associated audition set, etc.). In addition to performing audition functions using the audition module 5722, the editing module 5720 may send instructions and/or data to the preview generator 5725 of some embodiments.

Preview generator 5725 of some embodiments generates a preview based on instructions received from the editing module 5720 and/or the user interface interaction module 5715 and project data stored in storage 5740, content stored in storage 5745, and/or other data stored in storage 5750. In some embodiments, preview generator 5725 also generates a preview window (through the user interface interaction module 5715) after generating the preview, and manages the movement of the preview window. In some of these embodiments, the preview generator 5725 may also provide content to the user interface interaction module 5715 for display. The preview generator 5725 may perform some or all of operations of the processes 5400 and/or 5600 in some embodiments.

The operation of the preview generator 5725 will be further described in reference to breakout section 5755. As shown, the preview generator of some embodiments includes a preview processor 5760 that may be used to communicate with the editing module 5720, send and receive data to and from the user interface interaction module 5715 and/or the set of data storages 5735. In addition, the preview processor 5760 may be used to send and receive data to and from the section identifier 5765 and/or the fetcher 5770. In some embodiments, the preview processor 5760 sends timeline data to the section identifier 5765, which generates a table or other appropriate set of data. The generated table or set of data may be similar to the segment table 5590 or the preview playback frame set 5450 described above in reference to FIG. 55.

In some embodiments, the preview processor 5760 may supply the set of data (e.g., a segment table or frame set) generated by the section identifier 5765 to the fetcher 5770. In some embodiments, audio data may be passed directly to the user interface interaction module, while video data is processed through the fetcher 5770. In other embodiments, the preview processor 5760 may supply both audio and video data to the user interface interaction module 5715. If project data, content, and/or other data are edited, that modified data is passed to the preview generator 5725 so that a new preview can be generated.

Fetcher 5770 of some embodiments retrieves frames of video data from the set of data storages 5735 based on data provided by the preview processor 5760. In some embodiments, the fetcher 5770 may also receive data from the editing module 5720 (either directly, or through the preview processor 5760). The data received by the fetcher 5770 may take the form of a table or list of frames (e.g., segment table 5590 or preview playback frame set 5550 described above in reference to FIG. 55. In addition to processing video frames through the fetcher 5770, some embodiments may use the fetcher to retrieve and send audio data.

Rendering engine 5730 enables the storage or output of audio and video from the media editing application 5700. For example, rendering engine 5730 uses data about media objects in a video scene to render the video scene from the particular location, direction, etc. defined by a camera object. As such, the rendering engine receives, in some embodiments, data from the editing module 5720 so that a preview can be displayed. In other embodiments (not shown), the rendering engine 5730 may receive data from the preview generator 5725 in order to generate a preview display. Data from the rendering engine 5730 (e.g., audio and video data of a video scene, preview data, etc.) is passed to the display module 5790 and/or the audio playback module 5785. The audio playback module enables audio playback from the media editing application 5700 on an audio device (e.g., a set of speakers or headphones). Display module 5790 enables the display of the media editing application 5700 on a display device (e.g., a CRT monitor, LCD screen, etc.). Alternatively, data may be passed from the rendering engine 5730 to the set of storages 5735 for later playback.

While many of the features have been described as being performed by one module (e.g., the UI interaction module 5715 or preview generator 5725), one of ordinary skill would recognize that a particular operation might be split up into multiple modules, and the performance of one feature might even require multiple modules in some embodiments. For instance, in some embodiments, the audition module 5722 may be a separate module (or modules) from the editing module 5720.

Furthermore, although the application 5700 and its features have been described using several specific embodiments, other embodiments might implement the application or its features using different resources or by placing the various modules in different specific locations. For instance, in some embodiments the application is a standalone application that includes all the functionality and data access needed to run the application on a particular user device.

V. Conceptual Media Editing Process Using the Audition Feature

Figure 58:
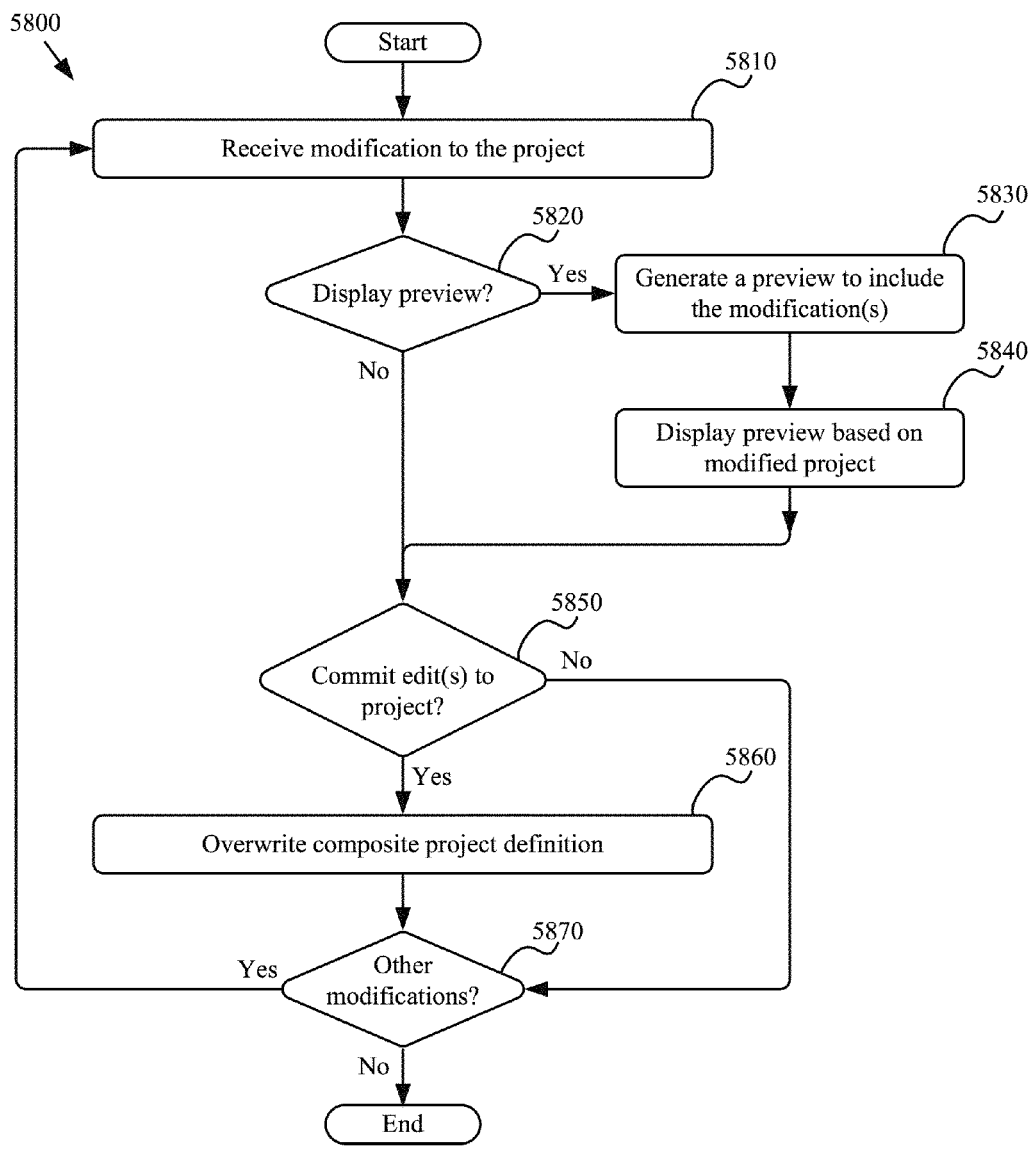
FIG. 58 conceptually illustrates a process used to receive and display a modification to a project and commit the modification to the composite media presentation.

FIG. 58 conceptually illustrates a process 5800 used to receive and display a modification to a project and commit the modification to the composite media presentation. In some embodiments, the process 5800 could be implemented using the software modules and storages described above in reference to FIG. 57. As shown, the process 5800 begins at 5810 by receiving a modification to a project.

The modification may include adding a preview clip, an audition clip, a committed clip, modifying an existing clip (e.g., by applying a particular edit style, moving a clip along the timeline, etc.), or other modification to the project. In some embodiments, the preview and/or audition modifications are not permanently stored with the project data and may be stored in RAM, or other appropriate short-term storage while the preview edit session is still active. After receiving (at 5810) a modification, the process continues by determining (at 5820) whether to display a preview that includes the preview modification. In some cases, the determination may be based on user input, a default determination, or some other appropriate method.

In any case, when the process determines (at 5820) that the preview is to be displayed, the process continues by generating (at 5830) a preview to include the preview modifications. Preview playback and the generation of such a preview playlist was described in reference to FIGS. 50-56 above. The process next displays (at 5840) a preview of the modified project. After displaying (at 5840) the modified project, or after determining (at 5820) not to display a preview, the process continues by determining (at 5850) whether to commit the preview and/or audition edits to the project. If so, the process overwrites (at 5860) the composite project definition. Committed clip edits cause the composite project definition to be overwritten in some embodiments. When the process determines (at 5850) that the preview and/or audition modifications will not be committed to the project, or after overwriting (at 5860) the composite project definition, the process determines (at 5870) whether there are other modifications.

When the process determines (at 5870) that there are further modifications, the process repeats the operations 5810-5870 until the process determines (at 5870) that there are no other modifications. When determining (at 5870) that there are no other preview modifications, the process ends.

In addition to those operations shown in process 5800, the media editing process of some embodiments further includes operations such as compositing a media project's video data, rendering the media presentation to a file, and encoding the file into various media formats (e.g., MPEG-2, DivX, etc.). One of ordinary skill in the art will recognize that various different operations may be used to prepare media presentations for playback on various different devices.

VI. Process for Defining a Media Editing Application

Figure 59:
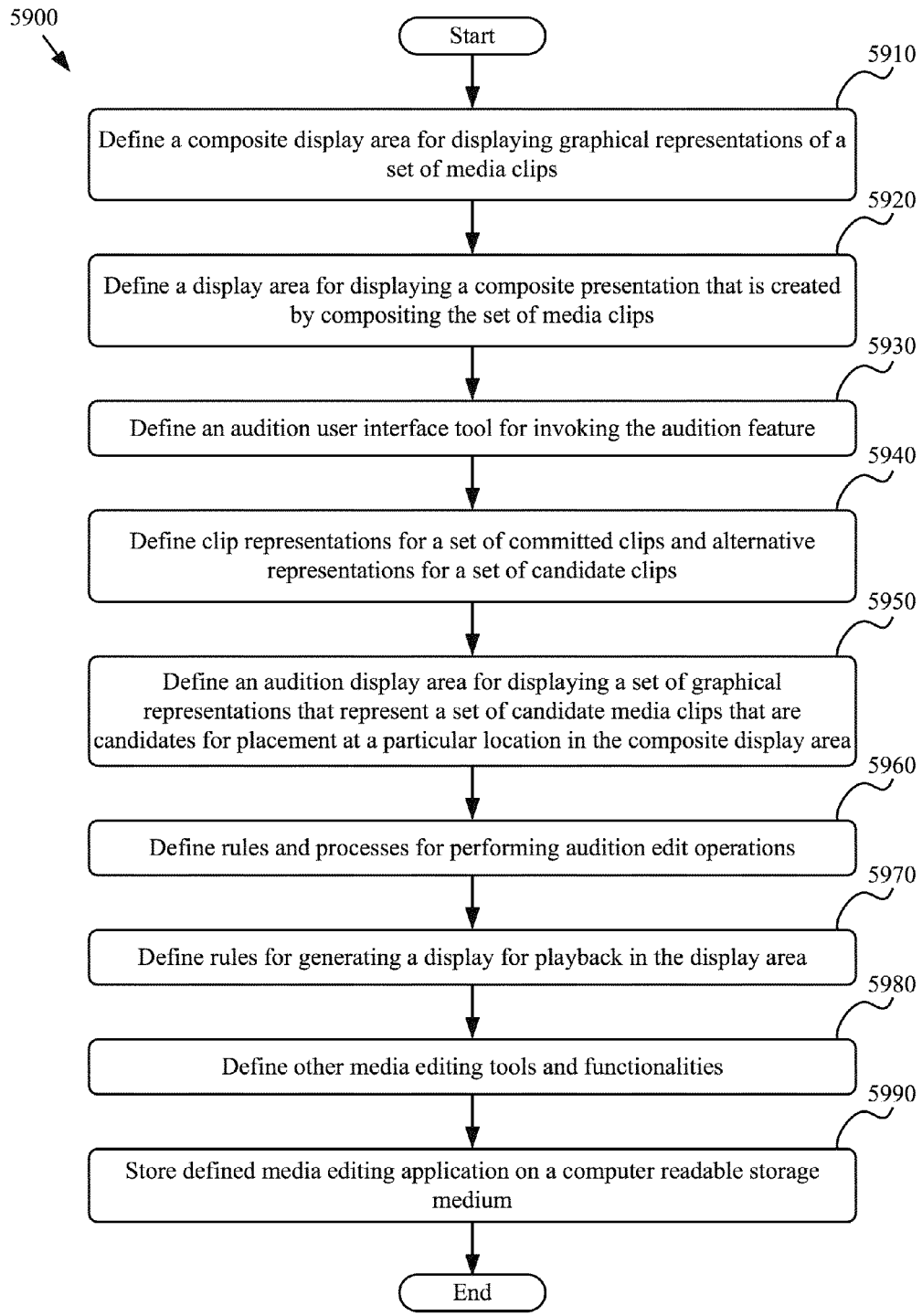
FIG. 59 conceptually illustrates a process of some embodiments for manufacturing a computer readable medium that stores a computer program.

FIG. 59 conceptually illustrates a process 5900 of some embodiments for defining and storing a computer readable medium that stores a computer program. In some embodiments, the computer readable medium is a distributable CD-ROM. Specifically, process 5900 illustrates the operations used to define several of the elements shown in GUI 300. As shown, process 5900 begins by defining (at 5910) a composite display area for displaying graphical representations of a set of media clips. Composite display area 340 is one example of such a display area.

The process then defines (at 5920) a display area for displaying a composite presentation that is created by compositing the set of media clips. For instance, preview display area 330 is such a display area. Next, the process defines (at 5930) an audition user interface tool for invoking the audition feature. The audition selection item 310 is an example of such a user interface tool.

After defining (at 5930) the audition user interface tool for invoking the audition feature, the process defines (at 5940) clip representations for a set of committed clips and alternative representations for a set of preview clips. GUI 300 of FIG. 6 shows one example of such representations.

The process then defines (at 5950) an audition display area for displaying a set of graphical representations that represent a set of candidate media clips that are candidates for placement at a particular location in the composite display area. FIG. 6 illustrates one example of such audition display area 510.

After defining (at 5950) an audition display area for displaying a set of graphical representations that represent a set of candidate media clips that are candidates for placement at a particular location in the composite display area, process 5900 defines (at 5960) rules and processes for performing audition edit operations. FIGS. 3-32 and 36-49 illustrate several examples of such audition edit operations and the accompanying discussion describes the rules and processes used to implement those operations.

After defining (at 5960) rules and processes for performing audition edit operations, process 5900 defines (at 5970) rules for generating a display for playback in the display area. Several examples of these rules and processes were described above in reference to FIGS. 50-54.

The process then defines (at 5980) other media editing tools and functionalities. Examples of such editing tools may include zoom, color enhancement, blemish removal, audio mixing, etc. In addition, various other media editing functionalities may be defined. Such functionalities may include library functions, format conversion functions, etc. The process defines these additional tools in order to create a media editing application that has many additional features to the features described above.

Figure 60:
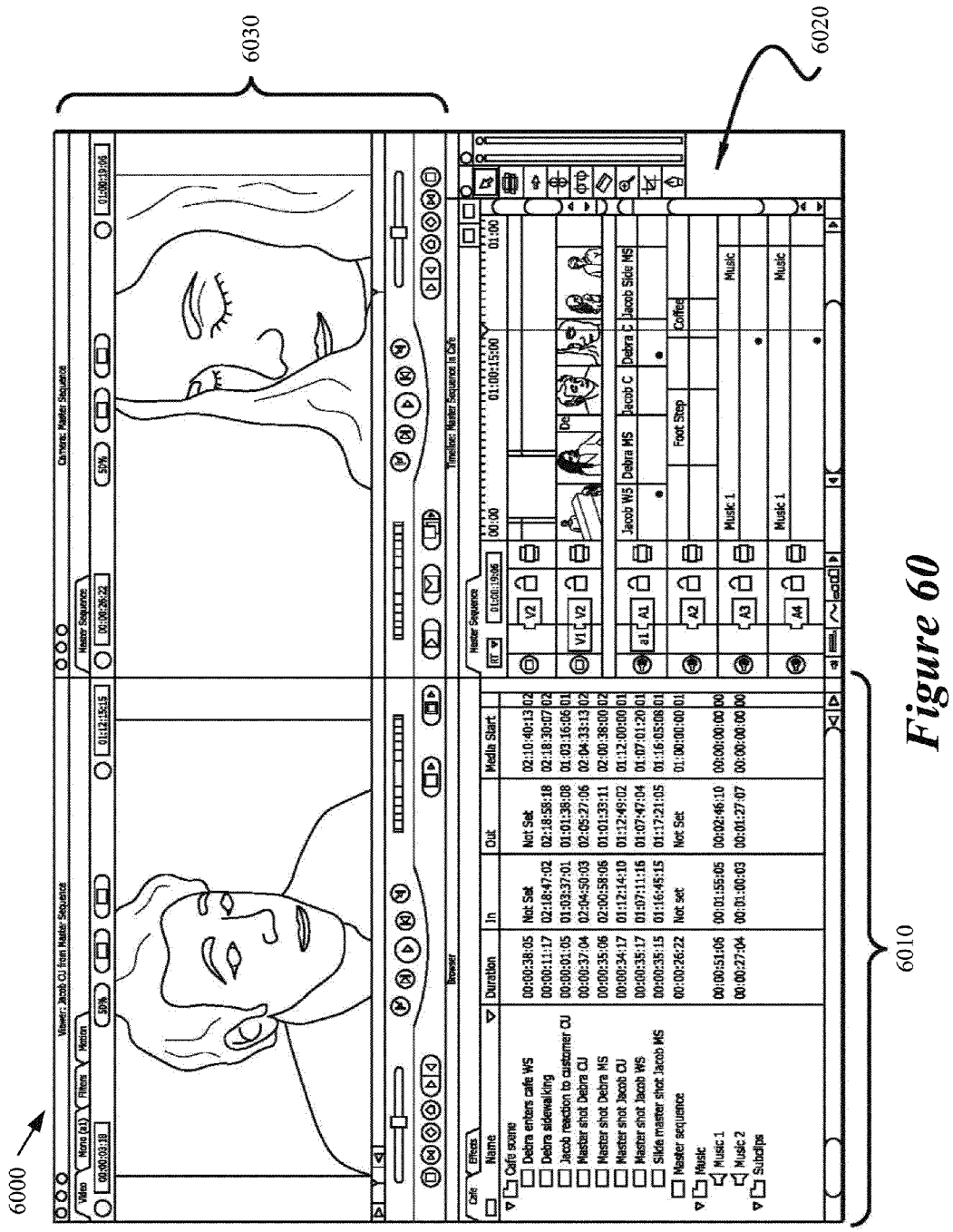
FIG. 60 illustrates an alternative GUI of the media editing application of some embodiments.

A more detailed view of a media editing application with these additional features is illustrated in FIG. 60. Specifically, this figure shows a media editing application with these additional tools. FIG. 60 illustrates a list of video and/or audio clips 6010, video editing tools 6020, and video displays 6030. The list of clips 6010 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 6020 include tools that allow a user to graphically set in and out points for video clips (in other words, where in the final product a specific clip or part of a clip will be shown). For instance, the video editing tools 6020 include a number of timelines that can be used to modify the temporal sequence of the video frame and to synchronize audio tracks with video tracks (e.g., in order to add music over a video clip). In some embodiments, video editing tools 6020 also give users the ability to edit in effects or perform other video editing functions.

Video displays 6030 allow a user to watch multiple video clips at once, thereby enabling easier selection of in and out points for the video clips. The screen shot 6000 illustrates a few of many different editing tools that a video editing application of some embodiments may have to edit digital video.

In some cases, some or all of the video clips that are displayed in the list of clips 6010, played in displays 6030, and edited by a user with video editing tools 6020, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

The process next stores (at 5990) the defined media editing application (i.e., the defined modules, UI items, etc.) on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 5900 are not exhaustive of the modules, rules, processes, and UI items that could be defined and stored on a computer readable storage medium for a media editing application incorporating some embodiments of the invention. In addition, the process 5900 is a conceptual process, and the actual implementations may vary. For example, different embodiments may define the various elements in a different order, may define several elements in one operation, may decompose the definition of a single element into multiple operations, etc. In addition, the process 5900 may be implemented as several sub-processes or combined with other operations within a macro-process.

Figure 61:
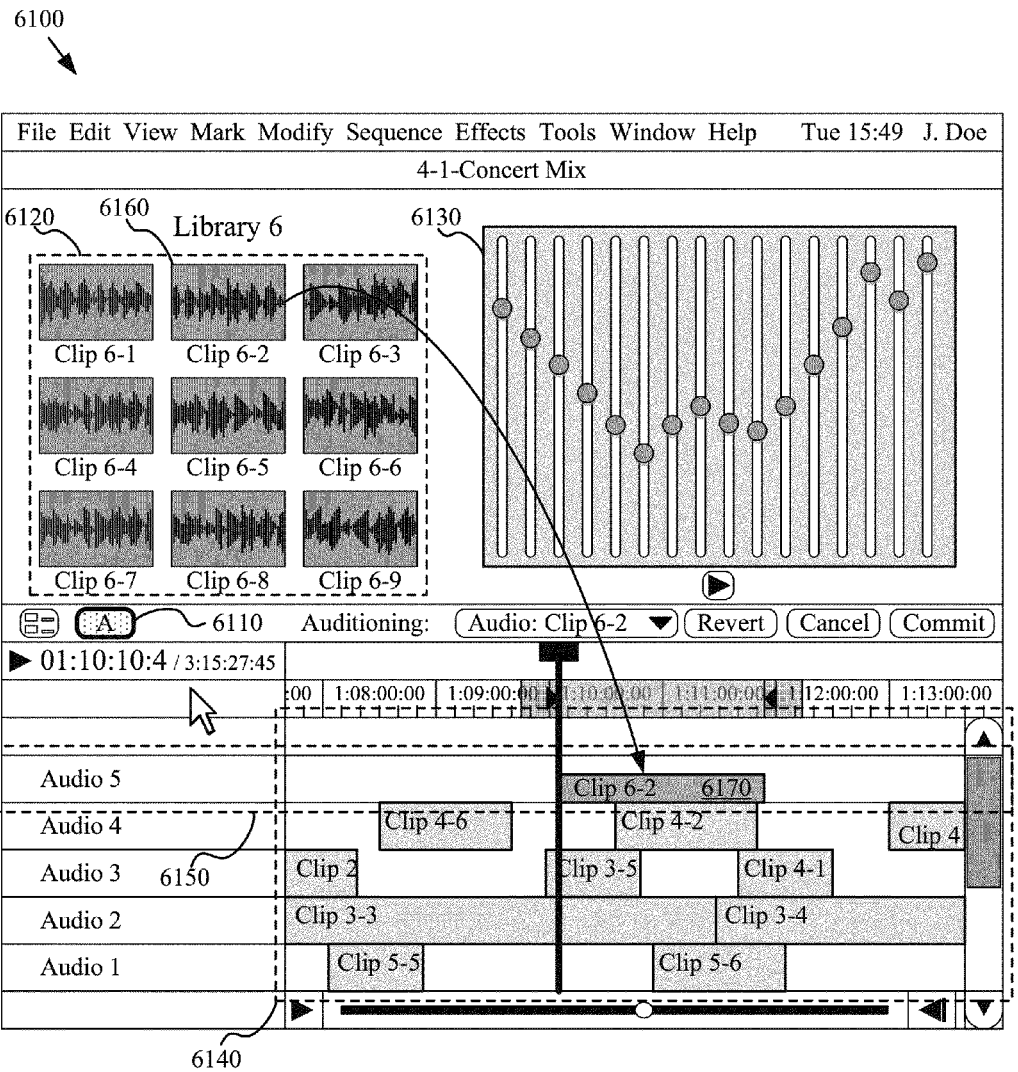
FIG. 61 illustrates the GUI after an audio clip has been added to a project as an audition clip.

Many of the examples given above have been related to a video editing application. One of ordinary skill in the art will realize that the invention can be implemented in other media editing applications such as audio editing applications. FIG. 61 describes one such example audio editing application with an audition feature of some embodiments.

FIG. 61 illustrates an example usage of the audition feature where a user has added an audio clip as an audition clip using a GUI 6100 of some embodiments. The GUI 6100 of FIG. 61 includes (1) an audition selection item 6110, (2) a media library 6120, (3) an audio control window 6130, and (4) a composite display area 6140 with several tracks (e.g., audio track 6150) that span a timeline. As shown, an audio clip 6160 has been added from the media library 6120. The user may have invoked the audition feature and selected the audio clip for addition in a similar manner to that described above in FIGS. 3-6, for example. As shown, the audio clip 6160 has been added to audio track 6150 as a preview clip 6170. As in the case of video clips, when no particular location has been selected to insert an audio clip, the clip may be inserted on a newly-created track at the playhead location.

In addition, the GUI 6000 may include different control buttons 6040 to enable various functions of the media editing application. For instance, the editing functions described above in Section II may be invoked using such control buttons. In addition to the GUI 6000, other embodiments may use various specific arrangements and displays of the functions provided by the media editing application.

VII. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like application-specific ICs ("ASIC") and field-programmable gate arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and/or electronic signals passing wirelessly or over wired connections.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 62:
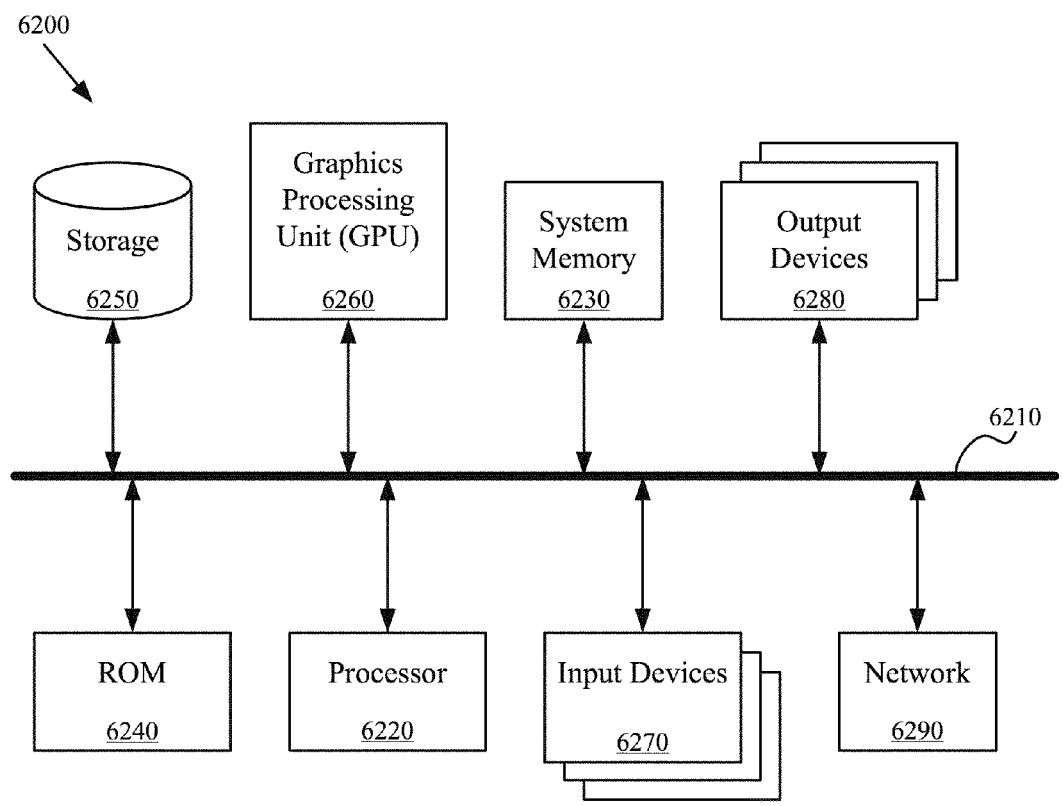
FIG. 62 illustrates a computer system with which some embodiments of the invention are implemented.

FIG. 62 illustrates a computer system 6200 with which some embodiments of the invention are implemented. For example, the system described above in reference to FIG. 57 may be at least partially implemented using sets of instructions that are run on the computer system 6200. As another example, the processes described in reference to FIGS. 33 and 54 may be at least partially implemented using sets of instructions that are run on the computer system 6200.

Such a computer system includes various types of computer readable mediums and interfaces for various other types of computer readable mediums. Computer system 6200 includes a bus 6210, a processor 6220, a system memory 6230, a read-only memory (ROM) 6240, a permanent storage device 6250, a graphics processing unit ("GPU") 6260, input devices 6270, output devices 6280, and a network connection 6290. The components of the computer system 6200 are electronic devices that automatically perform operations based on digital and/or analog input signals. The various examples of user interfaces shown in FIGS. 3-32, and 36-53 may be at least partially implemented using sets of instructions that are run on the computer system 6200 and displayed using the output devices 6280.

One of ordinary skill in the art will recognize that the computer system 6200 may be embodied in other specific forms without deviating from the spirit of the invention. For instance, the computer system may be implemented using various specific devices either alone or in combination. For example, a local PC may include the input devices 6270 and output devices 6280, while a remote PC may include the other devices 6210-6260, with the local PC connected to the remote PC through a network that the local PC accesses through its network connection 6290 (where the remote PC is also connected to the network through a network connection).

The bus 6210 collectively represents all system, peripheral, and chipset buses that communicatively connect the numerous internal devices of the computer system 6200. For instance, the bus 6210 communicatively connects the processor 6220 with the system memory 6230, the ROM 6240, and the permanent storage device 6250. In some cases, the bus 6210 may include wireless and/or optical communication pathways in addition to or in place of wired connections. For example, the input devices 6270 and/or output devices 6280 may be coupled to the system 6200 using a wireless local area network (W-LAN) connection, Bluetooth®, or some other wireless connection protocol or system.

From these various memory units, the processor 6220 retrieves instructions to execute and data to process in order to execute the processes of the invention. In some embodiments the processor includes an FPGA, an ASIC, or various other electronic components for executing instructions.

The ROM 6240 stores static data and instructions that are needed by the processor 6220 and other modules of the computer system. The permanent storage device 6250, on the other hand, is a read-and-write memory device. This device is a non-volatile memory unit that stores instructions and data even when the computer system 6200 is off. Some embodiments of the invention use a mass-storage device (such as a magnetic or optical disk and its corresponding disk drive) as the permanent storage device 6250.

Other embodiments use a removable storage device (such as a floppy disk, flash drive, or CD-ROM) as the permanent storage device. Like the permanent storage device 6250, the system memory 6230 is a read-and-write memory device. However, unlike storage device 6250, the system memory 6230 is a volatile read-and-write memory, such as a random access memory (RAM). The system memory stores some of the instructions and data that the processor needs at runtime. In some embodiments, the sets of instructions and/or data used to implement the invention's processes are stored in the system memory 6230, the permanent storage device 6250, and/or the read-only memory 6240. For example, the various memory units include instructions for processing multimedia items in accordance with some embodiments. From these various memory units, the processor 6220 retrieves instructions to execute and data to process in order to execute the processes of some embodiments.

In addition, the bus 6210 connects to the GPU 6260. The GPU of some embodiments performs various graphics processing functions. These functions may include display functions, rendering, compositing, and/or other functions related to the processing or display of graphical data.

The bus 6210 also connects to the input devices 6270 and output devices 6280. The input devices 6270 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 6280 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 62, bus 6210 also couples computer 6200 to a network 6290 through a network adapter (not shown). In this manner, the computer can be a part of a network of computers (such as a local area network ("LAN"), a wide area network ("WAN"), an Intranet, or a network of networks, such as the Internet. For example, the computer 6200 may be coupled to a web server (network 6290) so that a web browser executing on the computer 6200 can interact with the web server as a user interacts with a GUI that operates in the web browser.

As mentioned above, the computer system 6200 may include one or more of a variety of different computer-readable media (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to, ASICs, FPGAs, programmable logic devices ("PLD"), ROM, and RAM devices. Examples of computer programs or computer code include machine code, such as produced by a compiler, and files including higher-level code that are executed by a computer, an electronic component, and/or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying means displaying on an electronic device. As using in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It should be recognized by one of ordinary skill in the art that any or all of the components of computer system 6200 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., particular composite display areas). However, one of ordinary skill will realize that other embodiments might be implemented with other types of media editing applications with other types of features and components (e.g., other types of composite display areas).

Moreover, while the examples shown illustrate certain individual modules as separate blocks (e.g., the preview generator 5725, the rendering engine 5730, etc.), one of ordinary skill in the art would recognize that some embodiments may combine these modules into a single functional block or element. One of ordinary skill in the art would also recognize that some embodiments may divide a particular module into multiple modules.

One of ordinary skill in the art will realize that, while the invention has been described with reference to numerous specific details, the invention can be embodied in other specific forms without departing from the spirit of the invention. For instance, alternate embodiments may be implemented by using a generic processor to implement the video processing functions instead of using a GPU. One of ordinary skill in the art would understand that the invention is not to be limited by the foregoing illustrative details, but rather is to be defined by the appended claims.

The invention claimed is:

1. A device comprising:
at least one processor for executing sets of instructions; and
a memory that stores a program for creating a composite media presentation, the program comprising:
sets of instructions for providing a composite display area for displaying a set of graphical representations that represent a set of committed media clips that are committed to be a part of the composite presentation;
sets of instructions for providing an audition tool for creating an audition set associated with a particular location in the composite display area, the audition set comprising a plurality of media clips associated with the particular location, wherein only one media clip of the audition set is active in the composite presentation and inactive media clips are candidates for inclusion in the composite presentation at the particular location;
sets of instructions for providing a range selector for selecting, in the composite display area, a portion of the composite presentation that includes the particular location associated with the audition set; and
sets of instructions for providing a preview display area for automatically playing back the media clips within the selected portion of the composite presentation in a loop such that the selected portion is played back a number of times based on a number of different media clips in the audition set, each playback using a different one of the media clips in the audition set.

2. The device of claim 1, wherein the audition tool comprises an audition selection item for invoking an audition session.

3. The device of claim 1, wherein the program further comprises sets of instructions for providing an indicator for indicating a subset of media clips in the audition set for playback in the composite presentation.

4. The device of claim 1, wherein the program further comprises sets of instructions for providing an indicator for indicating which media clip of the audition set is active during playback.

5. The device of claim 1, wherein the audition tool is further for creating, at the particular location in the composite display area, a graphical indication that identifies the particular location as a location in the composite display area with which an audition set is associated.

6. The device of claim 5, wherein the graphical indication comprises a symbol superimposed over a particular graphical representation of the audition set.

7. The device of claim 6, wherein the graphical representation of the audition set has a first visible appearance and a graphical representation of a committed media clip has a second visible appearance.

8. The device of claim 7, wherein the first and second visible appearances are different colors.

9. The device of claim 7, wherein the first and second visible appearances are different sizes.

10. A non-transitory machine readable medium storing a program which when executed by at least one processing unit creates a composite media presentation, the program comprising sets of instructions for:
- providing a composite display area for displaying a set of graphical representations that represent a set of committed media clips that are committed to be a part of a composite presentation;
- providing an audition tool for creating an audition set associated with a particular location in the composite display area, the audition set comprising a plurality of media clips associated with the particular location, wherein only one media clip of the audition set is active in the composite presentation and inactive media clips are candidates for inclusion in the composite presentation at the particular location;
- providing a range selector for selecting, in the composite display area, a portion of the composite presentation that includes the particular location associated with the audition set; and
- providing a preview display area for automatically playing back the media clips within the selected portion of the composite presentation in a loop such that the selected portion is played back a number of times based on a number of different media clips in the audition set, each playback using a different one of the media clips in the audition set.

11. The non-transitory machine readable medium of claim 10, wherein the program further comprises a set of instructions for providing an audition selection item for invoking an audition session.

12. The non-transitory machine readable medium of claim 11, wherein the audition selection item is further for ending an audition session.

13. The non-transitory machine readable medium of claim 11, wherein the audition selection item is further for defining a particular media clip as a candidate for placement at a particular location in the composite display area before adding the particular media clip to the composite display area.

14. The non-transitory machine readable medium of claim 13, wherein the particular media clip is selected from a media library using a drag and drop operation to select and drag the media clip to an audition display area.

15. The non-transitory machine readable medium of claim 11, wherein the audition tool is further for placing at least one clip in a particular audition set for the particular location, when a user invokes the audition tool using the audition selection item, selects the particular location in the composite display area, and selects at least one clip from a media library to add to the particular audition set.

16. The non-transitory machine readable medium of claim 10, wherein the program further comprises a set of instructions for providing an audition display area for managing and displaying the audition set.

17. The non-transitory machine readable medium of claim 16, wherein the audition tool is further for placing at least one clip in a particular audition set for the particular location, when a user (1) invokes the audition tool using an audition selection item, (2) selects the particular location in the composite display area, and (3) selects at least one clip from a media library to add to the particular audition set by moving the at least one clip to the audition display area.

18. The non-transitory machine readable medium of claim 10, wherein the audition tool is further for exchanging at least one candidate media clip associated with the particular location with the active media clip.

19. The non-transitory machine readable medium of claim 10, wherein the audition tool is further for sequentially exchanging each candidate media clip associated with the particular location with the active clip.

20. A method for providing a media-editing application for creating composite media presentations, the method comprising:
- providing a composite display area for displaying a set of graphical representations that represent a set of committed media clips that are committed to be a part of a composite presentation;
- providing an audition tool for creating an audition set associated with a particular location in the composite display area, the audition set comprising a plurality of media clips associated with the particular location, wherein only one media clip of the audition set is active in the composite presentation and inactive media clips are candidates for inclusion in the composite presentation at the particular location;
- providing a range selector for selecting, in the composite display area, a portion of the composite presentation that includes the particular location associated with the audition set; and
- providing a preview display area for automatically playing back the media clips within the selected portion of the composite presentation in a loop such that the selected portion is played back a number of times based on a number of different media clips in the audition set, each playback using a different one of the media clips in the audition set.

21. The method of claim 20, wherein the audition tool is further for creating a graphical indicator at the particular location in the composite display area to identify the candidate media clips as associated with the particular location.

22. The method of claim 21, wherein the graphical indicator for a committed media clip is different from the graphical indicator for the candidate media clips.

23. The method of claim 21, wherein the graphical indicator for the audition set comprises a symbol placed over a particular graphical representation of the audition set.

24. The method of claim 21, wherein the graphical indicator for the audition set comprises a marker over at least a section of a particular graphical representation of the audition set.

25. The method of claim 20, wherein the composite display area comprises a plurality of different locations representing a plurality of different times in the composite presentation.

26. The method of claim 25, wherein the composite display area further comprises a timeline for organizing the set of graphical representations that represent the set of committed media clips, wherein different locations correspond to different points along the timeline.

27. The method of claim 20, wherein the plurality of media clips in the composite presentation comprises at least one audio clip and at least one video clip.

28. The method of claim 20 further comprising providing an audition commit item for removing a particular media clip from the candidate media clips and adding the particular media clip to the set of committed media clips that are committed for inclusion in the composite presentation.

\* \* \* \* \*